US010123330B2

(12) United States Patent
Josiam et al.

(10) Patent No.: US 10,123,330 B2
(45) Date of Patent: Nov. 6, 2018

(54) METHODS TO ENABLE EFFICIENT WIDEBAND OPERATIONS IN LOCAL AREA NETWORKS USING OFDMA

(71) Applicant: Samsung Electronics Co., Ltd, Suwon-si (KR)

(72) Inventors: Kaushik M. Josiam, Ft. Worth, TX (US); Rakesh Taori, McKinney, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/192,974

(22) Filed: Jun. 24, 2016

(65) Prior Publication Data

US 2017/0006608 A1    Jan. 5, 2017

Related U.S. Application Data

(60) Provisional application No. 62/187,301, filed on Jul. 1, 2015, provisional application No. 62/189,623, filed
(Continued)

(51) Int. Cl.

| | |
|---|---|
| *H04W 72/04* | (2009.01) |
| *H04B 7/04* | (2017.01) |
| *H04L 27/26* | (2006.01) |
| *H04W 24/08* | (2009.01) |
| *H04L 5/00* | (2006.01) |
| *H04B 7/0452* | (2017.01) |

(Continued)

(52) U.S. Cl.
CPC ........... *H04W 72/0453* (2013.01); *H04L 5/00* (2013.01); *H04L 27/2601* (2013.01);
(Continued)

(58) Field of Classification Search
CPC .. H04B 7/0452; H04L 27/2601; H04W 24/08; H04W 72/0453; H04W 72/1289; H04W 84/12; H04W 88/08
See application file for complete search history.

(56) References Cited

U.S. PATENT DOCUMENTS

| | | |
|---|---|---|
| 2013/0286959 A1 | 10/2013 | Lou et al. |
| 2013/0301551 A1 | 11/2013 | Ghosh et al. |
| (Continued) | | |

FOREIGN PATENT DOCUMENTS

| | | |
|---|---|---|
| WO | 2015-076856 A1 | 5/2015 |
| WO | 2016170505 A1 | 10/2016 |
| WO | 2016176680 A1 | 11/2016 |

OTHER PUBLICATIONS

The International Searching Authority, "International Search Report," International Application No. PCT/KR2016/007062, dated Oct. 13, 2016, 4 pages, publisher The ISA/KR, International Application Division, Korean Intellectual Property Office, Daejeon, Republic of Korea.
(Continued)

*Primary Examiner* — Kashif Siddiqui

(57) ABSTRACT

A method for operating an access point (AP) in a wireless local area network (WLAN). The method comprises identifying a bandwidth of an orthogonal frequency division multiple access physical protocol data unit (OFDMA PPDU) by at least one of a primary channel or at least one secondary channel, and nulling a plurality of tones of OFDMA PPDU for the at least one secondary channel sensed busy. The method further comprises transmitting, to a station (STA), a bandwidth signaling sub-field in high efficiency signal-A (HE-SIG-A) field included in a high efficiency multi-user PPDU (HE MU PPDU) indicating availability of at least one content channel, wherein the at least one content channel of high efficiency signal-B (HE-SIG-B) field on the downlink signal including a primary channel and one or more secondary channels that comprise a plurality of OFDMA PPDUs.

18 Claims, 34 Drawing Sheets

Related U.S. Application Data on Jul. 7, 2015, provisional application No. 62/216,674, filed on Sep. 10, 2015, provisional application No. 62/242,809, filed on Oct. 16, 2015, provisional application No. 62/277,780, filed on Jan. 12, 2016, provisional application No. 62/328,106, filed on Apr. 27, 2016.

(51) Int. Cl.
  *H04W 84/12* (2009.01)
  *H04W 88/08* (2009.01)

(52) U.S. Cl.
  CPC ........... *H04W 24/08* (2013.01); *H04B 7/0452* (2013.01); *H04W 84/12* (2013.01); *H04W 88/08* (2013.01)

(56) References Cited

U.S. PATENT DOCUMENTS

| | | |
|---|---|---|
| 2014/0024782 A1 | 9/2014 | Kim et al. |
| 2015/0071272 A1 | 3/2015 | Vermani et al. |
| 2015/0163028 A1 | 6/2015 | Tandra et al. |
| 2016/0316473 A1* | 10/2016 | Wang ................ H04W 72/0453 |
| 2016/0323426 A1* | 11/2016 | Hedayat ............ H04W 28/0268 |

OTHER PUBLICATIONS

Extended European Search Report regarding Application No. 168182624, dated Jun. 8, 2018, 8 pages.

\* cited by examiner

FIG. 38

METHODS TO ENABLE EFFICIENT WIDEBAND OPERATIONS IN LOCAL AREA NETWORKS USING OFDMA

CROSS-REFERENCE TO RELATED APPLICATION(S) AND CLAIM OF PRIORITY

This application claims priority under 35 U.S.C. § 119(e) to:
U.S. Provisional Patent Application No. 62/187,301 filed on Jul. 1, 2015 entitled METHODS TO ENABLE EFFICIENT WIDEBAND OPERATIONS IN LOCAL AREA NETWORKS USING OFDMA;
U.S. Provisional Patent Application No. 62/189,623 filed on Jul. 7, 2015 entitled METHODS FOR BLOCK ACKNOWLEDGEMENT MULTIPLEXING IN WIRELESS LOCAL AREA NETWORKS;
U.S. Provisional Patent Application No. 62/216,674 filed on Sep. 10, 2015 entitled METHODS FOR BLOCK ACKNOWLEDGEMENT MULTIPLEXING IN WIRELESS LOCAL AREA NETWORKS;
U.S. Provisional Patent Application No. 62/242,809 filed on Oct. 16, 2015 entitled METHODS FOR BLOCK ACKNOWLEDGEMENT MULTIPLEXING IN WIRELESS LOCAL AREA NETWORKS;
U.S. Provisional Patent Application No. 62/277,780 filed on Jan. 12, 2016 entitled METHODS AND APPARATUS FOR SIGNALING IN HIGH EFFICIENCY WIRELESS LOCAL AREA NETWORKS; and
U.S. Provisional Patent Application No. 62/328,106 filed on Apr. 27, 2016 entitled METHODS TO ENABLE EFFICIENT WIDEBAND OPERATIONS IN LOCAL AREA NETWORKS USING OFDMA.

The above-identified provisional patent applications are hereby incorporated by reference in their entirety.

TECHNICAL FIELD

This disclosure relates generally to wireless local area networks (WLANs). More specifically, this disclosure relates to uplink channel access in WLAN systems.

BACKGROUND

An IEEE 802.11ac system supports multi-user (MU) transmission using spatial degrees of freedom via a multi user-multiple input-multiple-output (MU-MIMO) scheme in a downlink direction from an access point (AP) to stations (STAs). To improve efficiency and performance, an IEEE 802.11ax system has considered using both orthogonal frequency division multiple access (OFDMA) and/or MU-MIMO in both downlink and uplink directions that is in addition to supporting frequency and spatial multiplexing from an AP to multiple STAs, transmissions from multiple STAs to the AP are also supported. The AP being a central node in a network receives traffic for multiple STAs and can decide if the AP wants to transmit using MU or single user (SU) modes to users or receive using uplink MU from the multiple STAs. In addition, in current IEEE 802.11ac systems, a channel bonding procedure allows for bonding and operating only 40, 80 and 160 megahertz (MHz) channel bandwidths. However, the IEEE 802.11ac systems may also allow for legacy devices that operate at around 20 MHz and 40 MHz bandwidths. Therefore, a scheme for providing non-contiguous bonding of channels and more efficient channel granularity than allowed in the IEEE 802.11 standards is needed.

SUMMARY

Embodiments of the present disclosure provide methods to enable efficient wideband operations in local area network using OFDMA.

In one embodiment, a station (STA) in a wireless local area network (WLAN) is provided. The STA includes a transceiver configured to receive, from an access point (AP), a bandwidth signaling sub-field in high efficiency signal-A (HE-SIG-A) field included in a high efficiency multi-user PPDU (HE MU PPDU) indicating availability of at least one content channel. The at least one content channel of high efficiency signal-B (HE-SIG-B) field on a downlink signal including a primary channel and one or more secondary channels that comprise a plurality of an orthogonal frequency division multiple access physical protocol data units (OFDMA PPDUs). The STA further includes at least one processor configured to identify a bandwidth of OFDMA PPDU based on the HE MU PPDU.

In another embodiment, an access point (AP) in a wireless local area network (WLAN), is provided. The AP includes at least one processor configured to identify a bandwidth of an orthogonal frequency division multiple access physical protocol data unit (OFDMA PPDU) by at least one of a primary channel or at least one secondary channel, and nulling a plurality of tones of OFDMA PPDU for the at least one secondary channels sensed busy. The AP further includes a transceiver configured to transmit, to a station (STA), a bandwidth signaling sub-field in high efficiency signal-A (HE-SIG-A) field included in a high efficiency multi-user PPDU (HE MU PPDU) indicating availability of at least one content channel, wherein the bandwidth signaling information and the at least one content channel of the high efficiency signal-B (HE-SIG-B) field on the downlink signal including a primary channel and one or more secondary channels that comprise a plurality of OFDMA PPDUs.

In yet another embodiment, a method for operating an access point (AP) in a wireless local area network (WLAN) is provided. The method comprises identifying a bandwidth of an orthogonal frequency division multiple access physical protocol data unit (OFDMA PPDU) by at least one of a primary channel or at least one secondary channel, and nulling a plurality of tones of OFDMA PPDU for the at least one secondary channel sensed busy. The method further comprises transmitting, to a station (STA), a bandwidth signaling sub-field in high efficiency signal-A (HE-SIG-A) field included in a high efficiency multi-user PPDU (HE MU PPDU) indicating availability of at least one content channel, wherein the at least one content channel of high efficiency signal-B (HE-SIG-B) field on the downlink signal including a primary channel and one or more secondary channels that comprise a plurality of OFDMA PPDUs.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, include, be included within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 38 illustrates an example high efficiency (HE) MU PPDU format according to illustrative embodiments of the present disclosure;

DETAILED DESCRIPTION

FIGS. 1 through 45, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
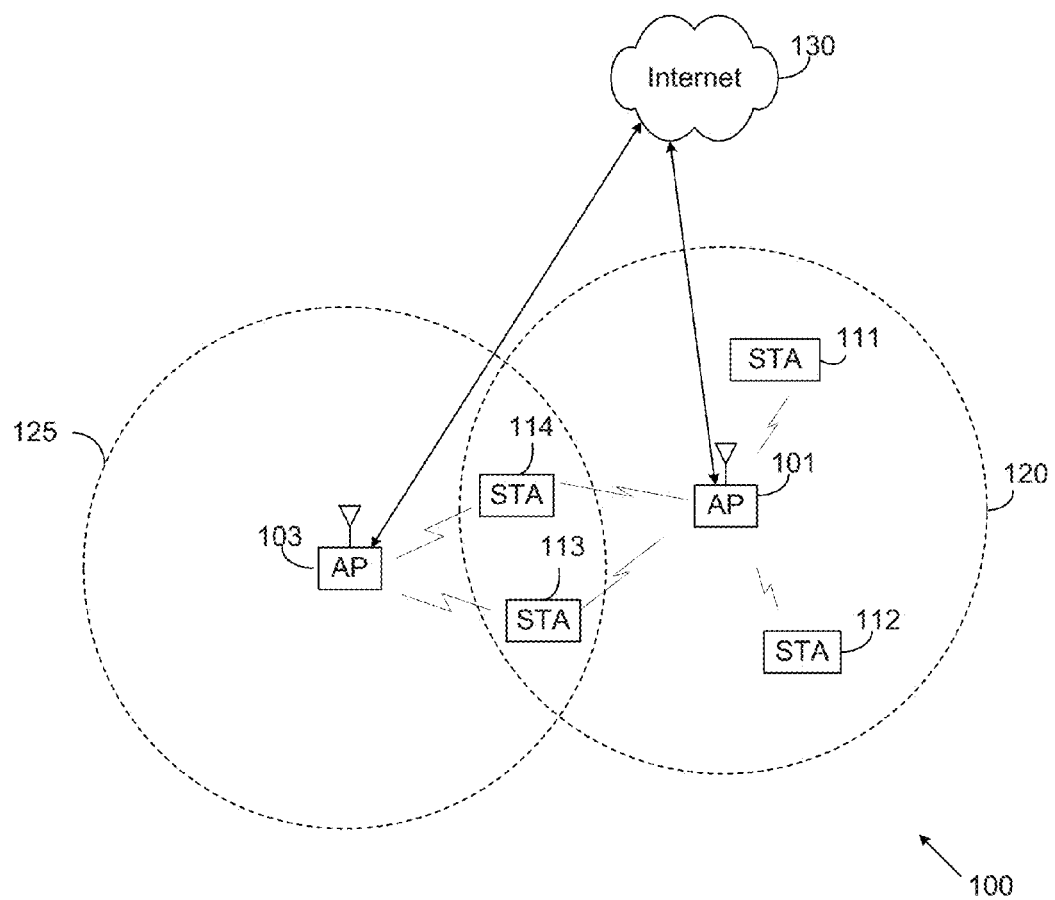
FIG. 1 illustrates an example wireless network according to illustrative embodiments of the present disclosure.

FIG. 1 illustrates an example wireless network 100 according to this disclosure. The embodiment of the wireless network 100 illustrated in FIG. 1 is for illustration only. Other embodiments of the wireless network 100 could be used without departing from the scope of this disclosure.

As illustrated in FIG. 1, the wireless network 100 includes APs 101 and 103. The APs 101 and 103 communicate with at least one network 130, such as the Internet, a proprietary Internet Protocol (IP) network, or other data network.

The AP 101 provides wireless access to the network 130 for a plurality of stations (STAs) 111-114 within a coverage area 120 of the AP 101. The APs 101-103 may communicate with each other and with the STAs 111-114 using WiFi or other WLAN communication techniques.

Depending on the network type, other well-known terms may be used instead of "access point" or "AP," such as "router" or "gateway." For the sake of convenience, the term "AP" is used in this patent document to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," "user device," or "user." For the sake of convenience, the terms "station" and "STA" are used in this patent document to refer to remote wireless equipment that wirelessly accesses an AP or contends for a wireless channel in a WLAN, whether the STA is a mobile device (such as a mobile telephone or smartphone) or a stationary device (such as a desktop computer, AP, media player, stationary sensor, television, etc.).

Dotted lines show the approximate extents of the coverage areas 120 and 125, which are illustrated as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programing for management of UL MU transmissions in WLANs. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

In some embodiments, a station (STA) in a wireless local area network (WLAN) includes a transceiver configured to receive, from an access point (AP), at least one content channel of HE-SIG-B on a downlink signal including a primary channel and one or more secondary channels that comprise a plurality of an orthogonal frequency division multiple access physical protocol data units (OFDMA PPDUs) in accordance with a non-contiguous channel bonding reception. The STA further includes at least one processor configured to identify a bandwidth of OFDMA PPDU by nulling a plurality of tones of OFDMA PPDU and determine bandwidth signaling information for the downlink signal in accordance with the non-contiguous channel bonding transmission.

In some embodiments, the STA includes at least one processor further configured to determine a lower portion and upper portion of one of the one or more secondary channels and identify a bandwidth of each of the determined lower portion and the upper portion of one of the one or more secondary channels.

In some embodiments, the STA includes at least one processor configured to identify content channel information to indicate resource unit allocation signaling information and transceiver configured to receive, from the AP, the at least one content channel including the content channel information on the downlink signal.

In such embodiments, the STA further includes at least one content channel is duplicated to transmit the same information of content channel information in the primary channel and the one or more secondary channels, or at least two secondary channels.

In such embodiments, the at least one content channel is present in the primary channel when the bandwidth of the OFDMA PPDU transmitted in the primary channel is a 80 megahertz (MHz). In such embodiments, the bandwidth signaling information is received from the AP on a different portion than content channel information in the downlink signal.

In some embodiments, an access point (AP) in a wireless local area network (WLAN) includes at least one processor configured to identify a bandwidth of an orthogonal frequency division multiple access physical protocol data unit (OFDMA PPDU) by nulling a plurality of tones of OFDMA PPDU and determine bandwidth signaling information for a downlink signal in accordance with a non-contiguous channel bonding transmission.

In some embodiments, an AP includes a transceiver configured to transmit, to a station (STA), at least one content channel on the downlink signal including a primary channel and one or more secondary channels that comprise a plurality of OFDMA PPDUs in accordance with the non-contiguous channel bonding transmission.

In some embodiments, an AP includes at least one processor is further configured to determine a lower portion and upper portion of one of the one or more secondary channels and identify the availability of a lower portion and the upper portion of one of the one or more secondary channels comprising the plurality of OFDMA PPDUs.

In some embodiments, an AP includes at least one processor configured to identify content channel information to indicate resource unit allocation signaling information.

In some embodiments, an AP includes a transceiver configured to transmit, to the STA, the at least one content channel including the content channel information on the downlink signal.

In such embodiments, the at least one content channel is duplicated to transmit the same information of content channel information in the primary channel and the one or more secondary channels, or at least two secondary channels.

In such embodiments, the at least one content channel is present in the primary channel when the bandwidth of the OFDMA PPDU transmitted in the primary channel is a 80 megahertz (MHz).

In such embodiments, the bandwidth signaling information is transmitted to the STA on a different portion than content channel information in the downlink signal.

In such embodiments, the bandwidth of the OFDMA PPDU comprises non-contiguous bandwidths comprising at least two bandwidths.

Figure 2A:
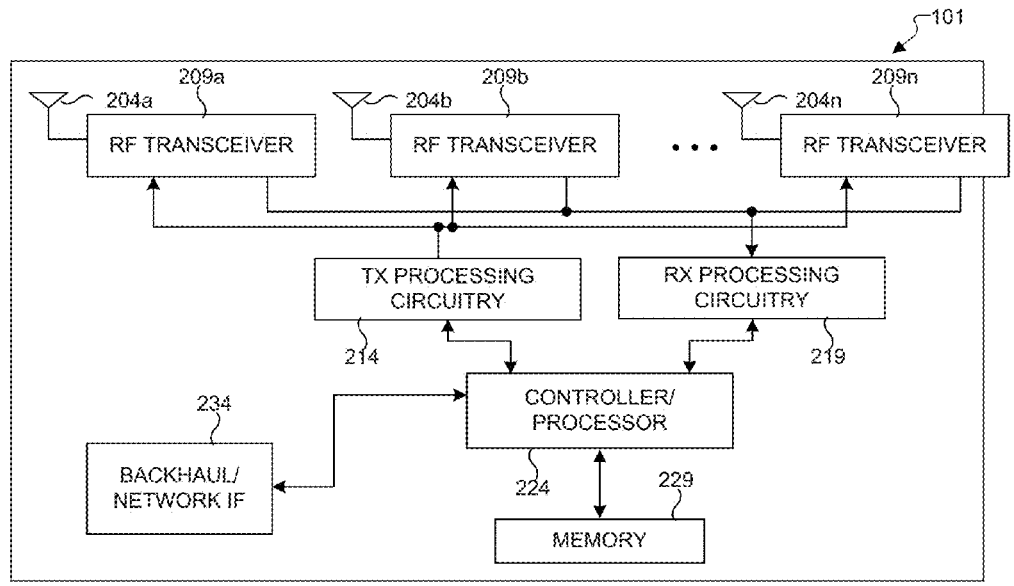
FIG. 2A illustrates an example AP according to illustrative embodiments of the present disclosure.

FIG. 2A illustrates an example AP 101 according to this disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

As illustrated in FIG. 2A, the AP 101 includes multiple antennas 204a-204n, multiple RF transceivers 209a-209n, transmit (TX) processing circuitry 214, and receive (RX) processing circuitry 219. The AP 101 also includes a controller/processor 224, a memory 229, and a backhaul or network interface 234.

The RF transceivers 209a-209n receive, from the antennas 204a-204n, incoming RF signals, such as signals transmitted by STAs in the network 100. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 transmits analog or digital data (such as voice data, web data, e-mail, or interactive video game data) from the controller/processor 224. The TX processing circuitry 214 encodes, multiplexes, and/or converts the outgoing baseband data to generate processed baseband or IF signals. The RF transceivers 209a-209n receive the outgoing processed baseband or IF signals from the TX processing circuitry 214 and up-converts the baseband or IF signals to RF signals that are transmitted via the antennas 204a-204n.

The controller/processor 224 can include one or more processors or other processing devices that control the overall operation of the AP 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction.

In one embodiment, the controller/processor 224 is configured to identify a bandwidth of an orthogonal frequency division multiple access physical protocol data unit (OFDMA PPDU) and determine bandwidth signaling information for a downlink signal in accordance with a non-contiguous channel bonding transmission.

In one embodiment, the controller/processor 224 is configured to determine the availability of a lower portion and upper portion of one of the one or more secondary channels and identify a bandwidth comprising the bandwidth of available lower portion and the upper portion of one of the one or more secondary channels comprising the plurality of OFDMA PPDUs.

In one embodiment, the controller/processor 224 is configured to identify HE-SIG-B content channel information to indicate resource unit allocation signaling information; and Any of a wide variety of other functions could be supported in the AP 101 by the controller/processor 224. In some embodiments, the controller/processor 224 includes at least one microprocessor or microcontroller.

The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver.

The memory 229 is coupled to the controller/processor 224. Part of the memory 229 could include a RAM, and another part of the memory 229 could include a Flash memory or other ROM.

As described in more detail below, the AP 101 may include circuitry and/or programing for using or managing uplink multi-user (UL MU) transmission in a WLAN system. Although FIG. 2A illustrates one example of AP 101, various changes may be made to FIG. 2A. For example, the AP 101 could include any number of each component illustrated in FIG. 2A. As a particular example, an access point could include a number of interfaces 234, and the controller/processor 224 could support routing functions to route data between different network addresses. As another particular example, while illustrated as including a single instance of TX processing circuitry 214 and a single instance of RX processing circuitry 219, the AP 101 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

Figure 2B:
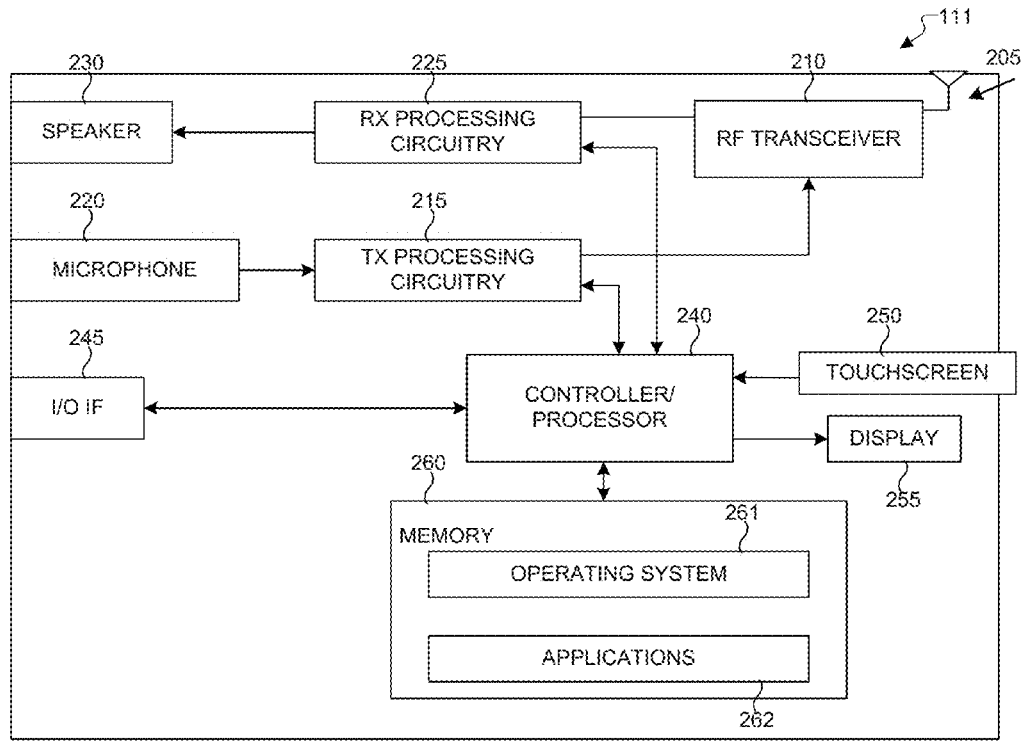
FIG. 2B illustrates an example STA according to illustrative embodiments of the present disclosure.

FIG. 2B illustrates an example STA 111 according to this disclosure. The embodiment of the STA 111 illustrated in FIG. 2B is for illustration only, and the STAs 111-115 of FIG. 1 could have the same or similar configuration. However, STAs come in a wide variety of configurations, and FIG. 2B does not limit the scope of this disclosure to any particular implementation of a STA.

As illustrated in FIG. 2B, the STA 111 includes antenna 205, a radio frequency (RF) transceiver 210, TX processing circuitry 215, a microphone 220, and receive (RX) processing circuitry 225. The STA 111 also includes a speaker 230, a controller/processor 240, an input/output (I/O) interface (IF) 245, a touchscreen 250, a display 255, and a memory 260. The memory 260 includes an operating system (OS) 261 and one or more applications 262.

The RF transceiver 210 receives, from the antenna 205, an incoming RF signal transmitted by an AP of the network 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

In some embodiments, the RF transceiver 210 is configured to receive, from an access point (AP), at least one content channel on a downlink signal including a primary channel and one or more secondary channels that comprise a plurality of an orthogonal frequency division multiple access physical protocol data unit (OFDMA PPDU) in accordance with a non-contiguous channel bonding reception.

In some embodiments, the RF transceiver 210 is configured to receive, from the AP, the at least one HE-SIG-B content channel including the signaling information of the OFDMA PPDU on the downlink signal.

In such embodiments, the at least one content channel is duplicated to transmit the same information of content channel information in the primary channel and the one or more secondary channels, or at least two secondary channels.

In such embodiments, at least one content channel is present in the primary channel when the bandwidth of the OFDMA PPDU transmitted in the primary channel is an 80 megahertz (MHz).

In such embodiments, the bandwidth signaling information is received from the AP on a different portion than content channel information in the downlink signal.

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The controller/processor 240 can include one or more processors and execute the basic OS program 261 stored in the memory 260 in order to control the overall operation of the STA 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to provide efficient wideband operations in WLANs. In some embodiments, the controller/processor 240 includes at least one microprocessor or microcontroller.

The controller/processor 240 is also capable of executing other processes and programs resident in the memory 260, such as operations for using or managing UL transmission in a WLAN system. The controller/processor 240 can move data into or out of the memory 260 as required by an executing process.

The I/O interface 245 is the communication path between these accessories and the main controller 240.

The controller/processor 240 is also coupled to the touchscreen 250 and the display 255. The operator of the STA 111 can use the touchscreen 250 to enter data into the STA 111. The display 255 may be a liquid crystal display, light emitting diode display, or other display capable of rendering text and/or at least limited graphics, such as from web sites.

In some embodiments, the controller/processor 240 is further configured to process a lower portion and upper portion of one of the one or more secondary channels.

In some embodiments, the controller/processor 240 is configured to identify HE-SIG-B content channel information to indicate resource unit allocation signaling information from the signaled bandwidth.

The memory 260 is coupled to the controller/processor 240. Part of the memory 260 could include a random access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include an antenna 205 for a communication with an AP 101. In another example, the STA 111 may not include voice communication or the controller/processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

Different versions of the IEEE 802.11 standards work in the unlicensed bands. More specifically, most versions of the IEEE802.11 standard operate in the 2.4 GHz industrial, scientific and medical (ISM) band and the 5 GHz UNII band, however there are also different versions of the standard being defined for operation below 1 GHz (e.g., IEEE802.11ah, IEEE802.11af).

Figure 3:
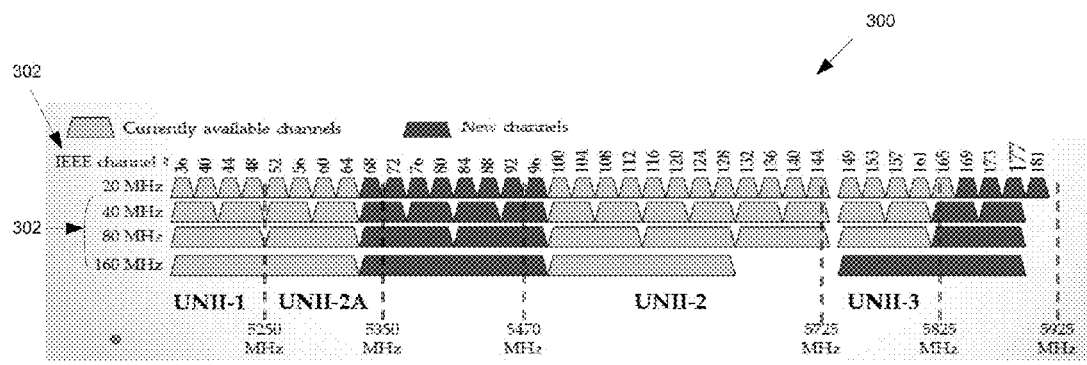
FIG. 3 illustrates an example available channel in a 5 gigahertz (GHz) Unlicensed National Information Infrastructure (UNII) band according to illustrative embodiments of the present disclosure.

FIG. 3 illustrates an example available channel in a 5 gigahertz (GHz) Unlicensed National Information Infrastructure (UNII) band according to illustrative embodiments of the present disclosure. The embodiment of the available channels in the 5 GHz UNII band 300 illustrated in FIG. 3 is for illustration only. Other embodiments of the available channels in the 5 GHz UNII band 300 could be used without departing from the scope of this disclosure.

The latest version of the standard, for example, IEEE 802.11ac operation, is defined only for the 5 GHz UNII band as shown in FIG. 3. The IEEE 802.11ac also defines channel operations in 20, 40, 80, and 160 MHz bandwidths. Additionally, a non-contiguous 160 MHz operation defined as 80+80 is also optionally supported by the IEEE 802.11 standard.

The IEEE 802.11n system defines operations both in the 5 GHz UNII band and 2.4 GHz ISM bands and allows 20 and 40 MHz operations as shown in FIG. 3. As illustrated in FIG. 3, IEEE 802.11n system comprises IEEE channel numbers 302 and a set of bandwidths 302 including 20 MHz, 40 MHz, 80 MHz, and 160 MHz bandwidth, respectively. In addition, unlicensed bands for the IEEE 802.11 systems are likely to be deployed and include any new bands that are likely to be considered for unlicensed operations in the future (e.g. 3.5 GHz bands).

Figure 4:
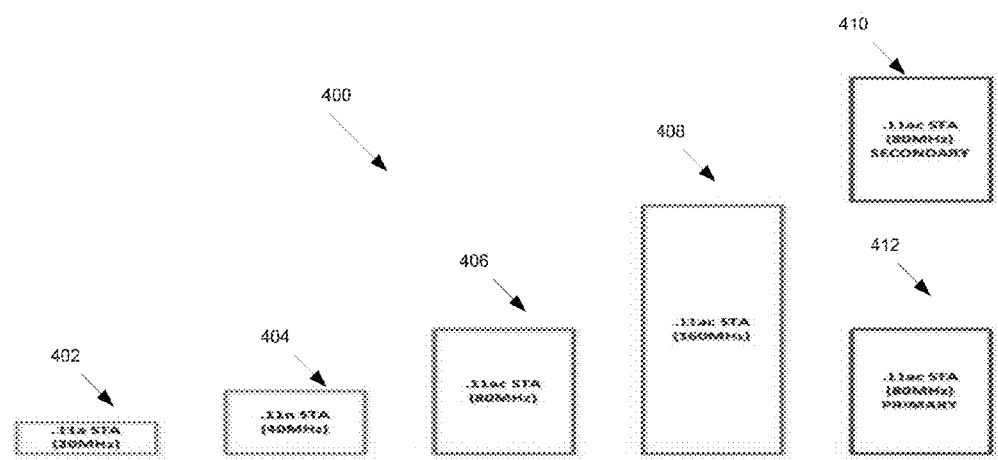
FIG. 4 illustrates an example bandwidths operation of legacy devices in a 5 GHz UNII band according to illustrative embodiments of the present disclosure.

FIG. 4 illustrates an example bandwidths operation of legacy devices in a 5 GHz UNII band according to illustrative embodiments of the present disclosure. The embodiment of the bandwidths operation of legacy devices in the 5 GHz UNII band 400 illustrated in FIG. 4 is for illustration only. Other embodiments of the bandwidths operation of legacy devices in the 5 GHz UNII band 400 could be used without departing from the scope of this disclosure.

An illustration of legacy devices and bandwidths that can operate in the 5 GHz UNII band is shown in FIG. 4. More specifically, the 5 GHz UNII band 400 comprises IEEE 802.11a station (STA) at 20 MHz 402, IEEE 802.11n STA at 40 MHz 404, IEEE 802.11 ac STA at 80 MHz 406, IEEE 802.11ac STA at 160 MHz 408, IEEE802.11ac STA secondary at 80 MHz 410, and IEEE 802.11ac STA primary at 80 MHz 412. These legacy devices can operate in any of the channels shown in FIG. 4 thus fragmenting the available channel bandwidth further and reducing the number of contiguous channels available for channel bonding.

Figure 5:
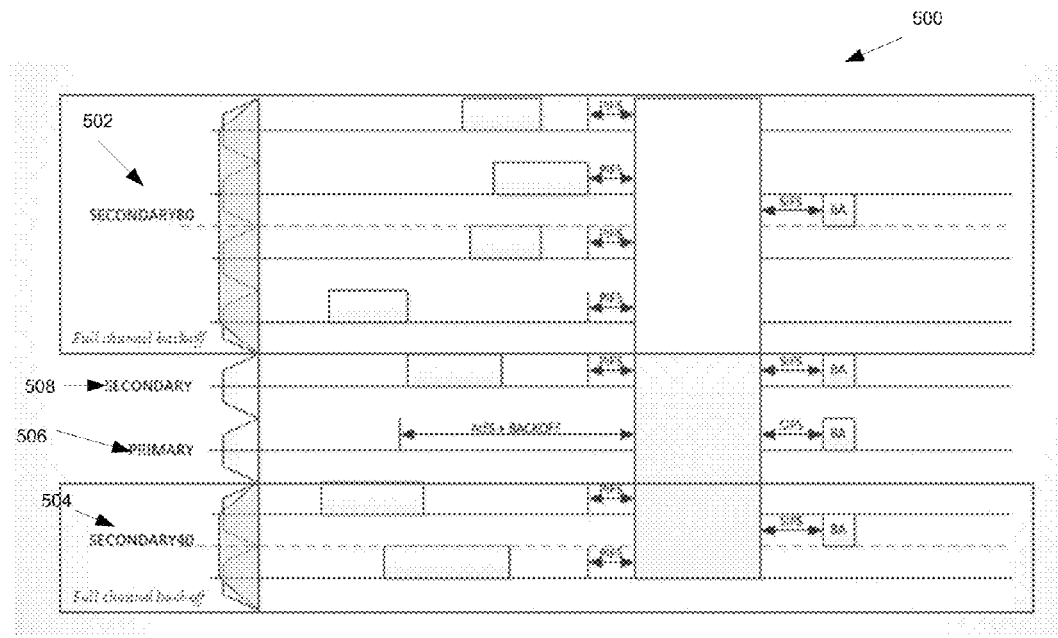
FIG. 5 illustrates an example point coordination function interframe space (PIFS) based channel bonding and access procedure in an institute of electrical and electronics engineers (IEEE) 802.11ac system according to illustrative embodiments of the present disclosure.

FIG. 5 illustrates an example point coordination function interframe space (PIFS) based channel bonding and access procedure in an institute of electrical and electronics engineers (IEEE) 802.11ac system according to illustrative embodiments of the present disclosure. The embodiment of the PIFS based channel bonding and access procedure in the IEEE 802.11ac system 500 illustrated in FIG. 5 is for illustration only. Other embodiments of the PIFS based channel bonding and access procedure in the IEEE 802.11ac system 500 could be used without departing from the scope of this disclosure.

As illustrated FIG. 5, IEEE 802.11 ac system 500 comprises a secondary 80 channel 502, a secondary 40 channel 504, a primary channel 506, and a secondary channel 508.

Channel bonding procedures are based on extending of a channel sensing mechanism to all bands that are being considered for the channel bonding. For example, to aggregate 160 MHz as shown in FIG. 5, a primary channel goes through an arbitration interframe spacing (AIFS)+back-off procedure—the standard carrier sense multiple access (CSMA) procedure during which the channel may be sensed free. Secondary channels are not held to the same sensing requirements as the primary. Therefore, it is required that the secondary channels are sensed free for a point coordination function interframe space (PIFS) duration just before the back off timer on the primary channel expires and the channel is sensed free.

If both the primary and secondary channels are sensed free at a source, then data transmission is initiated by transmitting a request to send (RTS) message to a destination. If the destination also senses the secondary channels indicated in the RTS free for PIFS duration before the RTS was received, then the destination responds with a clear to send (CTS) message after which data transmission can begin. The RTS and CTS are duplicated in both the primary and secondary channels such that all APs/STAs that communicate using the primary and secondary channels can set their network allocation vector (NAV) using the RTS and remain silent for the duration of data transmission. The transmission of RTS and CTS is not mandatory. The STA can choose to begin data transmission directly based on the channels sensed free.

In addition to the primary and secondary channels that are each 20 MHz wide, the secondary 40 (e.g., 40 MHz) and secondary 80 (e.g., 80 MHz) are considered as one unit and a full channel back-off is completed i.e., even if one 20 MHz segment in the secondary 40 and secondary 80 is occupied by a transmission from a legacy device, it is considered busy.

Additionally, static and dynamic operations are considered for a channel bonding where the word static implies that the bandwidth specified in RTS is fixed and the receiving STA/AP transmits the CTS only if the bandwidth indicated in the RTS is sensed free for a PIFS duration before the RTS was received. The Dynamic channel bonding means that the destination is free to respond with a subset of channels indicated by the bandwidth indicator in the RTS. The criterion for selecting the subset is as follows—the subset of channels may be sensed "free", as defined above, for a modified CTS response. This accommodates scenarios where the bandwidth sensed free at the transmitter and receiver is different.

Figure 6:
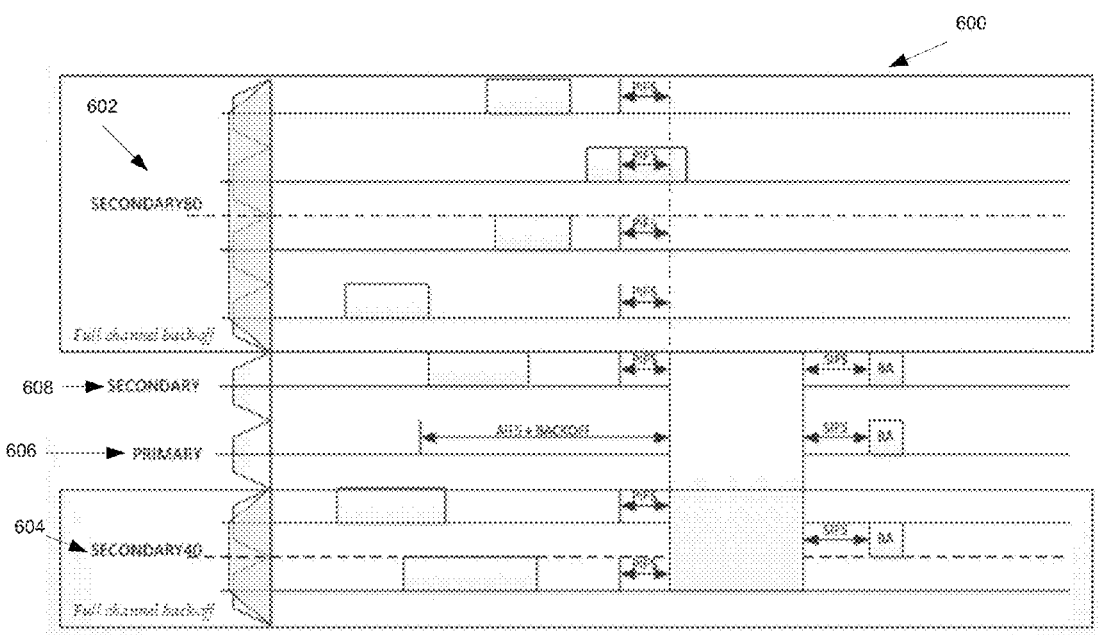
FIG. 6 illustrates an example channel bonding with dynamic channel bandwidth capability in an IEEE 802.11ac system according to illustrative embodiments of the present disclosure.

FIG. 6 illustrates an example channel bonding with dynamic channel bandwidth capability in an IEEE 802.11ac system according to illustrative embodiments of the present disclosure. The embodiment of the channel bonding with dynamic channel bandwidth capability in the IEEE 802.11ac system 600 illustrated in FIG. 6 is for illustration only. Other embodiments of the channel bonding with dynamic channel bandwidth capability in the IEEE 802.11ac system 600 could be used without departing from the scope of this disclosure.

As illustrated FIG. 6, IEEE 802.11 ac system 600 comprises a secondary 80 channel 602, a secondary 40 channel 604, a primary channel 606, and a secondary channel 608.

An example of the dynamic channel bonding procedure is illustrated in FIG. 6 where a 20 MHz chunk in the secondary 80 is occupied allowing for only 80 MHz aggregation to be possible even though the RTS indicated 160 MHz channel operation.

Figure 7:
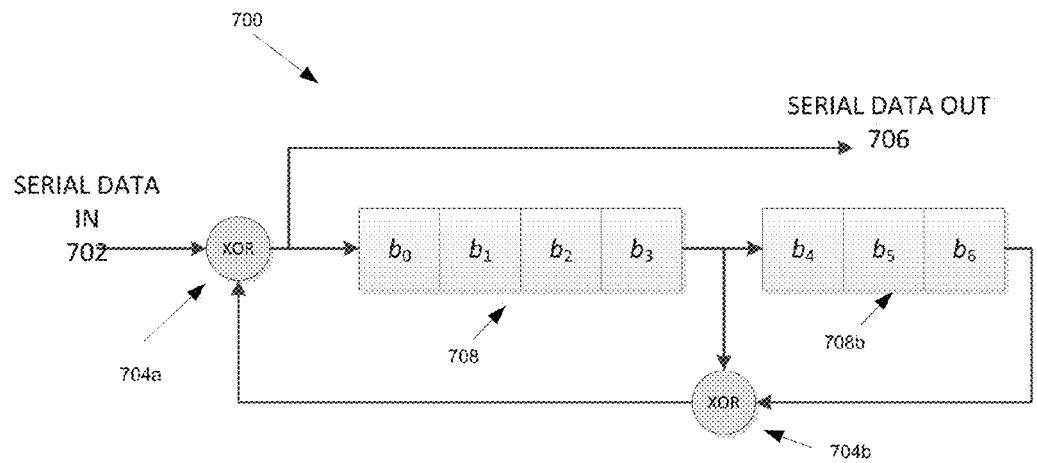
FIG. 7 illustrates an example data scrambling in an IEEE 802.11 transmitter according to illustrative embodiments of the present disclosure.

FIG. 7 illustrates an example data scrambling in an IEEE 802.11 transmitter according to illustrative embodiments of the present disclosure. The embodiment of the data scrambling in the IEEE 802.11 transmitter 700 illustrated in FIG. 7 is for illustration only. Other embodiments of the data scrambling in the IEEE 802.11 transmitter 700 could be used without departing from the scope of this disclosure.

FIG. 7 illustrates an example data scrambling in an IEEE 802.11 transmitter according to illustrative embodiments of the present disclosure. The embodiment of the data scrambling in the IEEE 802.11 transmitter 700 illustrated in FIG. 7 is for illustration only. Other embodiments of the data scrambling in the IEEE 802.11 transmitter 700 could be used without departing from the scope of this disclosure.

As illustrated in FIG. 7, the IEEE 802.11 transmitter 700 comprises a serial data in 702, exclusive OR (XOR) elements 704a and 704b, serial data out 706, and a set of registers 708a and 708b.

Figure 8:
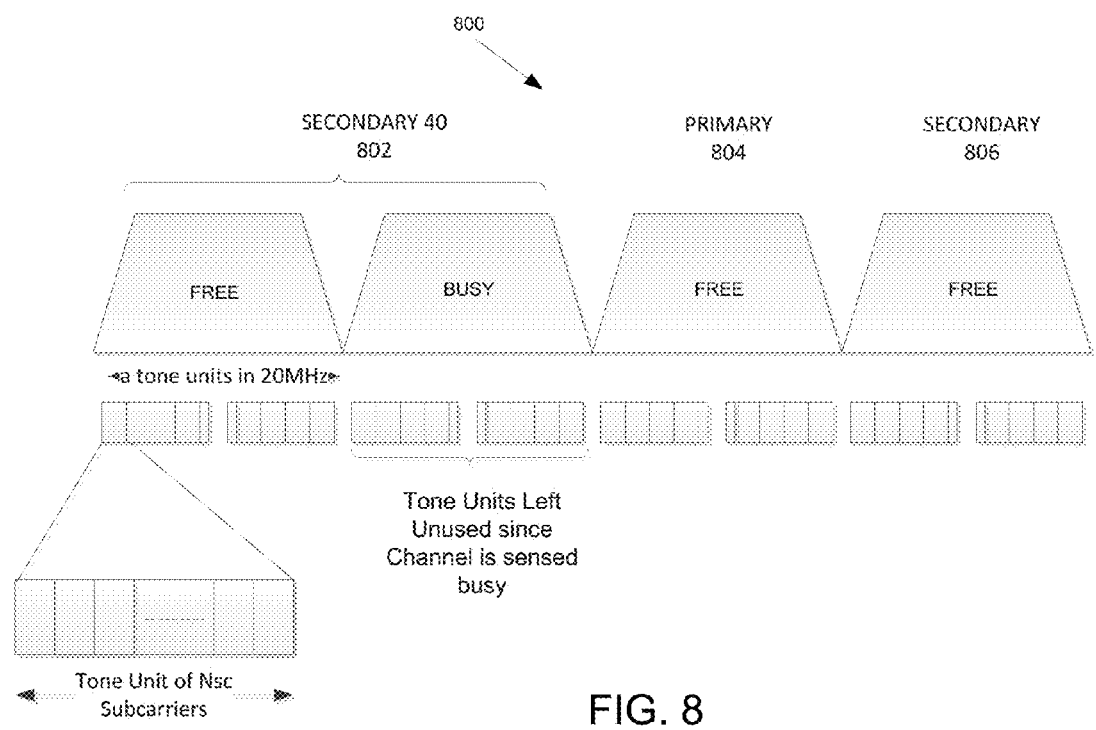
FIG. 8 illustrates an example tone units corresponding to a 20 megahertz (MHz) channel sensed busy are left unused according to illustrative embodiments of the present disclosure.

FIG. 8 illustrates an example tone units corresponding to a 20 megahertz (MHz) channel sensed busy are left unused according to illustrative embodiments of the present disclosure. The embodiment of the tone units (e.g., resource units) corresponding to the 20 MHz channel sensed busy are left unused 800 illustrated in FIG. 8 is for illustration only. Other embodiments of the tone units corresponding to the 20 MHz channel sensed busy are left unused 800 could be used without departing from the scope of this disclosure.

As illustrated in FIG. 8, the tone units corresponding to the 20 MHz channel comprises a secondary 40 channel 802, a primary channel 80, and a secondary channel 806. More specifically, the secondary 40 channel 802 comprises FREE and BUSY, and the primary channel 804 and the secondary channel 806 are FREE.

A sensing bandwidth is a total bandwidth sensed for a transmission and a cleared bandwidth is a subset of the sensing bandwidth that is unoccupied (e.g., free for transmission). A fast Fourier transform/inverse fast Fourier transform (FFT/IFFT) size is set to that of sensing bandwidth. Each 20 MHz of the bandwidth is made up of a tone units where each tone unit contains $N_{sc}$ subcarriers. For example, 20 MHz segment is made up of 9 tone units where each tone unit contains 26 subcarriers and DC and guard subcarriers. When a particular 20 MHz segment is the sensing bandwidth is not sensed free, then those tone units that are co-incident with location of the 20 MHz segment sensed busy are set to zero and not used as shown in FIG. 8.

A sensing bandwidth is a total bandwidth sensed for a transmission and a cleared bandwidth is a subset of the sensing bandwidth that are unoccupied (e.g., free for transmission). An FFT/IFFT size is set to that of sensing bandwidth if the sensing bandwidth is made up of multiple tone units each containing $N_{sc}$ subcarriers. When a particular segment $BW_x$ of the bandwidth is sensed busy, then x tone units that are coincident with the location of the $BW_x$ are set to zero and not used. A number of nulled tone units, x can be defined as equation (1):

$$x = \left\lceil \frac{BW_x}{N_{sc}} \right\rceil \qquad \text{Equation (1)}$$

Figure 9:
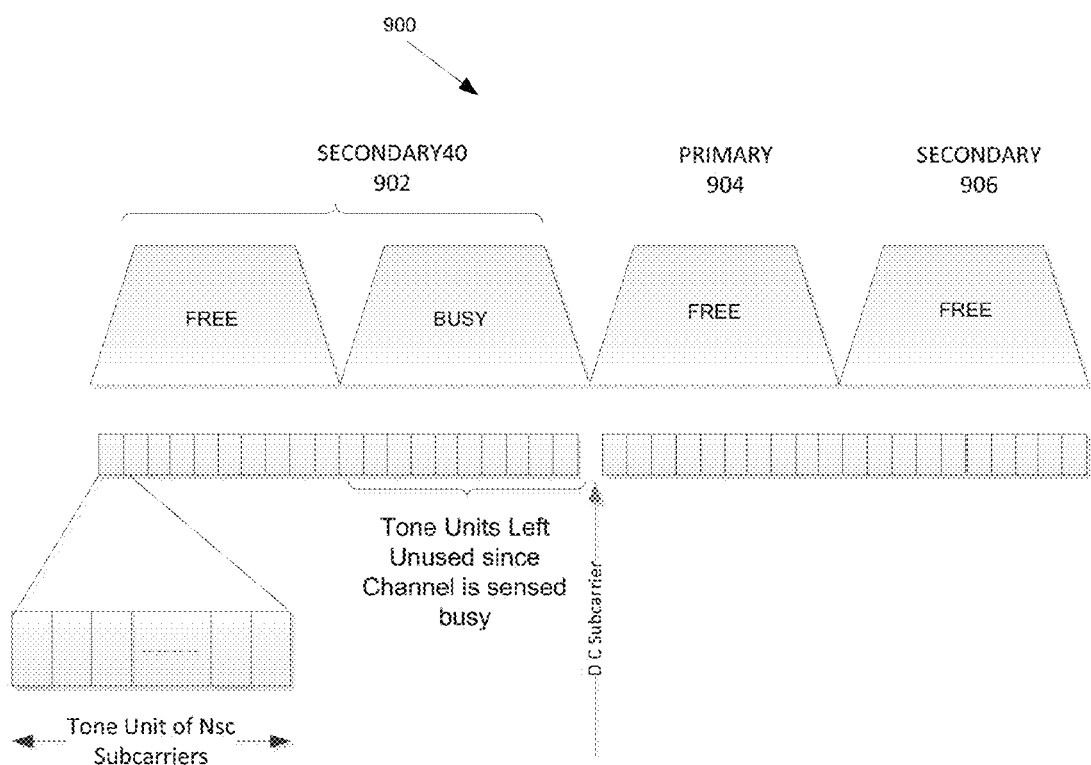
FIG. 9 illustrates an example nulling tone units co-incident with a bandwidth sensed busy according to illustrative embodiments of the present disclosure.

FIG. 9 illustrates an example nulling tone units co-incident with a bandwidth sensed busy according to illustrative embodiments of the present disclosure. The embodiment of the nulling tone units co-incident with the bandwidth sensed busy 900 illustrated in FIG. 9 are for illustration only. Other embodiments of the nulling tone units co-incident with the bandwidth sensed busy 900 could be used without departing from the scope of this disclosure.

As illustrated in FIG. 9, the nulling tone units comprise a secondary 40 channel 902, a primary channel 904, and a secondary channel 906. More specifically, the secondary 40 channel 902 comprises FREE and BUSY, and the primary channel 904 and the secondary channel 906 are FREE.

For example, if 20 MHz segment is sensed busy and a tone unit is 26 subcarriers, then the tone units that are coincident with the 20 MHz segment sensed busy are unused as illustrated in FIG. 9.

Possible RU locations in a 40 MHz OFDMA PPDU are equivalent to two replicas of the possible RU locations in a 20 MHz OFDMA PPDU. In addition, possible RU locations in an 80 MHz OFDMA PPDU are equivalent to two replicas of the possible RU locations in a 40 MHz OFDMA PPDU.

Figure 10:
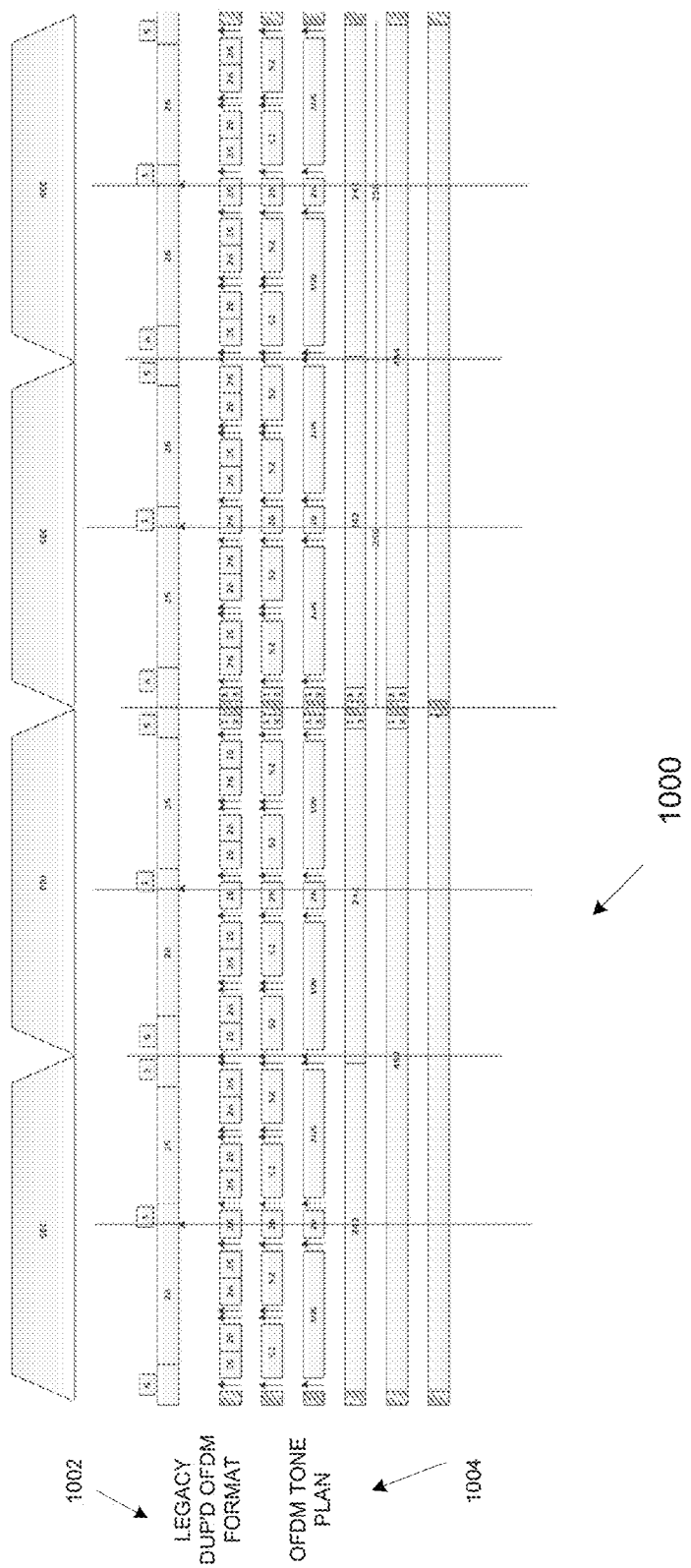
FIG. 10 illustrates an example orthogonal frequency division multiple access (OFDMA) tone plan for a 80 MHz channel comprising resource units (RUs) of different sizes according to illustrative embodiments of the present disclosure.

FIG. 10 illustrates an example orthogonal frequency division multiple access (OFDMA) tone plan for an 80 MHz channel comprising resource units (RUs) of different sizes according to illustrative embodiments of the present disclosure. The embodiment of the OFDMA tone plan for the 80 MHz channel comprising RUs of different sizes illustrated in FIG. 10 is for illustration only. Other embodiments of the OFDMA tone plan for the 80 MHz channel comprising RUs of different sizes could be used without departing from the scope of this disclosure.

As illustrated in FIG. 10, the OFDM tone plan 1000 comprises a legacy duplicated OFDM format 1002 and an OFDMA tone plan 1004. More specifically, FIG. 10 illustrates an OFDMA tone plan for 80 MHz comprising RUs of different sizes and made up of 26 tone RU, 52 tone RU, 106 tone RU, 242 tone RU and 484 tone RU.

In some embodiments, when a segment of the bandwidth is sensed busy, the RUs spanning the channel sensed busy are unused and left empty. Some RUs in the segment adjacent to the channel sensed busy, especially those that are closest to the channel segment sensed busy are also nulled to ensure compliance with spectral masks and out of band emission requirements. Specifically, the amount of nulling in the used channel segment adjacent to the one being left unused depends on the type of RUs used to compose the OFDMA PPDU. An RU is not partially nulled and nulling is always at a RU boundary.

A 26 tones RU that is the closest to the edge of the channel being nulled is the smallest RU size that needs to be nulled or left unused in the used band. That leaves the use of remaining 8 26 tone RUs or a 3 52 tone RUs and 1 106 tone RUs in the used channel segment that is adjacent to the nulled channel. A 242 tone RU or higher sizes of RUs cannot be used in the channel segment adjacent to the nulled channel. An example of this nulling is illustrated in FIG. 11 where a contiguous 60 MHz operation is enabled by nulling RUs is shown.

Figure 11:
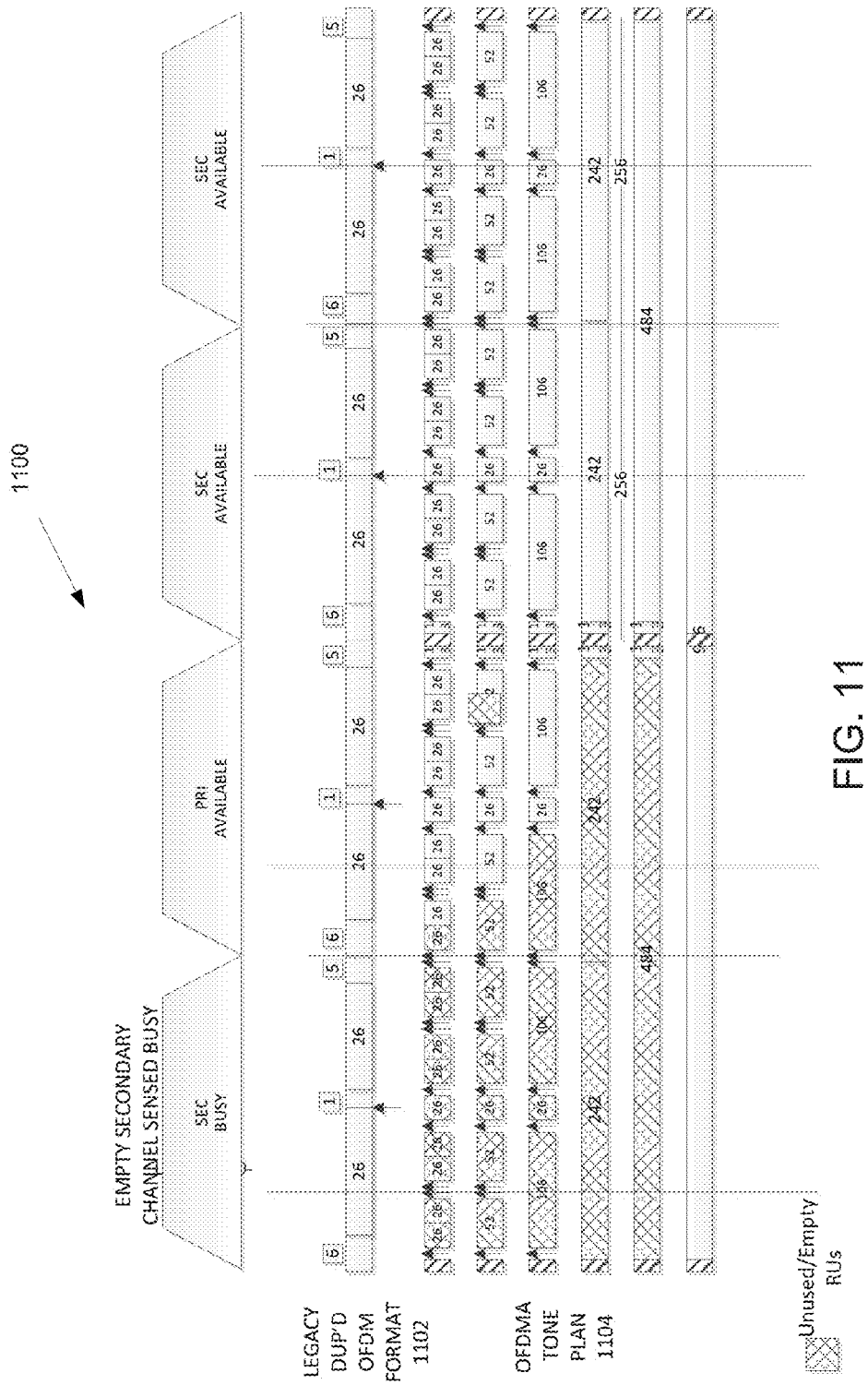
FIG. 11 illustrates an example nulling RUs to enable 20 MHz nulling and enabling contiguous 60 MHz operations in a 80 MHz physical layer convergence procedure protocol data unit (PPDU) according to illustrative embodiments of the present disclosure.

FIG. 11 illustrates an example nulling RUs to enable 20 MHz nulling and enabling contiguous 60 MHz operations in an 80 MHz physical layer convergence procedure protocol data unit (PPDU) according to illustrative embodiments of the present disclosure. The embodiment of the nulling RUs to enable 20 MHz nulling and enabling contiguous 60 MHz operations in the 80 MHz PPDU illustrated in FIG. 11 is for illustration only. Other embodiments of the nulling RUs to enable 20 MHz nulling and enabling contiguous 60 MHz operations in the 80 MHz PPDU could be used without departing from the scope of this disclosure.

As illustrated in FIG. 11, the OFDM tone plan 1100 comprises a legacy duplicated OFDM format 1102 and an OFDMA tone plan 1104. More specifically, as shown in FIG. 11, nulling RUs to enable 20 MHz nulling and enabling contiguous 60 MHz operation in an 80 MHz PPDU RUs to be nulled and not used are indicated as unused empty RUs.

Requirements on the nulling are driven by the need to meet a spectral mask requirement that limits the out of band emissions from the bands being used to the bands that are not used in the immediate adjacency. The spectral mask requirements can be defined or implied. For example, when 20 MHz at the edge of an 80 MHz PPDU is nulled as shown in FIG. 11, the spectral mask requirement for the band adjacent to the nulled segment can be defined by the tightest of the spectral masks corresponding to bandwidths greater than or equal to that being nulled. For example, the requirement for the out of band emissions in the channel adjacent to the nulled channel as shown in FIG. 11 could be meet a 20 MHz spectral mask requirement at the edge of the spectrum.

For some bandwidths, an RU can be split when around DC as shown in the OFDMA tone plan for 80 MHz where a 26 tone RU is split between around the DC tones. When one of the inner secondary 20 MHz segments is to be nulled or left unused because the segment was sensed busy as shown in FIG. 12, then the RU boundary to be maintained may be at the 26 tone unit that straddles the DC.

Figure 12:
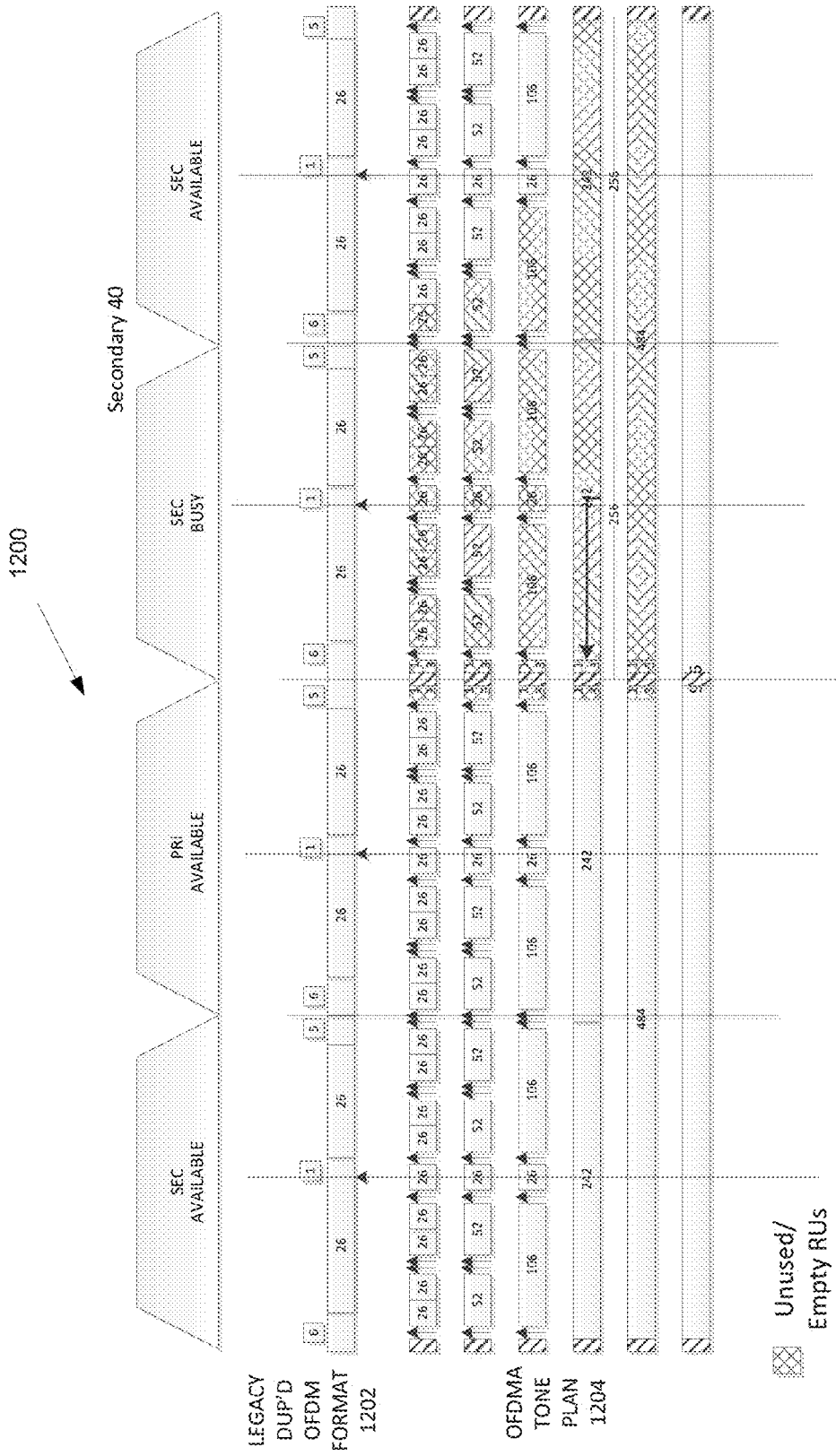
FIG. 12 illustrates another example nulling RUs to enable 20 MHz nulling and enabling contiguous 60 MHz operations in a 80 MHz PPDU according to illustrative embodiments of the present disclosure.

FIG. 12 illustrates another example nulling RUs to enable 20 MHz nulling and enabling contiguous 60 MHz operations in an 80 MHz PPDU according to illustrative embodiments of the present disclosure. The embodiment of the nulling RUs to enable 20 MHz nulling and enabling contiguous 60 MHz operations in the 80 MHz PPDU 1200 illustrated in FIG. 12 is for illustration only. Other embodiments of the nulling RUs to enable 20 MHz nulling and enabling contiguous 60 MHz operations in the 80 MHz PPDU could be used without departing from the scope of this disclosure.

As illustrated in FIG. 12, the OFDM tone plan 1200 comprises a legacy duplicated OFDM format 1202 and an OFDMA tone plan 1204. More specifically, nulling RUs to enable 20 MHz nulling and enabling contiguous 60 MHz operation in an 80 MHz PPDU are shown in FIG. 12. In addition, RUs to be nulled and not used are indicated as unused empty RUs in FIG. 12.

In some embodiments, a primary channel adjacent to a secondary channel sensed busy can use the complete 20 MHz OFDMA numerology all the way up to 242 tone RU and no additional nulling is required beyond the 13 tones at the edge of the segment as illustrated in FIG. 12 to show a discontinuous 60 MHz transmission using an 80 MHz OFDMA PPDU. The requirement for the out of band emissions in the channels can be set based on the tightest of the spectral masks corresponding to the bandwidths that are greater than or equal to that being nulled.

Nulling strategies in the aforementioned embodiments can be combined and used to null two 20 discontinuous 20 MHz segments sensed busy in a 80 MHz channel bandwidth as shown in FIG. 12. The outer and the inner secondary 20 MHz segments may follow their respectively nulling rules and the RUs in the channels adjacent to nulled channels may be nulled based on a 26 tone RU.

Figure 13:
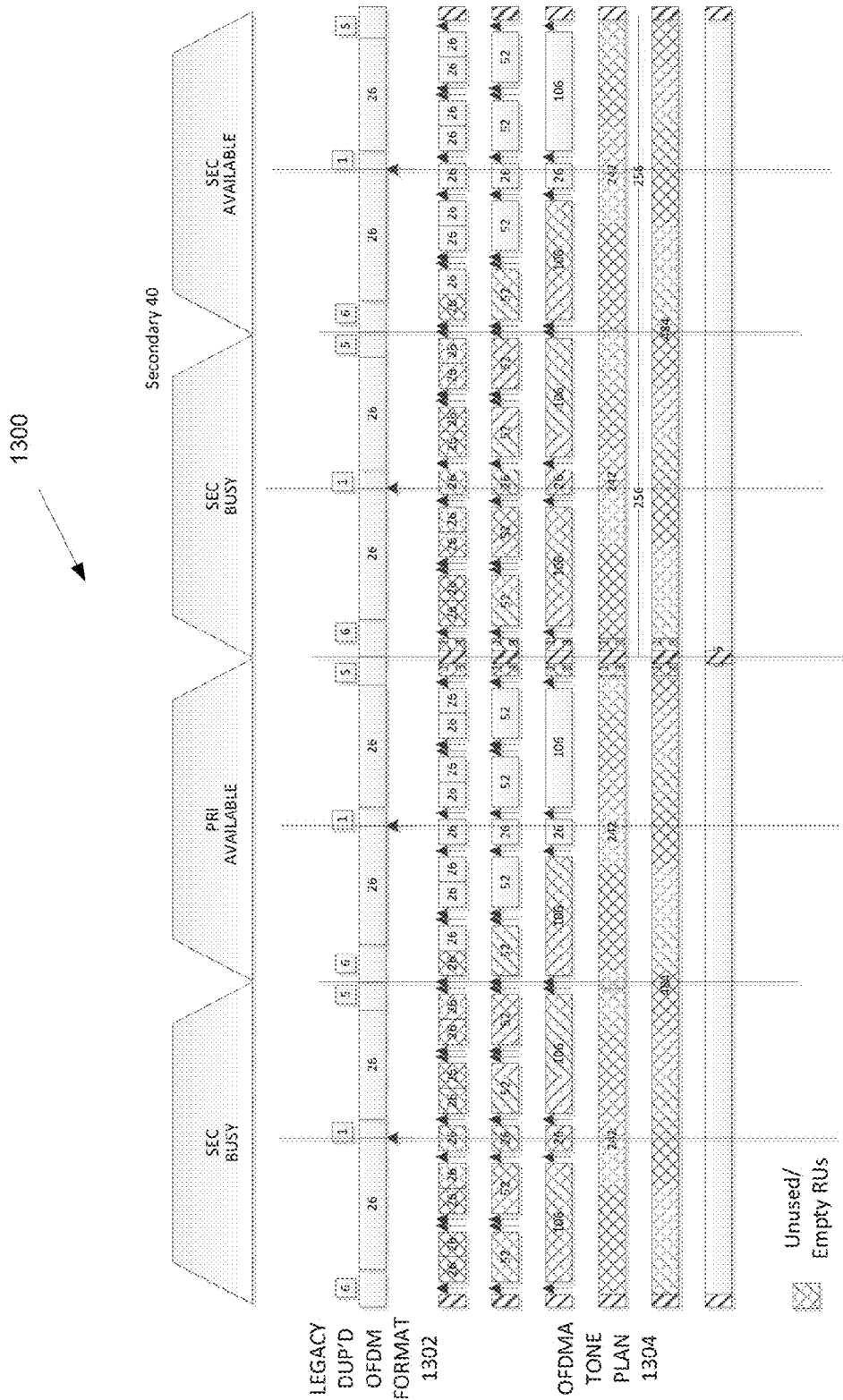
FIG. 13 illustrates an example nulling RUs to enable 40 MHz nulling and enabling contiguous 40 MHz operations in a 80 MHz PPDU according to illustrative embodiments of the present disclosure.

FIG. 13 illustrates an example nulling RUs to enable 40 MHz nulling and enabling contiguous 40 MHz operations in an 80 MHz PPDU according to illustrative embodiments of the present disclosure. The embodiment of the nulling RUs to enable 40 MHz nulling and enabling contiguous 40 MHz operations in the 80 MHz PPDU 1300 illustrated in FIG. 13 is for illustration only. Other embodiments of the nulling RUs to enable 40 MHz nulling and enabling contiguous 40 MHz operations in the 80 MHz PPDU 1300 could be used without departing from the scope of this disclosure.

As illustrated in FIG. 13, the OFDM tone plan 1000 comprises a legacy duplicated OFDM format 1302 and an OFDMA tone plan 1304. More specifically, FIG. 13 illustrates nulling RUs to enable 40 MHz nulling and enabling contiguous 40 MHz operation in an 80 MHz PPDU. RUs to be nulled and not used are indicated as unused empty RUs as shown in FIG. 13.

The channel sensed busy and nulled can be indicated in the physical layer convergence packet preamble. Once the unused channel is indicated, the RUs to be nulled are implicit as are RUs that are to be used in the transmission of the OFDMA PPDU. In one example, information about the channels being nulled can be carried as a bitmap or indicated using a code in the signal fields of the PHY header. Specifically, SIG-A fields could carry the code indicating the channels being left unused.

Figure 14:
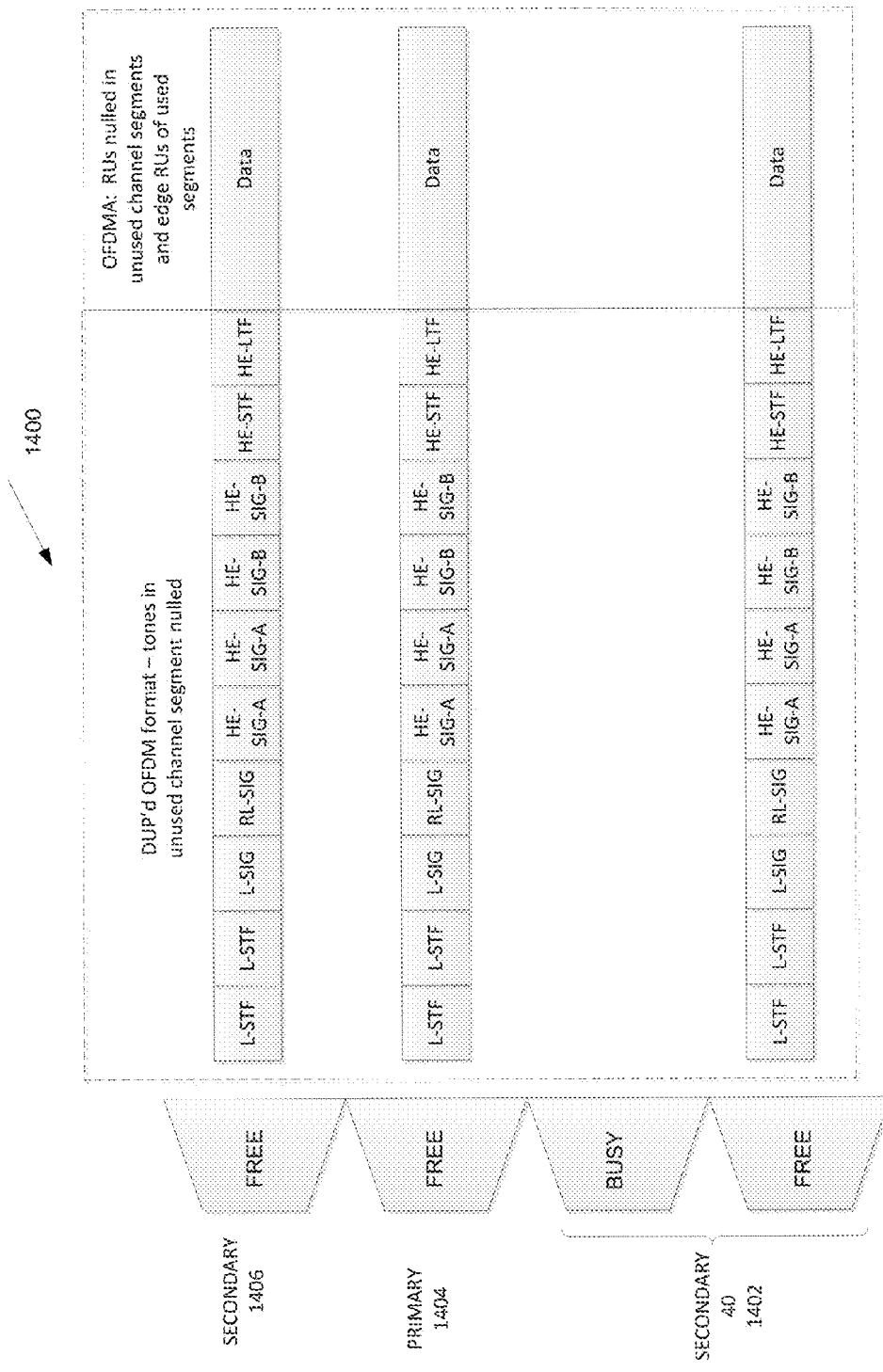
FIG. 14 illustrates an example PPDU transmission with a 60 MHz non-contiguous occupation in a 80 MHz PPDU according to illustrative embodiments of the present disclosure.

FIG. 14 illustrates an example PPDU transmission with a 60 MHz non-contiguous occupation in an 80 MHz PPDU according to illustrative embodiments of the present disclosure. The embodiment of the PPDU transmission with the 60 MHz non-contiguous occupation in the 80 MHz PPDU 1400 illustrated in FIG. 14 is for illustration only. Other embodiments of the 60 MHz non-contiguous occupation in the 80 MHz PPDU 1400 could be used without departing from the scope of this disclosure.

As illustrated in FIG. 14, the PPDU transmission 1400 comprises a secondary 40 channel 1402, a primary channel 1404, and a secondary channel 1406. More specifically, the secondary 40 channel 1402 comprises FREE and BUSY, and the primary channel 1404 and the secondary channel 1406 are FREE.

In some embodiments, a PHY preamble is not carried in the channel being nulled as shown in FIG. 14. The PGY preamble includes the legacy fields such as L-STF, L-SIG, and repeated L-SIG (RL-SIG) as well as the HE-SIGNAL (e.g., HE-SIG-A and HE-SIG-B), HE-STF and HE-LTF fields. Since the legacy and HE-SIGNAL fields are carried in the duplication OFDM format, the tones corresponding to channel segment being unused are nulled.

The bandwidth signaling in HE-SIG-A is constrained in bit width to indicate all combinations of used/unused 20 MHz segments in the PPDU bandwidth. To signal used/unused 20 MHz segments in the 20, 40, 80 and 160 MHz PPDU BW, 7 bits are needed in the bandwidth field. However, there is no room for 7 bits of bandwidth signaling in HE-SIG-A.

In some embodiments, the signaling between HE-SIG-A and HE-SIG-B may be split, specifically using the RU signaling field of the HE-SIG-B common field. It may take advantage of the duplication structure in the HE-SIG-B to signal the unused 20 MHz segments in 80 MHz and 160 MHz PPDU.

Figure 15:
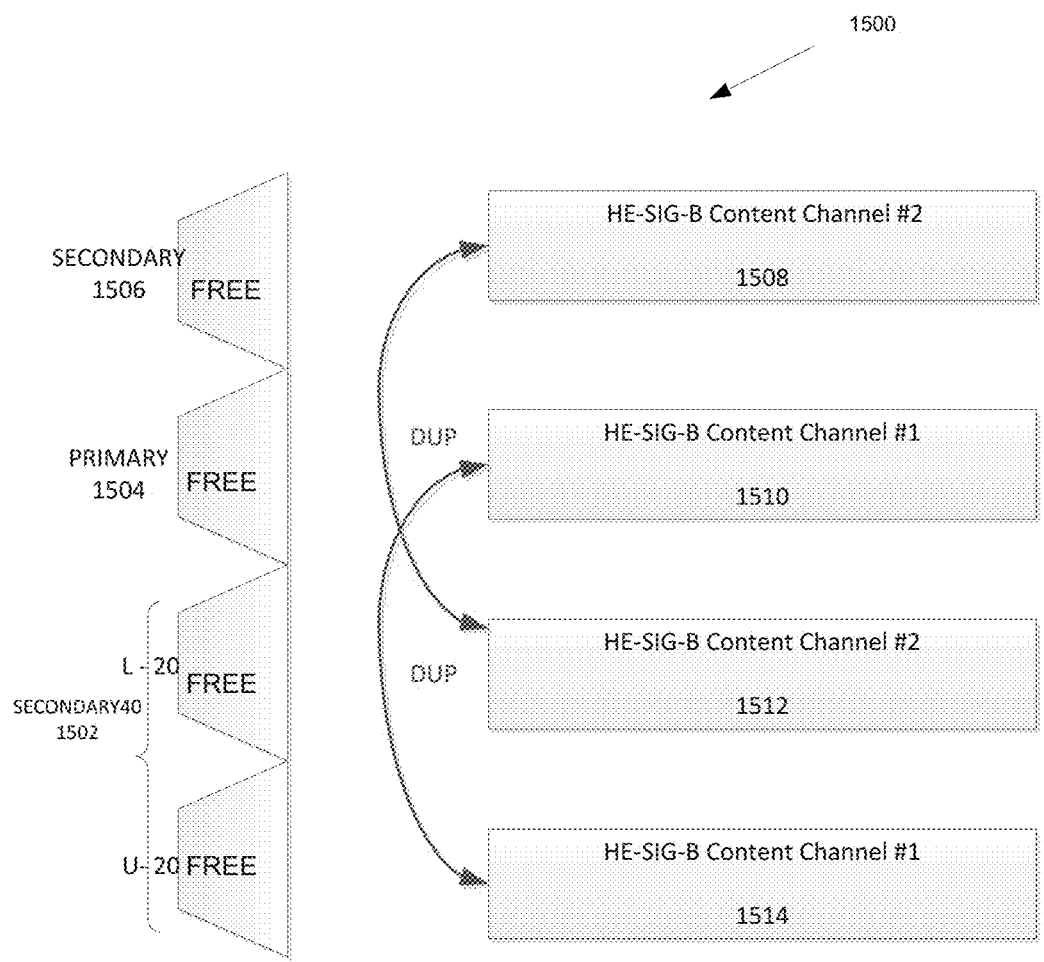
FIG. 15 illustrates an example duplication structure for a high efficiency signaling B (HE-SIG-B) according to illustrative embodiments of the present disclosure.

FIG. 15 illustrates an example duplication structure for a high efficiency signaling B (HE-SIG-B) according to illustrative embodiments of the present disclosure. The embodiment of the duplication structure for the HE-SIG-B 1500 illustrated in FIG. 15 is for illustration only. Other embodiments of the duplication structure for the HE-SIG-B 1500 could be used without departing from the scope of this disclosure.

As illustrated in FIG. 15, the duplication structure 1500 comprises a secondary 40 channel 1502, a primary channel 1504, and a secondary channel 1506. More specifically, the secondary 40 channel 1502 comprises U-20 and L-20. In addition, the duplication structure 1500 comprises HE-SIG-B content channel #2 1508 and 1512, and HE-SIG-B content channel #1 1510 and 1514.

More specifically, the duplication structure 1500 for the HE-SIG-B in the 80 MHz PPDU or primary 80 MHz of a 160 MHz (80+80) PPDU as shown in FIG. 15.

The HE-SIG-B duplication structure 1500 for a 80 MHz and the primary 80 MHz of a 160 MHz (80+80) PPPDU is illustrated in FIG. 15 where the two content channels of the HE-SIG-B are duplicated. In one example, HE-SIG-B content channel #1 1510 and 1514 are carried in the primary and the U-20 (e.g., upper 20 MHz segment) of the secondary 40. In another example, HE-SIG-B content channel #2 1508 and 1512 are carried in the secondary 20 and L-20 (e.g., lower 20 MHz segment) of the secondary 40.

Since the duplicated channels carry the exact same information, as long as one copy of each content channel is received (e.g., when applicable) or the unavailability of one of the content channels is indicated in the bandwidth field, it may be possible to signal the use or disuse of a 20 MHz segment in both 80 MHz and 160 MHz PPDU. The STA may use the indication in the bandwidth field signaled in the HE-SIG-A to decipher both the bandwidth of the PPDU and the location of the content channel that it may decode in the HE-SIG-B.

Since the 160 MHz PPDU uses the same duplication structure over the secondary 80 MHz as the primary 80 MHz, it is sufficient if the availability of the HE-SIG-B content channels in the primary 80 MHz is indicated. The STA does not have to begin processing the 160 MHz PPDU until after decoding HE-SIG-B with this approach.

TABLE 1

3 bit bandwidth signaling sub-field in HE-SIG-A and mapping to the PPDU bandwidth + HE-SIG-B channel indication

| BW Signaling in HE-SIG-A | PPDU Bandwidth | HE-SIG-B Content Channel Indication | | Description |
|---|---|---|---|---|
| | | Content Channel 1 | Content Channel 2 | |
| 000 | 20 MHz | Primary | NA | |
| 001 | 40 MHz | Primary | Secondary | |
| 010 | 80 MHz | Primary | Secondary | |
| 011 | 80 MHz | Primary | 20 MHz in L20 of the Secondary 40 | Secondary channel not used. HE-SIG-B Content channel 2 in secondary is not available. |
| 100 | 80 MHz | Primary | Not available | Secondary channel and L-20 MHz in secondary 40 MHz not used. HE-SIG-B content channel 2 is not transmitted. No change in the size of the RU indication fields for the HE-SIG-B common. |
| 101 | 160 (80 + 80) | Primary | Secondary | |
| 110 | 160 (80 + 80) | Primary | 20 MHz in L20 if the Secondary 40 | Secondary channel not used. HE-SIG-B Content channel 2 in secondary is not transmitted. |
| 111 | 160 (80 + 80) | Primary | Not available | Secondary channel and L- 20 MHz in secondary 40 MHz not used. HE-SIG-B content channel 2 is not transmitted. HE-SIG-B content channel 1 carries information for all 20 MHz segments of secondary 80. |

In some embodiments, the bandwidth signaling sub-field in HE-SIG-A field of a HE-multi-user (MU) PPDU indicates both the PPDU bandwidth being used for OFDMA and availability of the HE-SIG-B content channels. 3 bit bandwidth signaling sub-field in the HE-SIG-A and mapping to the PPDU bandwidth and HE-SIG-B content channel indication is shown in Table 1.

The bandwidth and the content channel indication together tell the STA where the signaling for the OFDMA resource units is carried in the HE-SIG-B. The signaling for both used and unused portions is carried in the HE-SIG-B common portion. Some segments that are unused in the primary 80 MHz are indicated by the bandwidth signaling in HE-SIG-A. For example, when bandwidth signaling field indicates 010 (e.g., indicating that the 80 MHz PPDU is transmitted and all 4 20 MHz segments are occupied), HE-SIG-B content channels are carried in primary and secondary channels with the duplication in secondary 40. When bandwidth signaling field indicates 011 (e.g., the PPDU bandwidth is 80 MHz and the secondary 20 MHz channel is not used), HE-SIG-B content channel 2 is carried in the U-20 MHz segment of the secondary 40.

Further information on the 20 MHz segment (e.g., L-20) used or unused is carried in RU signaling of the HE-SIG-B common channel. When bandwidth signaling field indicates 100 (e.g., the PPDU bandwidth is 80 MHz, and the secondary 20 MHz and U-20 of the secondary 40 is not occupied), the HE-SIG-B content channel 2 is not transmitted; content channel one carries signaling for Primary and L-20 of the secondary 40 which are occupied. In this case, the contents of the HE-SIG-B common don't change (e.g., contains 2

8-bit resource indexing fields for the primary and L-20 of the secondary 40 along with a bit for the center 26 tone RU).

When 111 as shown in Table 1 is signaled, the PPDU is a 160 MHz (80+80) PPDU, where the secondary 20, secondary 40 are not used. All signaling for the primary and the secondary 80 is carried in HE-SIG-B content channel 1 (e.g., the contents of the HE-SIG-B common field change to accommodate signaling for the primary and the 20 MHz segments for the secondary 80 including the center 26 tones).

In some embodiments, the 8-bit RU signaling information signals an unoccupied 20 MHz segment by signaling an unused 242 tone RU. In cases where a specific content channel-2 is signaled empty, the corresponding RU signaling information for the RUs that occupied the same bandwidth as the content channel signaled empty is signaled as unoccupied by transmitting the 8-bit RU signaling information. This information is redundant, but this ensures the signaling structure of the HE-SIG-B remains unaltered.

In some embodiments, the nulling of the RUs on the edge of the occupied bands to align the tone-plan is derived based on the bandwidth signaling in the HE-SIG-A and the 8-bit RU signaling information.

Figure 16:
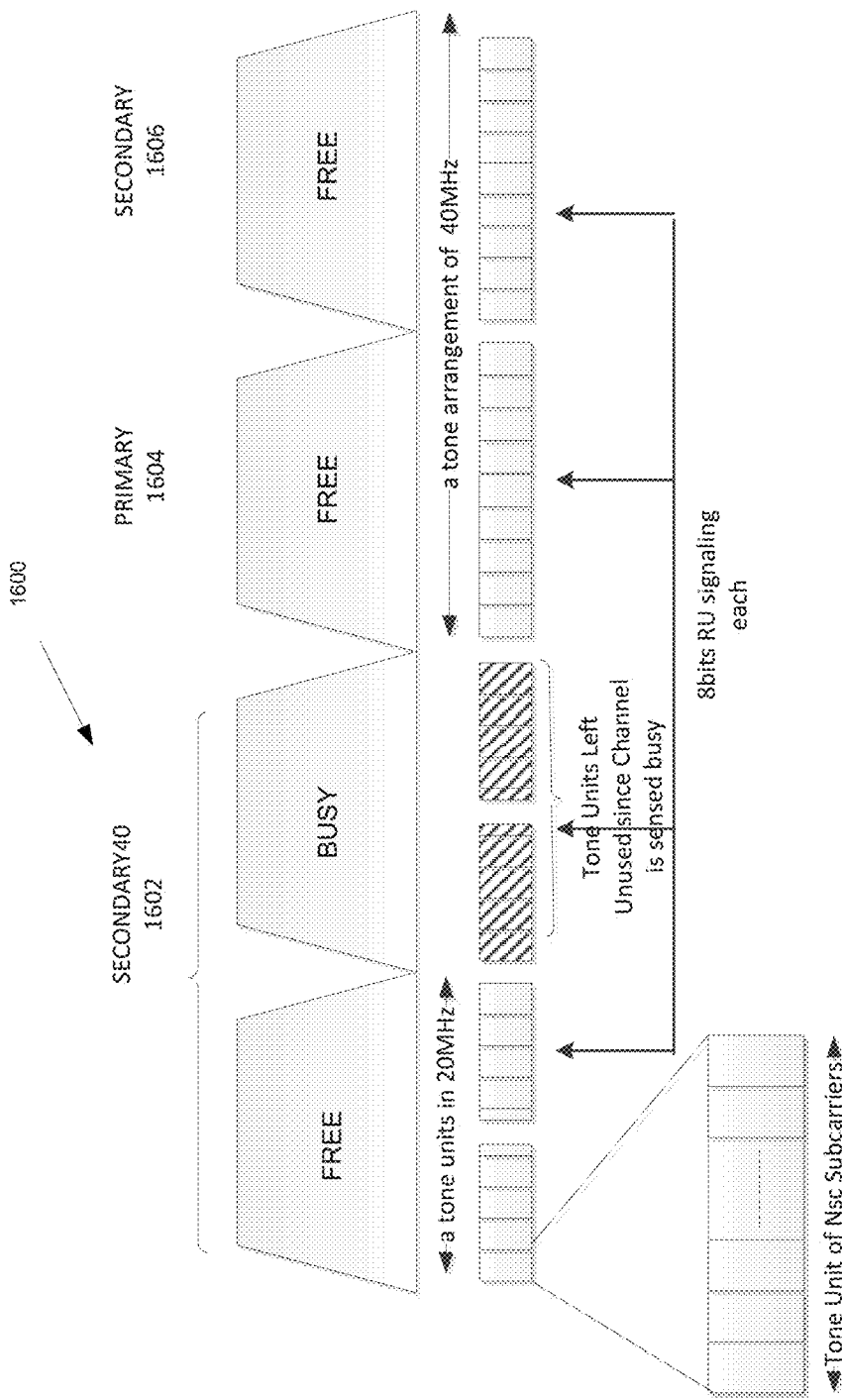
FIG. 16 illustrates an example non-contiguous channel bonding for a 80 MHz PPDU with a 20 MHz tone plan according to illustrative embodiments of the present disclosure.

FIG. 16 illustrates an example non-contiguous channel bonding for an 80 MHz PPDU with a 20 MHz tone plan according to illustrative embodiments of the present disclosure. The embodiment of the non-contiguous channel bonding for the 80 MHz PPDU with the 20 MHz tone plan 1600 illustrated in FIG. 16 is for illustration only. Other embodiments of the non-contiguous channel bonding for the 80 MHz PPDU with the 20 MHz tone plan 1600 could be used without departing from the scope of this disclosure.

As illustrated in FIG. 16, the non-contiguous channel bonding comprises a secondary 40 channel 1602, a primary channel 1604, and a secondary channel 1606. More specifically, the secondary 40 channel 1602 comprises FREE and BUSY, and the primary channel 1604 and the secondary channel 1606 are FREE.

More specifically, the non-contiguous channel bonding for 80 MHz PPDU with 20 MHz tone plan for L20 in Secondary 40 and a 40 MHz tone plan for primary and secondary are shown in FIG. 16.

In some embodiments, when a 20 MHz segment is nulled in the PPDU, the tone plan can be modified to be constructed from constituent tone plans of a smaller bandwidth. For example, the primary and secondary channels that are used may use a 40 MHz tone plan and the 20 MHz used in the secondary 40 may use a 20 MHz tone plan as illustrated in FIG. 16. All 20 MHz segments are indicated using an 8 bit RU arrangement signaling in HE-SIG-B common in the two content channels. The center 26 tone RU indicated is kept as 0 (e.g., indicating non-use).

Figure 17:
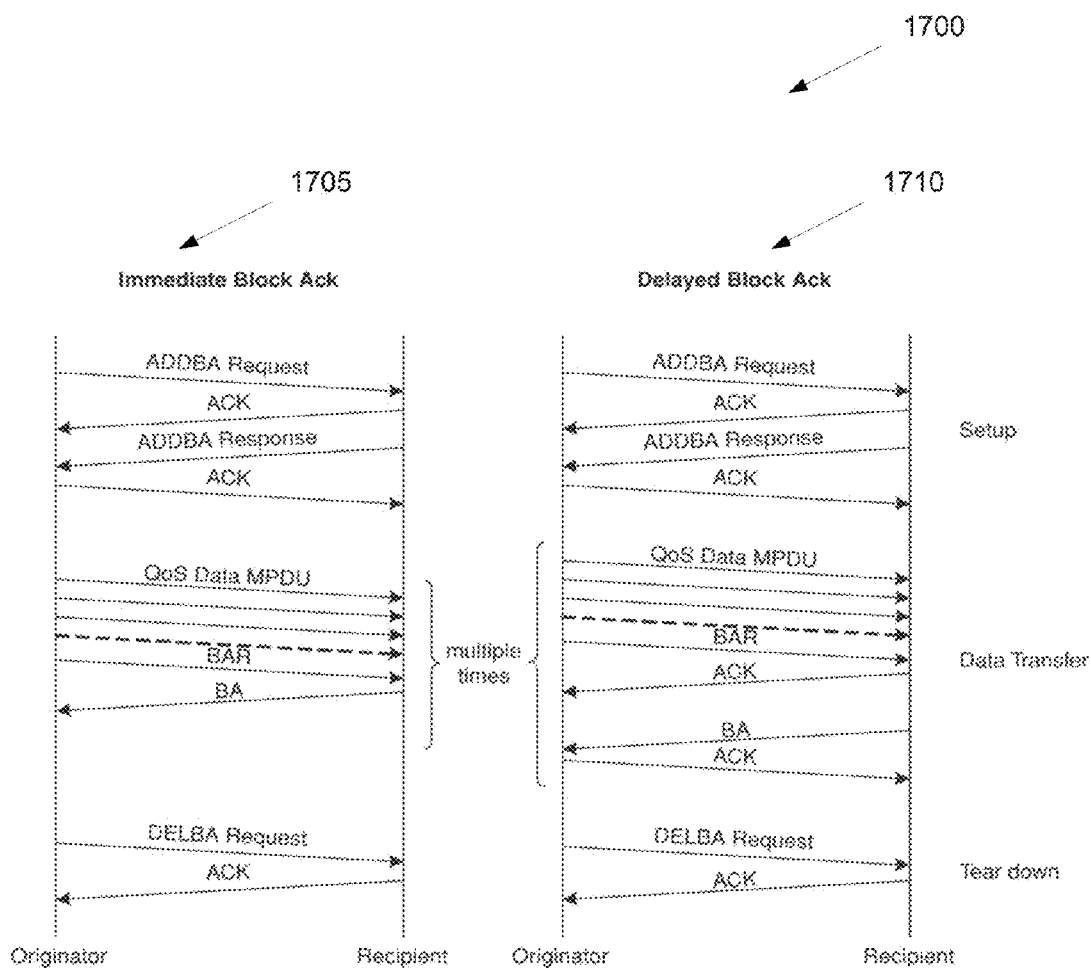
FIG. 17 illustrates an example immediate and delayed block acknowledgement (ACK) according to illustrative embodiments of the present disclosure.

FIG. 17 illustrates an example immediate and delayed block acknowledgement (ACK) 1700 according to illustrative embodiments of the present disclosure. The embodiment of the immediate and delayed block ACK illustrated in FIG. 17 is for illustration only. Other embodiments of the immediate and delayed block ACK could be used without departing from the scope of this disclosure.

The block acknowledgement (BA) mechanism was introduced in the IEEE 802.11e amendment to improve efficiency by allowed the transfer of a block of data frames that are acknowledged with a single BA frame instead of an ACK frame for each of the individual frames. Two types of block ACK as illustrated in FIG. 17 were originally defined: immediate block ACK 1705 and delayed block ACK 1710 which were enhanced to call enhanced immediate block ACK and enhanced delayed block ACK.

All variations of block ACKs are supported by receivers. Immediate and delayed block ACK differs in the handling of the block ACK request (BAR) and block ACK frames during the data transfer phase. With immediate block ACK, the BAR solicits an immediate BA response while with delayed block ACK, the BAR frame is itself acknowledged with an ACK and the BA is returned in a separate channel access.

Stations indicate their ability to support block ACK by setting the immediate block ACK and/or delayed block ACK capability bits in the capability information field in their beacon, association/re-association request and response frames. If a station advertises that it supports one or both flavors of block ACK then a peer station may establish a compatible block ACK session for a particular traffic class with that station. The block ACK session is initiated by the originator sending an add block-ACK (ADDBA) request frame.

In response to a correctly received ADDBA request, the responder sends an ACK. After further processing, the responder sends the ADDBA response frame to with the originator responds with an ACK if correctly received. The ADDBA request/response frame exchange sets the context for the BA exchange, for example, block ACK policy, TID, buffer size, A-MSDU supported, block ACK timeout value and start sequence number. The responder may reject a block ACK session from an originator by sending a delete block-ACK (DELBA) frame to the initiator after acknowledging receipt of the ADDBA request.

During the data transfer phase, the originator may transmit a block of QoS data frames either as a burst, separated by short inter-frame space (SIFS) or reduced inter-frame space (RIFS), or as part of an aggregate medium access control protocol data unit (A-MPDU). Each QoS data frame in the block has each QoS data frame's ACK policy set to BA. The data block may be wholly contained within a single transmit opportunity (TXOP) or the data lock may straddle multiple TXOPs. The data block and TXOP are not coupled in any way.

After transferring the data block, the originator sends a BAR frame. This frame includes a starting sequence number (SSN) which is the sequence number of the oldest MSDU in the block for which acknowledgement is needed. On receiving the BAR, the recipient performs two functions. First, the originator prepares a BA response as a bitmap where the first bit represents the MPDU with the same sequence number as the starting sequence number from the BAR frame and subsequent bits indicate successive sequence numbers. The bitmap thus forms an array indexed by sequence number with the starting sequence number as the starting reference.

Second, the originator examines the bitmap reorder buffer for MPDUs with sequence numbers that precede the starting sequence number value. These MPDUs are either reassembled into complete MSDUs and forwarded to the higher layers or discarded if complete MSDUs cannot be created. When the originator has no additional data to send and the final block ACK exchange has completed, the originator may disable the block ACK session by sending a DELBA frame to the recipient. The recipient sends an ACK in response and releases any resources allocated for the block ACK session.

The original BA frame was defined with a 1024 bit bitmap to support 64 MAC service data units (MSDUs) each of which can be fragmented with up to 16 fragments. At higher rates, fragmentation does not provide much benefit. IEEE 802.11n introduced a compressed BA variant that does away with the 16 bits per MSDU for fragmentation resulting in a 64 bit bitmap (e.g., 8 octets). This reduces both the over-the-air overhead and the memory requirements in the recipient.

The block ACK mechanism defined in the IEEE 802.11e amendment is referred to as full state block ACK to distinguish the full state block ACK from partial state block ACK, introduced in IEEE 802.11n amendment. Under full state block ACK, the recipient maintains an ACK state for each block ACK session and records the ACK state of up to 64 MSDUs. And a window is defined by a beginning sequence number WinStart, an ending sequence number WinEnd and an extent WinSize. The establishment of a block ACK session, the window is initialized to the starting sequence number provided in the ADDBA request.

When QoS data arrives, if the sequence number falls within the space represented by the window, then the recipient may update the appropriate sequence number with in the window with the status of the QoS data. If the sequence number falls outside the window, then the recipient will shift the window to the right until it includes the new sequence number. Upon receiving a BAR, the window contents from the sequence number indicated in the BAR is returned in the BA frame.

The original block ACK mechanism required the window to persist for the duration of the block ACK session. This burdens the recipient implementation with the need to maintain state for all active block ACK sessions and in practice with the low latency required to produce a BA in response to BAR, this means using expensive on-chip memory.

The partial state block ACK maintains state memory of the most recently active block ACK session. On-chip memory reserved for block ACK state may be reused by different block ACK sessions thus making the state memory more similar to a cache. On receiving a QoS data frame with sequence number (SN), the recipient checks to see if it has a record of the block ACK window for that block ACK session where a session is identified by the transmit address (TA) and the TID. If not, it creates a block ACK window for that session. The correct reception of the data frame is recorded by setting a 1 in the position representing SN.

The major difference between partial state and full state block ACK operation is the transient nature of the state window maintained by the recipient. Under partial state block ACK, the originator may ensure that the originator retrieves the ACK state with high probability before another station has a chance to send data to the recipient and potentially erase the session's ACK state table. In practice, this means that the originator may attempt to retrieve the block ACK window state before the end of each TXOP.

Figure 18:
FIG. 18 illustrates an example block ACK request frame format according to illustrative embodiments of the present disclosure.

FIG. 18 illustrates an example block ACK request frame format 1800 according to illustrative embodiments of the present disclosure. The embodiment of the block ACK request frame format illustrated in FIG. 18 is for illustration only. Other embodiments of the block ACK request frame format 1800 could be used without departing from the scope of this disclosure. The format for the block ACK request in the IEEE 802.11n consists of 24 octets with 7 fields as shown in FIG. 18.

As illustrated in FIG. 18, the block ACK request frame format 1800 comprises a frame control field 1805, a duration field 1810, a receiver address (RA) field 1815, a transmitter address (TA) field 1820, a BAR control field 1825, a starting sequence control field 1830, and a frame check sequence (FCS) field 1835.

Figure 19:
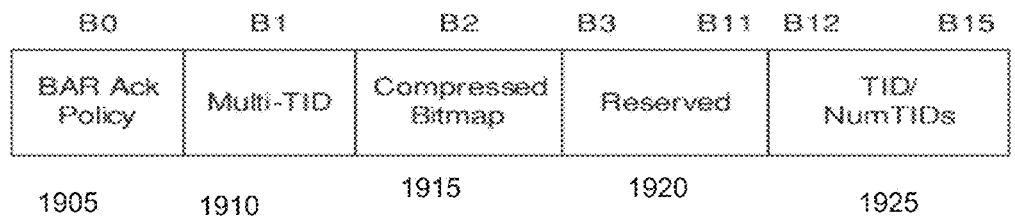
FIG. 19 illustrates an example block ACK request control format according to illustrative embodiments of the present disclosure.

FIG. 19 illustrates an example block ACK request control format 1900 according to illustrative embodiments of the present disclosure. The embodiment of the block ACK request control format 1900 illustrated in FIG. 19 is for illustration only. Other embodiments of the block ACK request control format 1900 could be used without departing from the scope of this disclosure. The block ACK control format fields contain two octets whose fields are populated as shown in FIG. 19.

As illustrated in FIG. 19, the block ACK request control frame format 1900 comprises a BAR ACK policy field 1905, a Multi-TID field 1910, a compressed bitmap field 1915, a reserved field 1920, and a traffic identifier (TID)/NumTIDs field 1925.

Figure 20:
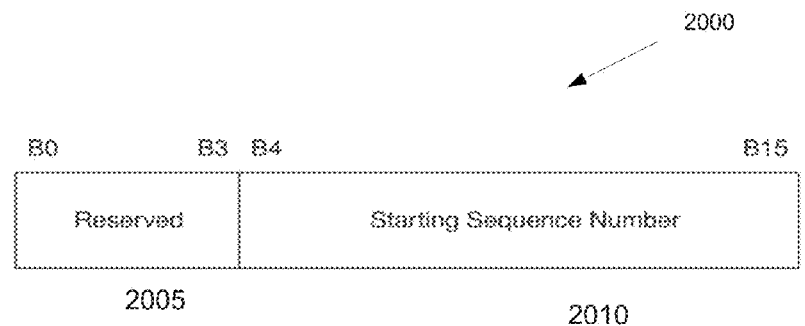
FIG. 20 illustrates an example starting sequence control format according to illustrative embodiments of the present disclosure.

FIG. 20 illustrates an example starting sequence control format 2000 according to illustrative embodiments of the present disclosure. The embodiment of the starting sequence control format 2000 illustrated in FIG. 20 is for illustration only. Other embodiments of the starting sequence control format 2000 could be used without departing from the scope of this disclosure. As illustrated in FIG. 20, the starting sequence control format 2000 comprises a reserved field 2005 and a starting sequence number 2010.

The starting sequence control field contains the starting sequence number in the two octets follow the block ACK Control as shown in FIG. 20.

Figure 21:
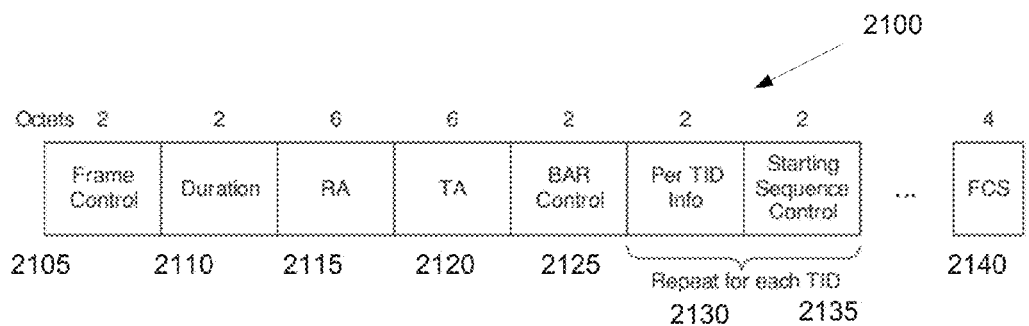
FIG. 21 illustrates an example multi traffic indicator block ACK request (multi-TID BAR) frame format according to illustrative embodiments of the present disclosure.

FIG. 21 illustrates an example mini traffic indicator block ACK request (TID BAR) frame format 2100 according to illustrative embodiments of the present disclosure. The embodiment of the mini TID BAR frame format 2100 illustrated in FIG. 21 is for illustration only. Other embodiments of the mini TID BAR frame format 2100 could be used without departing from the scope of this disclosure.

As illustrated in FIG. 21, the mini traffic indicator block ACK request 2100 comprises a frame control field 2105, a duration field 2110, a receiver address (RA) field 2115, a transmitter address (TA) field 2120, a BAR control field 2125, a per TID info field 2130, and a starting sequence control field 2135, and a frame check sequence (FCS) field 2140.

A variant of the BAR frame called the multi-traffic indicator (Multi-TID) BAR is used under power save multi-poll (PSMP) scheduling and the Multi-TID BAR frame format is shown in FIG. 21.

Figure 22:
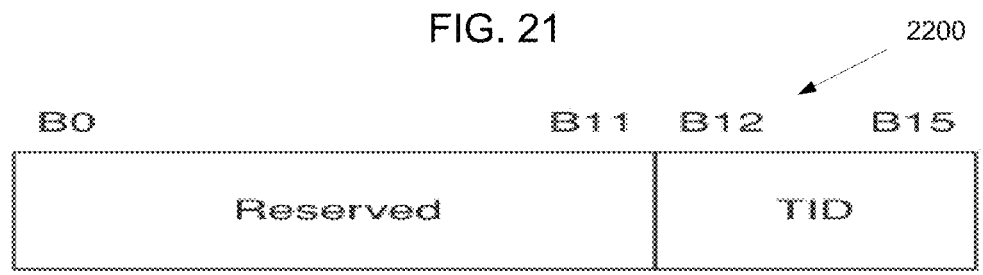
FIG. 22 illustrates an example per TID information filed according to illustrative embodiments of the present disclosure.

FIG. 22 illustrates an example per TID information filed 2200 according to illustrative embodiments of the present disclosure. The embodiment of the per TID information filed 2200 illustrated in FIG. 22 is for illustration only. Other embodiments of the per TID information filed 2200 could be used without departing from the scope of this disclosure.

As illustrated in FIG. 22, the per TID information field 2200 comprises a reserved field 2205 and a TID field 2210.

The Multi-TID BAR frame is identified by the multi-TID BAR being a control frame of subtype BAR and having the Multi-TID and compressed bitmap fields set in the BAR control field. The TID/NumTIDs field in the BAR control field is set to indicate the number of TIDs for which this Multi-TID BAR applies. For each TID, there is a per TID info and starting sequence control field as shown in FIG. 22.

Figure 23:
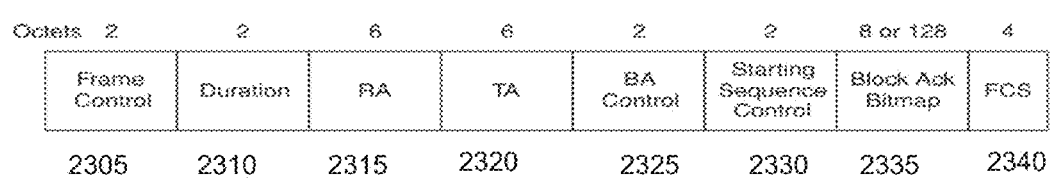
FIG. 23 illustrates an example basic block acknowledgement (BA) frame according to illustrative embodiments of the present disclosure.

FIG. 23 illustrates an example basic block acknowledgement (BA) frame 2300 according to illustrative embodiments of the present disclosure. The embodiment of the basic BA frame 2300 illustrated in FIG. 23 is for illustration only. Other embodiments of the basic BA frame 2300 according could be used without departing from the scope of this disclosure.

As illustrated in FIG. 23, the basic BA frame 2300 comprises a frame control field 2305, a duration field 2310, a receiver address (RA) field 2315, a transmitter address (TA) field 2320, a BAR control field 2325, a starting sequence control field 2330, a block ACK bitmap field 2335, and a frame check sequence (FCS) field 2340.

The format of the basic block ACK or BA frame is shown in FIG. 23. The RA field 2315 is set to the address of the originator taken from the TA address of the BAR or QoS data frame that solicited the BA.

Figure 24:
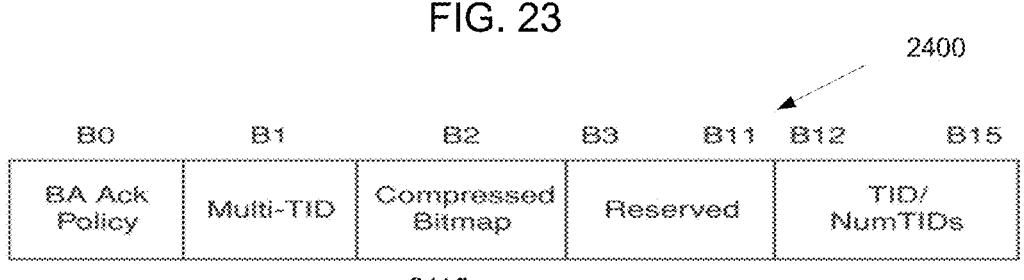
FIG. 24 illustrates an example BA control format according to illustrative embodiments of the present disclosure.

FIG. 24 illustrates an example BA control format 2400 according to illustrative embodiments of the present disclosure. The embodiment of the BA control format 2400 illustrated in FIG. 24 is for illustration only. Other embodiments of the BA control format 2400 could be used without departing from the scope of this disclosure.

As illustrated in FIG. 24, the BA control format 2400 comprises a BA ACK policy field 2405, a Multi-TID field 2410, compressed bitmap field 2415, a reserved field 2420, and a TID/NumTIDs field 2425.

The TA field is the address of the recipient. The BA control field shown in FIG. 24 indicates the BA ACK policy which indicates if a normal acknowledgement is required for the BA frame. For example, when set to 1, the BA may not solicit an ACK response. The Multi-TID field 2410 is set to 0 in the basic BA frame. The compressed bitmap field 2415 when set to 1, indicates that the BA frame contains the compressed 8 octet block ACK bitmap. The TID/NumTIDs field 2425 indicates the TID for which this BA frame applies in the case of a basic BA frame. The starting sequence number of the first MSDU for which this BA is sent is indicated in the starting sequence control. If the BA was solicited by a BAR frame, then the starting sequence number matches that in the BAR frame.

Figure 25:
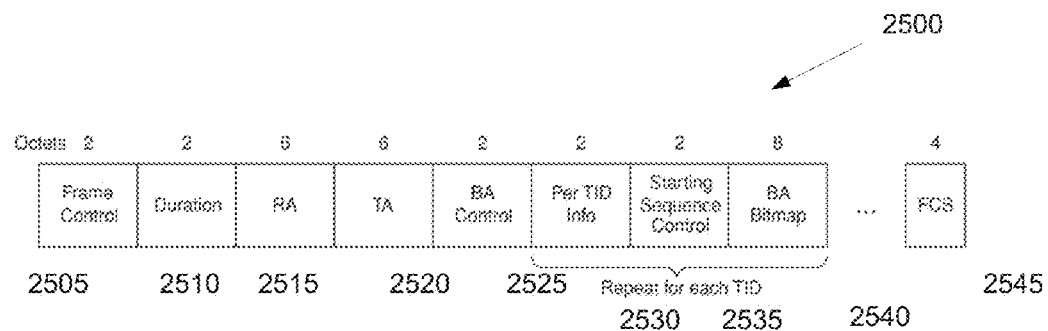
FIG. 25 illustrates an example multi-TID BA frame according to illustrative embodiments of the present disclosure.

FIG. 25 illustrates an example multi-TID BA frame 2500 according to illustrative embodiments of the present disclosure. The embodiment of the multi-TID BA frame 2500 illustrated in FIG. 25 is for illustration only. Other embodiments of the multi-TID BA frame 2500 could be used without departing from the scope of this disclosure.

As illustrated in FIG. 25, the multi-TID BA frame 2500 comprises a frame control field 2505, a duration field 2510, a receiver address (RA) field 2515, a transmitter address (TA) field 2520, a BAR control field 2525, a per TID info field 2530, a starting sequence control field 2535, a BA bitmap field 2540, and a frame check sequence (FCS) field 2545.

The multi-TID BA is a variant of the BA used under PSMP. The format of the multi-TID BA frame is shown in FIG. 25. The RA field 2515 is set to the address of the originator taken from the TA address of the multi-TID BAR or QoS Data frames that solicited the multi-TID BA. The TA field 2520 contains the address of the recipient station sending the multi-TID BA. The BA control is two octets and carries the BA ACK policy, multi-TID, compressed bitmap and NumTIDs indication.

The acknowledgement procedure performed by a STA that receives MPDUs that were transmitted within a VHT MU PPUD is the same as the acknowledgement procedure for MPDUs that were not transmitted within a VHT MU PPDU i.e., responses to A-MPDUs within a VHT MU PPDU that are not immediate responses to the VHT MU PPDU are transmitted in response to explicit BAR frames by the AP.

Figure 26:
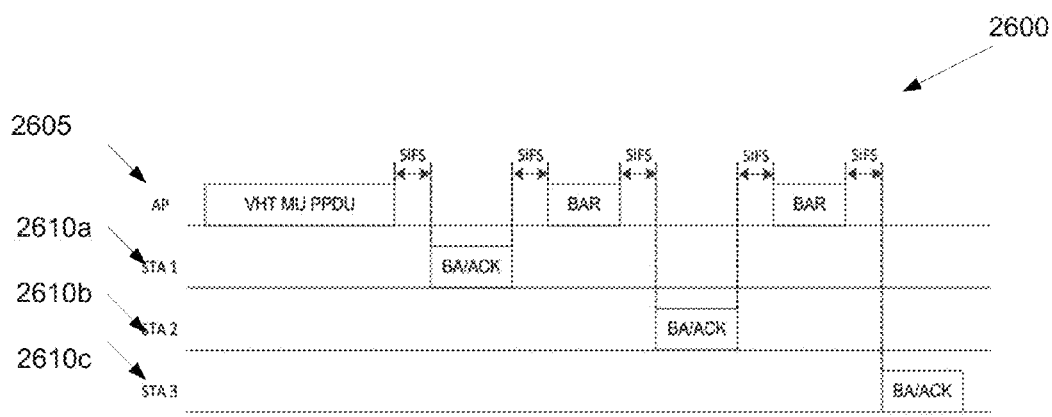
FIG. 26 illustrates an example transmit opportunity (TXOP) with very high throughput multi user physical protocol data unit (VHT MU PPDU) according to illustrative embodiments of the present disclosure.

FIG. 26 illustrates an example transmit opportunity (TXOP) with very high throughput multi user physical protocol data unit (VHT MU PPDU) 2600 according to illustrative embodiments of the present disclosure. The embodiment of the TXOP with VHT MU PPDU 2600 illustrated in FIG. 26 is for illustration only. Other embodiments of the TXOP with the VHT MU PPDU 2600 could be used without departing from the scope of this disclosure.

As illustrated in FIG. 26, the TXOP with VHT MU PPDU comprises an AP 2605 and STAs 2610a, 2610b, and 2610c. The AP 2605 transmit downlink signal to the STAs 2610a, 2610b, and 2610c in a cell.

Figure 27:
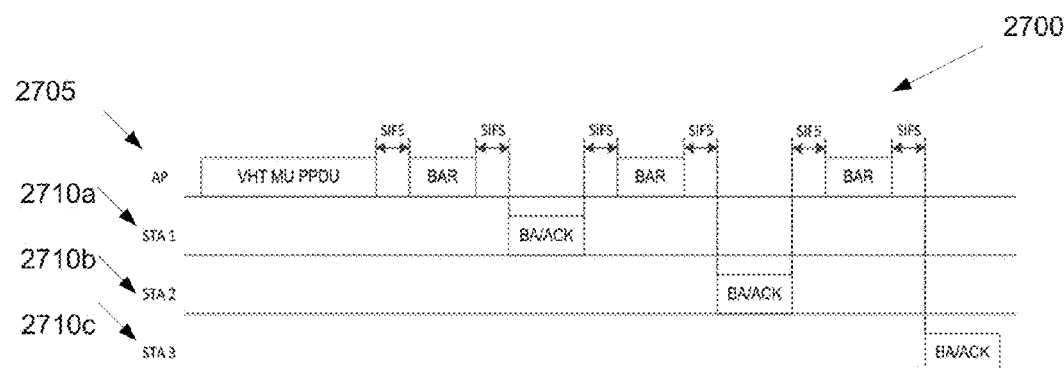
FIG. 27 illustrates an example TXOP with VHT MU PPDU with no immediate acknowledgement to the VHT MU PPDU according to illustrative embodiments of the present disclosure.

FIG. 27 illustrates an example TXOP with VHT MU PPDU with no immediate acknowledgement to the VHT MU PPDU 2700 according to illustrative embodiments of the present disclosure. The embodiment of the TXOP with VHT MU PPDU with no immediate acknowledgement to the VHT MU PPDU 2700 illustrated in FIG. 27 is for illustration only. Other embodiments of the TXOP with VHT MU PPDU with no immediate acknowledgement to the VHT MU PPDU 2700 could be used without departing from the scope of this disclosure.

As illustrated in FIG. 27, the TXOP with VHT MU PPDU with no immediate ACK comprises an AP 2705 and STAs 2710a, 2710b, and 2710c. The AP 2705 transmit downlink signal to the STAs 2710a, 2710b, and 2710c in a cell.

Examples of VHT MU PPDU frame exchange sequences are shown in FIG. 26 and FIG. 27. All MPDUs transmitted within a VHT MU PPDU are contained within A-MPDUs and the rules prevent an immediate response to more than one A-MPDU.

Figure 28:
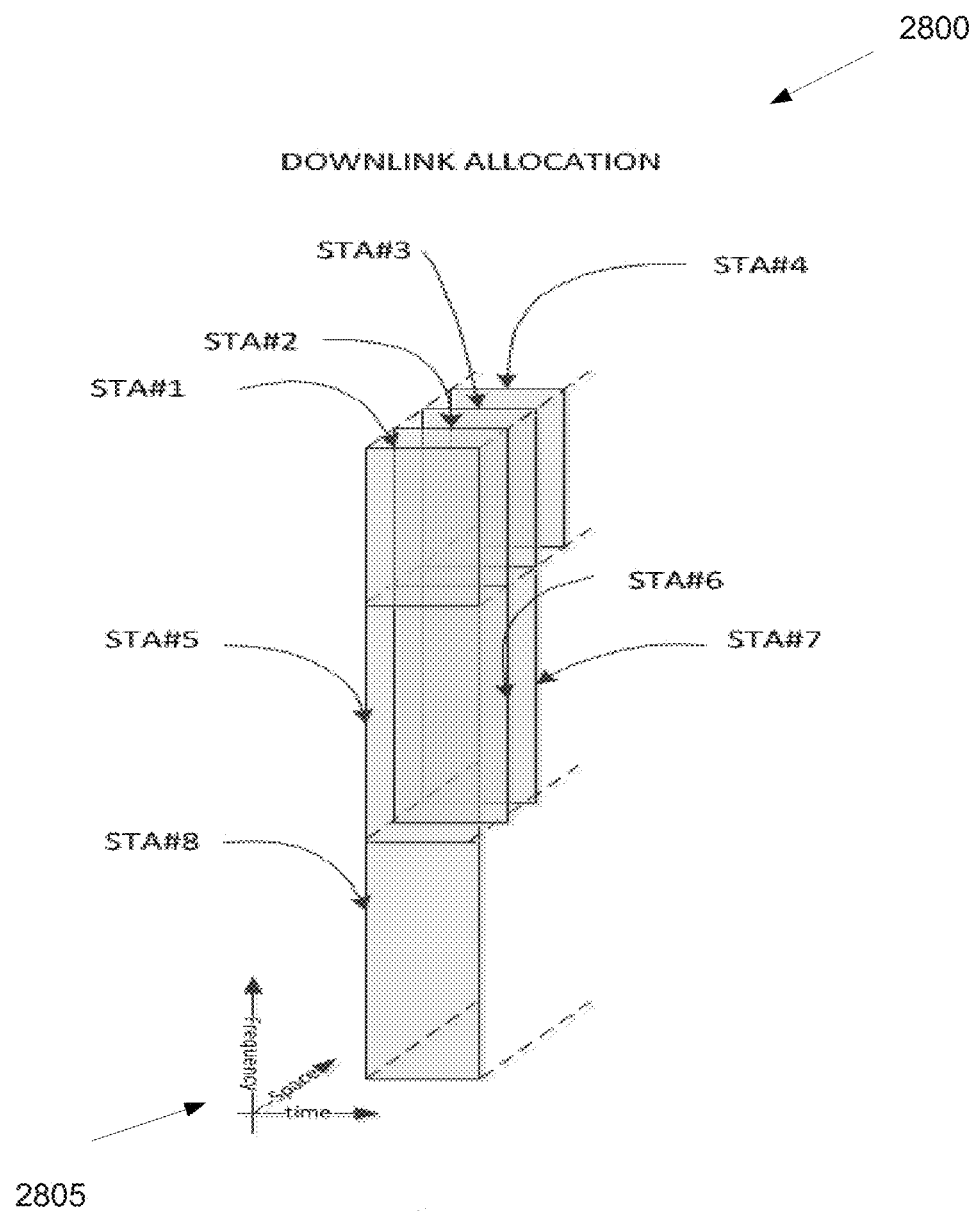
FIG. 28 illustrates an example orthogonal frequency division multiple access (OFDMA) and multi-user multi input multi output (MU-MIMO) transmission in a frame according to illustrative embodiments of the present disclosure.

FIG. 28 illustrates an example orthogonal frequency division multiple access (OFDMA) and multi-user multi input multi output (MU-MIMO) transmission in a frame 2800 according to illustrative embodiments of the present disclosure. The embodiment of the OFDMA and MU-MIMO transmission in the frame 2800 illustrated in FIG. 28 is for illustration only. Other embodiments of the OFDMA and MU-MIMO transmission in the frame 2800 could be used without departing from the scope of this disclosure.

As illustrated in FIG. 28, the OFDMA and the MU-MIMO transmission comprise 3 dimensional resources 2805. More specifically, the 3 dimensional resources 2805 comprise a frequency, a space and a time.

The IEEE 802.11ac did not change the BA procedure from earlier versions of the IEEE 802.11 wireless communication standard likely because the solution could be scaled without losing inefficiency to a small number of users. However, IEEE 802.11ax is considering using OFDMA/MU-MIMO to allow multiplexing users much larger than 4. Both downlink and uplink MU-MIMO and OFDMA transmission is allowed as shown in FIG. 28.

In some embodiments, a new ACK transmission may be used to accommodate OFDMA/MU-MIMO with arbitrary number of users. Given the partial state operation of the ACK mechanism, it is critical to recover the block acknowledgements as quickly as possible before the MPDU lifetime expires. So, an implicit block ACK transmission may be used to enable based on resource allocation and MCS used in the downlink.

Constraining BA to fit into extended interframe spacing (EIFS) duration is necessary to ensure protection from legacy device transmission. EIFS is defined in accordance with the equation (2) given:

$$EIFS = aSIFStime + DIFS + (Estimated)ACKTxTime \quad \text{Equation (2)}$$

The IEEE 802.11 specifications indicate that the estimated ACKTxTime to be no greater than 68 microsecond (μs) to ensure legacy protection. That is the time within which a STA can respond with a BA to a received MSDU within the same TXOP. It is possible that this limit on ACKTxTime may not be exceeded. A desirable feature of the ACKTx Time limit is that it imposes a clear limit on the expected padding at each STA involved when the BA/ACK is transmitted in response to DL MU data using uplink OFDMA. Therefore it is natural that BA/ACK transmission on UL MU from all STAs may end at the same time and 68 μs of ACKTxTime is a good upper limit on the transmission while maintaining efficient padding and multiplexing constraints. Therefore, it may be considered that UL MU ACKTxTime is set to 68 μs for all implicit responses within a TXOP.

The ACKTxTime on the uplink in response to DL MU transmissions depends on the modulation and coding scheme (MCS), resource block size and the format of the BA used. It may be possible that all three parameters to ensure legacy protected BA transmission are used. The MCS and resource block size are a tuple that decides the dimensioning of the ACK resource. The ACK resource is dimensioned such that with the MCS and resource block size used. The ACKTxTime does not exceed 68 μs. The BA format also can be adjusted or optimized to improve resource utilization and meet the ACKTxTime limit.

In one embodiment, the STA can transmit BA/ACK on the uplink using the same frequency resource allocation as data in the DL MU transmissions. The frequency resources are not separately signaled. These conditions and cases for which the BA can be transmitted within the estimated ACK time of 68 μs depend on the MCS and resource block size used in the downlink and may depend on whether the QoS flag fields in the MAC header are set for implicit ACK or not.

If the STA receives a DL MPDU using resource units in a DL MU transmission and the QoS flags are set for an implicit ACK in the MAC header, it can transmit the BA/ACK using the same frequency resource used for the DL MU PPDU meant for the STA such that the ACKTxTime does not exceed 68 μs.

In one embodiment, the STAs can mirror the transmission strategy used by the data on the downlink to transmit BA/ACK on the uplink within the same TXOP. When transmitting the ACK/BA, the STA checks if the QoS flags in the MAC header are set for an implicit ACK or not. The transmission on the uplink is configured based on the resources used by the DL data it is acknowledging. In one example, the RU used for UL BA/ACK transmission can be the same as that used by the data it is acknowledging. In another example, the MCS for the UL BA/ACK is the same as the MCS used for the data in the DL. In yet another example, NSS=1 is used to ensure improved diversity protection for the ACK compared to data irrespective of the NSS used for the data. In addition, STBC can be considered for transmitting the UL BA/ACK as well. Using the same resources as the downlink enables the UL BA/ACK transmission to leverage DL/UL channel reciprocity.

Figure 29:
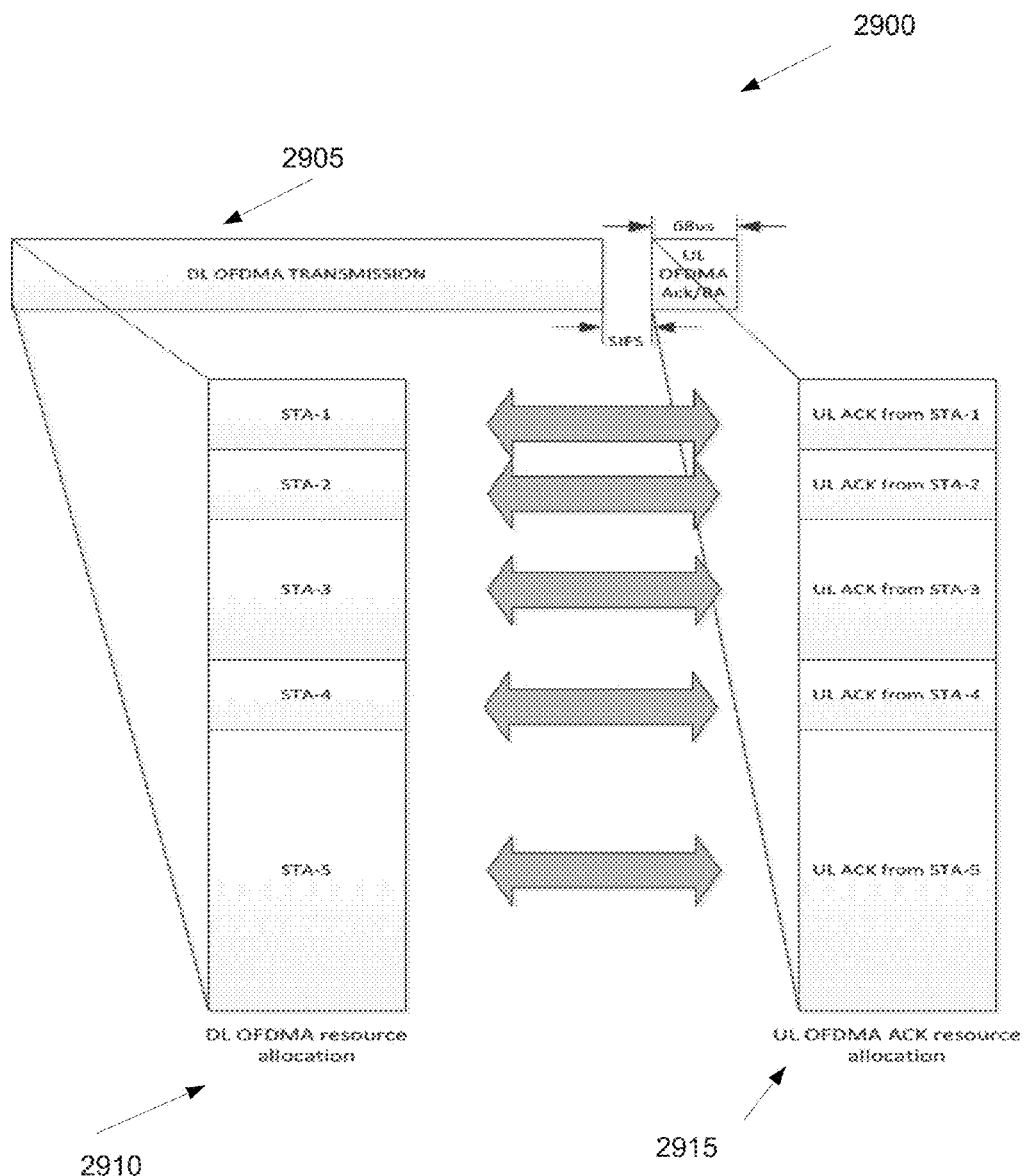
FIG. 29 illustrates an example mapping uplink (UL) resources based on downlink (DL) resource unit (RU) allocation according to illustrative embodiments of the present disclosure.

FIG. 29 illustrates an example mapping uplink (UL) resources based on downlink (DL) resource unit (RU) allocation 2900 according to illustrative embodiments of the present disclosure. The embodiment of the mapping UL resources based on DL resource unit (RU) allocation 2900 illustrated in FIG. 29 is for illustration only. Other embodiments of the mapping UL resources based on DL RU allocation 2900 could be used without departing from the scope of this disclosure.

As illustrated in FIG. 29, the UL resources based on DL RU 2900 comprises a DL OFDMA transmission 2905, a DL OFDMA resource allocation 2910, and a UL OFDMA ACK resource allocation. The DL OFDMA resource allocation 2910 is allocated to a plurality of STAs in a cell. The UL OFDMA ACK resource allocation provides resources to the STAs that may transmit UL ACK to an AP in the cell.

Figure 30:
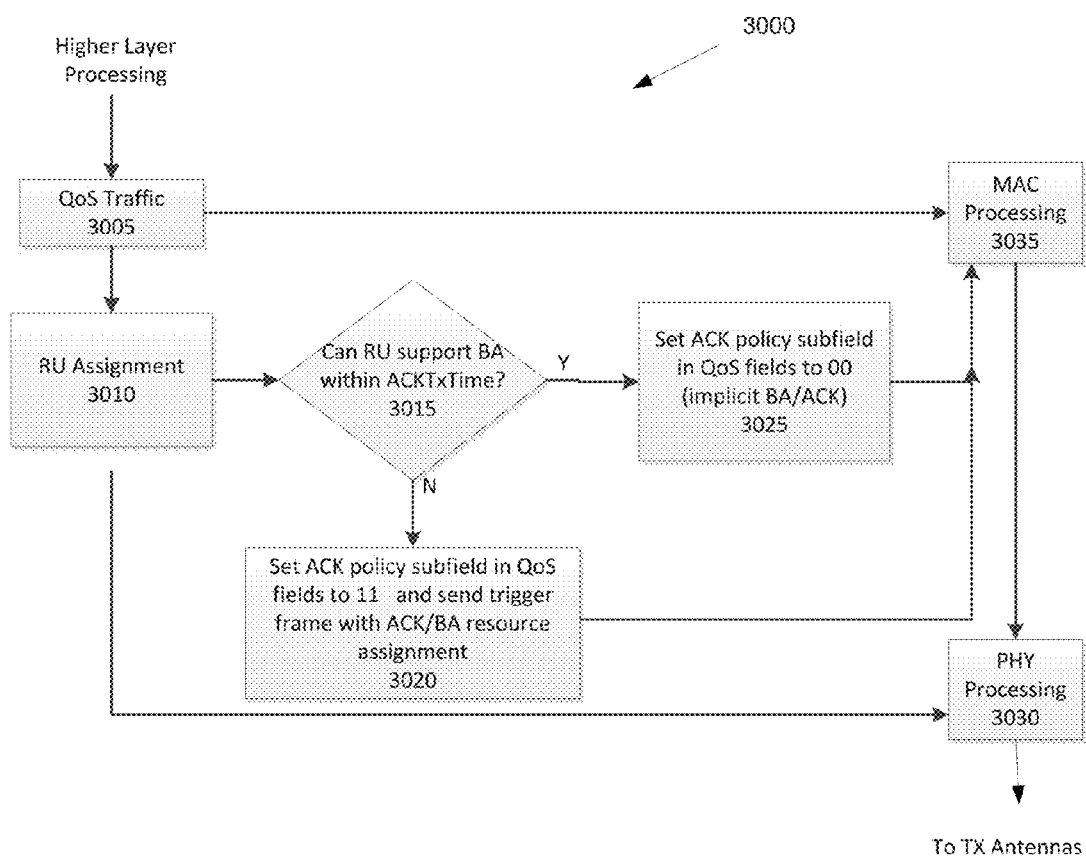
FIG. 30 illustrates an example scheduling decision at an access point (AP) according to illustrative embodiments of the present disclosure.

FIG. 30 illustrates an example scheduling decision at an access point (AP) 3000 according to illustrative embodiments of the present disclosure. The embodiment of the scheduling decision at the AP 3000 illustrated in FIG. 30 is for illustration only. Other embodiments of the scheduling decision at the AP 3000 could be used without departing from the scope of the present disclosure.

As illustrated in FIG. 30, to ensure legacy protection, BA/ACK transmission in under 68 μs may be used. Using the DL mirroring strategy for UL OFDMA BA/ACK transmission may enable only certain combinations of RU size and MCS to meet the 68 us time limit protection. Accounting for the preamble overhead of 48 μs, we can fit at most 1 4xOFDM symbol to meet the 68 μs overhead. A preamble may contain L-STF, L-LTF, L-SIG, RL-SIG, HE-SIG-A (2), HE-STF, and HE-LTF (1.6 us CP).

As illustrated in FIG. 20, a higher layer is performed for QoS traffic at step 3005. At step 3010, RU assignment is performed. If the RU assigned at step 3010 support BA within an ACKTxTime at step 3015, an ACK policy subfield in QoS fields is set to "00" (e.g., implicit BA/ACK) at step 3025. At step 3015, if not the ACK policy subfield in the QoS fields is set to "11", and then a trigger frame with ACK/BA resource assignment is sent. At step 3035, a medium access procedure (MAC) is performed. Physical layer processing (PHY) is performed at step 3030.

Table 2 shows a combination of MCS and resource unit that can support the ACKTxTime constraints for a BA packet size of 32 bytes. When the QoS for implicit ACK is set and the DL MU transmission uses the RU size and MCS that supports the transmission, then the STA can transmit the BA/ACK on the uplink.

TABLE 2

| RU Size | Data Tones | MCS-0 BPSK- 1/2 0.5 | MCS-1 QPSK- 1/2 1 | MCS-2 QPSK- 3/4 1.5 | MCS-3 16 QAM- 1/2 2 | MCS-4 16 QAM- 3/4 3 | MCS-5 64 QAM- 2/3 4 | MCS-6 64 QAM- 3/4 4.5 | MCS-7 64 QAM- 5/6 5 | MCS-8 256 QAM- 3/4 6 | MCS-9 256 QAM- 5/6 6.666666667 |
|---|---|---|---|---|---|---|---|---|---|---|---|
| 26 | 24 | 3.65E−04 | 2.06E−04 | 1.63E−04 | 1.34E−04 | 1.06E−04 | 9.12E−05 | 9.12E−05 | 9.12E−05 | 7.68E−05 | 7.68E−05 |
| 52 | 48 | 2.06E−04 | 1.34E−04 | 1.06E−04 | 9.12E−05 | 7.68E−05 | 7.68E−05 | 7.68E−05 | 7.68E−05 | 6.24E−05 | 6.24E−05 |
| 106 | 102 | 1.34E−04 | 9.12E−05 | 7.68E−05 | 7.68E−05 | 6.24E−05 | 6.24E−05 | 6.24E−05 | 6.24E−05 | 6.24E−05 | 6.24E−05 |
| 242 | 234 | 9.12E−05 | 7.68E−05 | 6.24E−05 | 6.24E−05 | 6.24E−05 | 6.24E−05 | 6.24E−05 | 6.24E−05 | 6.24E−05 | 6.24E−05 |
| 484 | 468 | 7.68E−05 | 6.24E−05 | 6.24E−05 | 6.24E−05 | 6.24E−05 | 6.24E−05 | 6.24E−05 | 6.24E−05 | 6.24E−05 | 6.24E−05 |
| 994 | 978 | 6.24E−05 | 6.24E−05 | 6.24E−05 | 6.24E−05 | 6.24E−05 | 6.24E−05 | 6.24E−05 | 6.24E−05 | 6.24E−05 | 6.24E−05 |
| 996 | 980 | 6.24E−05 | 6.24E−05 | 6.24E−05 | 6.24E−05 | 6.24E−05 | 6.24E−05 | 6.24E−05 | 6.24E−05 | 6.24E−05 | 6.24E−05 |

In one embodiment, the implicit BA/ACK transmission indication for an STA can be signaled in the HE-SIG-B fields along with the other resource allocation for that STA. When the implicit BA/ACL transmission is set for an STA, the STA may use the indication in the HE-SIG-B field to transmit the UL BA/ACK using OFDMA.

In one embodiment, the STAs can mirror the transmission strategy used by the data on the downlink to transmit BA/ACK on the uplink within the same TXOP. When transmitting the ACK/BA, the STA checks if the QoS flags in the MAC header are set for an implicit ACK or not. The transmission on the uplink is configured based on the resources used by the DL data it is acknowledging. In one example, the RU used for UL BA/ACK transmission can be the same as that used by the data it is acknowledging. In another example, the MCS for the UL BA/ACK is lower by a fixed offset than the one used for the data, for example, if MCSn is used, then the BA/ACK MCS is max(MCS0, MCSn-2). In yet another example, NSS=1 may be used to ensure improved diversity protection for the ACK compared to data irrespective of the NSS used for the data. In addition, STBC may be considered for transmitting the UL BA/ACK as well. Using the same resources as the downlink enables the UL BA/ACK transmission to leverage DL/UL channel reciprocity.

The preamble overhead account for 70% of the ACK/BA transmissions. Since implicit BA/ACK are already protected by a TXOP, in an embodiment of the current invention, the legacy fields and the HE-SIG fields are not transmitted in the UL MU BA/ACK transmission and all transmissions start with the HE-STF field. If the legacy fields and HE-SIG-A are removed, the preamble overhead can be reduced to 16 μs (23% of ACK/BA transmissions). The BA/ACK may just have 1 HE-STF, 1 HE-LTF followed by the BA/ACK packet. Without legacy preamble, lot more (RU Size), MCS combinations can support an implicit BA transmission as shown in Table 3.

Figure 31:
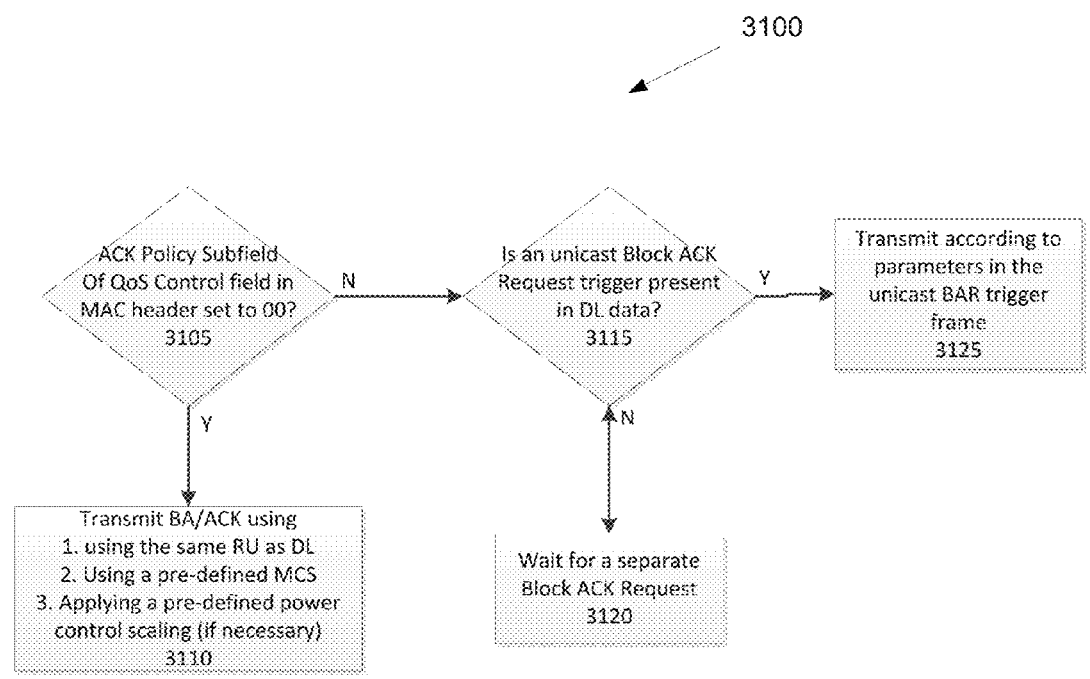
FIG. 31 illustrates an example operation at a station (STA) according to illustrative embodiments of the present disclosure.

As illustrated in FIG. 31, the operation 3100 starts at step 3105. At step 3105, the operation 3100 determines whether an ACK policy subfield of QoS control field in MAC header is set to "00". If the ACK policy subfield of QoS control field in MAC header is set to "00" at step 3105, the operation 3100, at step 3110, transmits BA/ACK using at least one of the same RUS as DL or a pre-defined MCS, and then applies a pre-defined power control signaling, if necessary. At step 3105, if not, the operation 3100 determines whether a unicast block ACK request trigger presents in DL data. If the unicast block ACK is present in the DL data, the operation 3100 transmits according to parameters in the unicast BAR trigger frame. If not, the operation, at step 3120, waits for a separate block ACK request.

In one embodiment, when ACK policy sub-field in the QoS flag is set to 00—implicit BA in the received data frames, no trigger frame is sent and the STA responds with BA using the same RU as DL, using a pre-defined MCS and applying a pre-defined power control scaling (if necessary). When ACK policy is set to 11 and a trigger frame with BAR in the DL data—transmit SIFS after CF-end frame as described in FIG. 31. The scheduling operation where the QoS flag is set based on the ACKTxTime is described in FIG. 30.

In one embodiment, the ACK policy sub-field in the QoS flag is set to 00—implicit BA in the A-MPDU. The presence or absence of a trigger frame indicating the UL MU parameters for BA can tell the trigger frame if the BA is to be sent using implicit parameters or according to the parameters in the trigger frame respectively. The use of short ACK frames can further reduce the BA/ACK transmission time. When implicit BA/ACK is sent with no trigger frame, the use of short ACK/BA formats is mandated.

TABLE 3

| RU Size | Data Tones | MCS-0 BPSK- 1/2 0.5 | MCS-1 QPSK- 1/2 1 | MCS-2 QPSK- 3/4 1.5 | MCS-3 16 QAM- 1/2 2 | MCS-4 16 QAM- 3/4 3 | MCS-5 64 QAM- 2/3 4 | MCS-6 64 QAM- 3/4 4.5 | MCS-7 64 QAM- 5/6 5 | MCS-8 256 QAM- 3/4 6 | MCS-9 256 QAM- 5/6 6.666666667 |
|---|---|---|---|---|---|---|---|---|---|---|---|
| 26 | 24 | 3.33E−04 | 1.74E−04 | 1.31E−04 | 1.02E−04 | 7.36E−04 | 5.92E−05 | 5.92E−05 | 5.92E−05 | 4.48E−05 | 4.48E−05 |
| 52 | 48 | 1.74E−04 | 1.02E−04 | 7.36E−05 | 5.92E−05 | 4.48E−05 | 4.48E−05 | 4.48E−05 | 4.48E−05 | 3.04E−05 | 3.04E−05 |
| 106 | 102 | 1.02E−04 | 5.92E−05 | 4.48E−05 | 4.48E−05 | 3.04E−05 | 3.04E−05 | 3.04E−05 | 3.04E−05 | 3.04E−05 | 3.04E−05 |
| 242 | 234 | 5.92E−05 | 4.48E−05 | 3.04E−05 | 3.04E−05 | 3.04E−05 | 3.04E−05 | 3.04E−05 | 3.04E−05 | 3.04E−05 | 3.04E−05 |
| 484 | 468 | 4.48E−05 | 3.04E−05 | 3.04E−05 | 3.04E−05 | 3.04E−05 | 3.04E−05 | 3.04E−05 | 3.04E−05 | 3.04E−05 | 3.04E−05 |
| 994 | 978 | 3.04E−05 | 3.04E−05 | 3.04E−05 | 3.04E−05 | 3.04E−05 | 3.04E−05 | 3.04E−05 | 3.04E−05 | 3.04E−05 | 3.04E−05 |
| 996 | 980 | 3.04E−05 | 3.04E−05 | 3.04E−05 | 3.04E−05 | 3.04E−05 | 3.04E−05 | 3.04E−05 | 3.04E−05 | 3.04E−05 | 3.04E−05 |

In one embodiment, the AP transmits a DL MU PPDU addressed to an STA in a resource unit. The AP sets the implicit BA/ACK QoS flag only when the RU Size and MCS used can support transmission with-in the ACKTxTime limit.

In one embodiment, the STA receives the DL MU PPDU and checks the implicit BA/ACK QoS flag is set. If set, the STA that may turn around a BA/ACK in SIFS time duration may use the same RU and a functional MCS (same or offset) as the downlink data transmission. The BA/ACK packet is padded to ensure all transmission from all STAs ends on the same symbol.

FIG. 31 illustrates an example operation at a station (STA) 3100 according to illustrative embodiments of the present disclosure. The embodiment of the operation at the STA 3100 illustrated in FIG. 31 is for illustration only. Other embodiments of the operation at the STA 3100 could be used without departing from the scope of this disclosure.

In one embodiment, the ACK policy subfields and the associated ACK/BA mappings are set as follows: 1) the ACK policy sub-field is set to 00—triggers an implicit BA with implicit mapping, 2) the ACK policy sub-field set to 10—indicates presence of a unicast trigger frame, 3) the ACK policy sub-field set to 11—indicates wait for a BAR to the STA, and 4) the ACK policy sub-field set to 01—indicates no ACK/BA.

Figure 32:
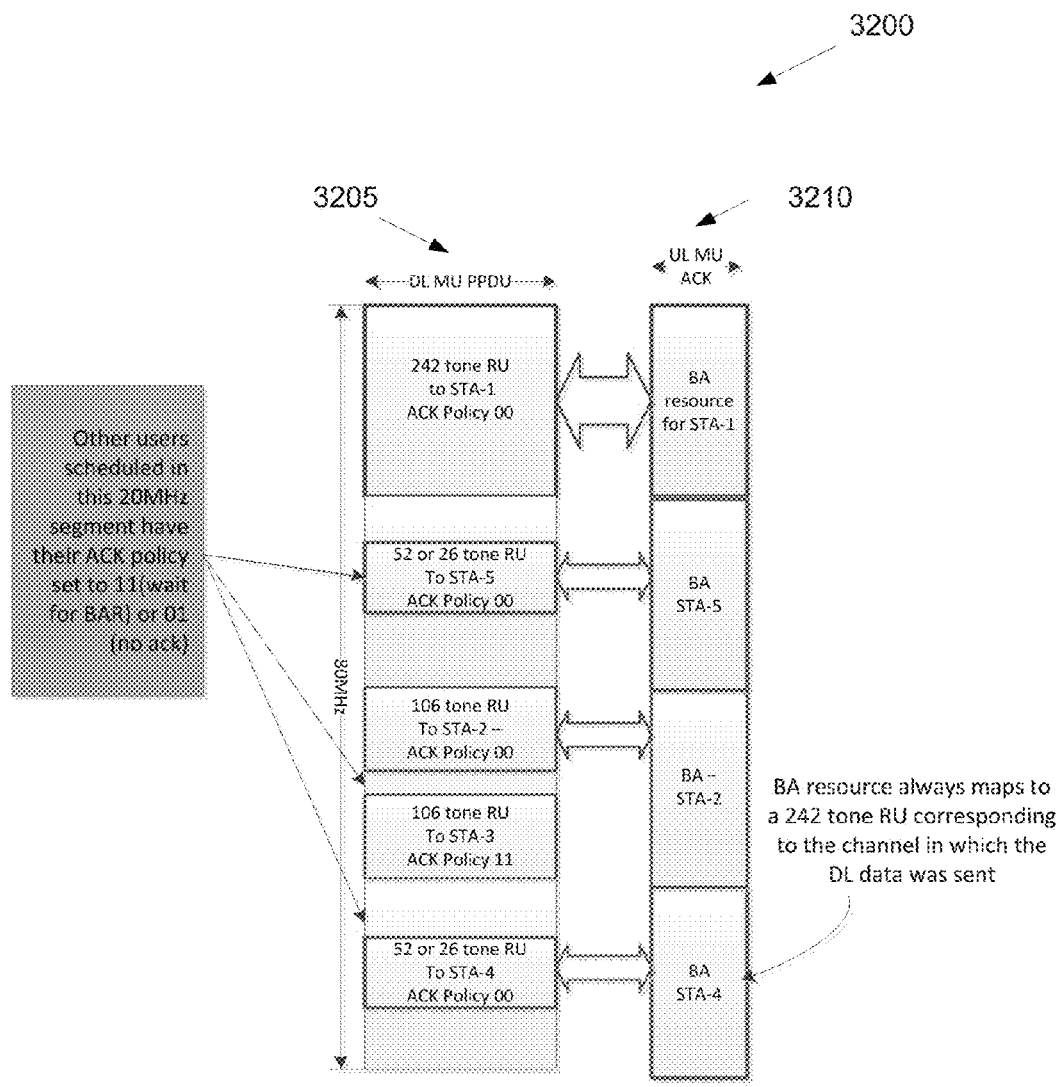
FIG. 32 illustrates an example implicit mapping to a 242 tone RU based on an ACK policy flag according to illustrative embodiments of the present disclosure.

FIG. 32 illustrates an example implicit mapping to a 242 tone RU based on an ACK policy flag 3200 according to illustrative embodiments of the present disclosure. The embodiment of the implicit mapping to the 242 tone RU based on the ACK policy flag 3200 illustrated in FIG. 32 is for illustration only. Other embodiments of the implicit mapping to the 242 tone RU based on the ACK policy flag 3200 could be used without departing from the scope of this disclosure.

As illustrated in FIG. 32, the implicit mapping to the 242 tone RU based on the ACK policy flag 3200 comprises a DL MU PPDU portion 3205 and a UL MU ACK 3210 portion. The DL MU PPDU portion 3205 further comprises a plurality of tones including a plurality of ACK policies. The UL MU ACK 3210 further comprises a plurality of resources for a plurality of STAs.

Figure 33:
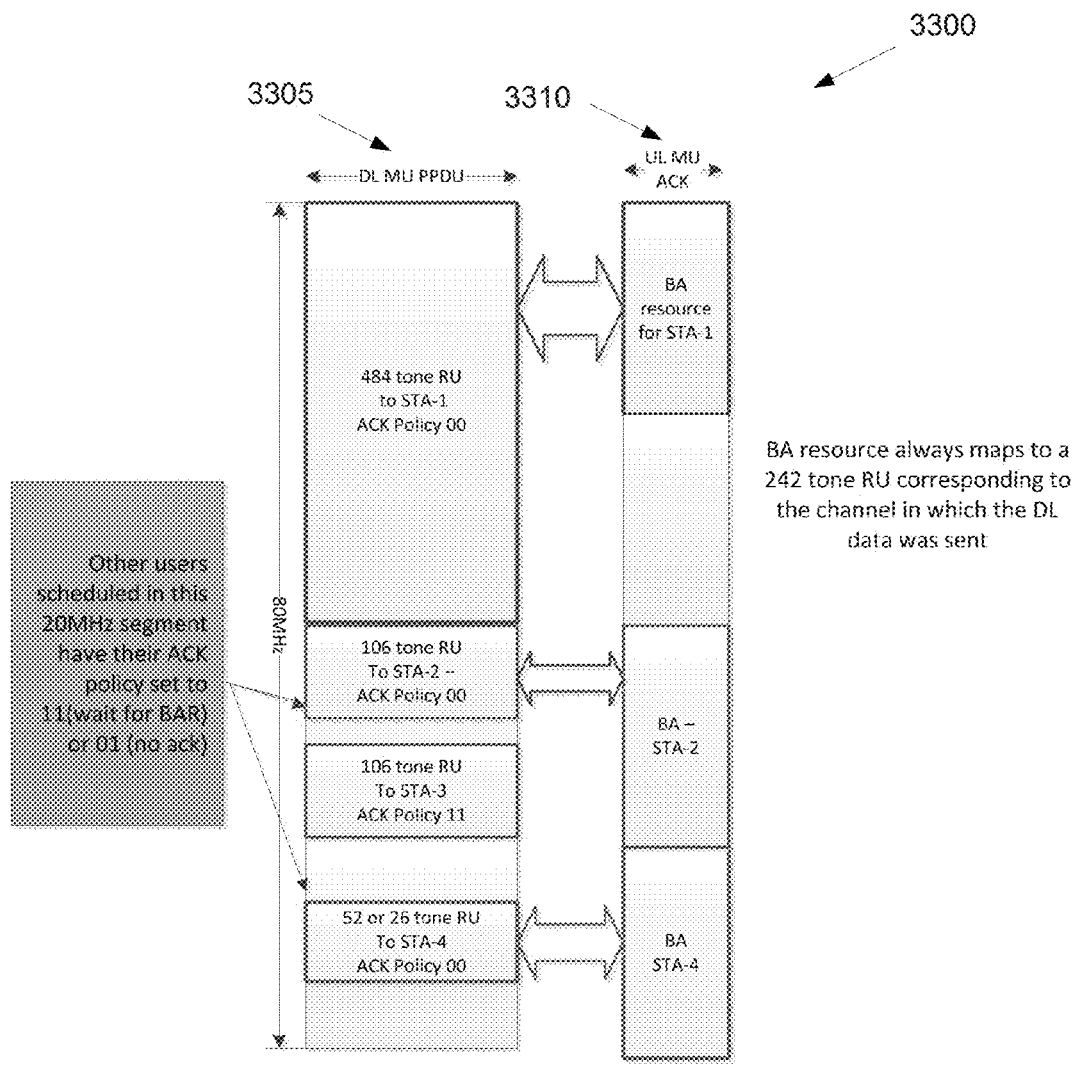
FIG. 33 illustrates an example ACK mapping for a 484 tone RU according to illustrative embodiments of the present disclosure.

FIG. 33 illustrates an example ACK mapping for a 484 tone RU 3300 according to illustrative embodiments of the present disclosure. The embodiment of the ACK mapping for the 484 tone RU 3300 illustrated in FIG. 33 is for illustration only. Other embodiments of the ACK mapping for the 484 tone RU 3300 could be used without departing from the scope of this disclosure.

As illustrated in FIG. 33, the ACK mapping for the 484 tone RU 3300 comprises a DL MU PPDU portion 3305 and a UL MU ACK 3310 portion. The DL MU PPDU portion 3305 further comprises a plurality of tones including a plurality of ACK policies. The UL MU ACK 3210 further comprises a plurality of resources for a plurality of STAs.

When the ACK policy sub-field is set to 00, the STA identifies the resource mapping to transmit the ACK as follows: 1) the resource unit used is a 242 tone unit corresponding to the channel in which the RU that the DL data was contained. As shown in FIG. 32, only one RU within a 242 tone segment or a 20 MHz segment—meant for a STA may have the ACK policy set to 00. For all other STAs for whom data is carried on other RUs within the 242 tone segment or 20 MHz segment, the ACK policy may be set to 11 or 01. For the STA whom the ACK policy is set to 00, the ACK/BA packet may be placed in the 242 tone RU corresponding to the 242 tone segment that contained its data on the DL (FIG. 33 shows the resource mapping procedure when larger RUs are used in the downlink. They can map to the 242 tone segment that starts at a lower sub-carrier index), 2) the ACK/BA packet is mapped to QPSK—½ MCS and place in the 242 tone resource unit, for example, the short frame ACK/BA format is used for implicit mapping, 3) power adjustment for UL MU is done, if necessary.

Figure 34:
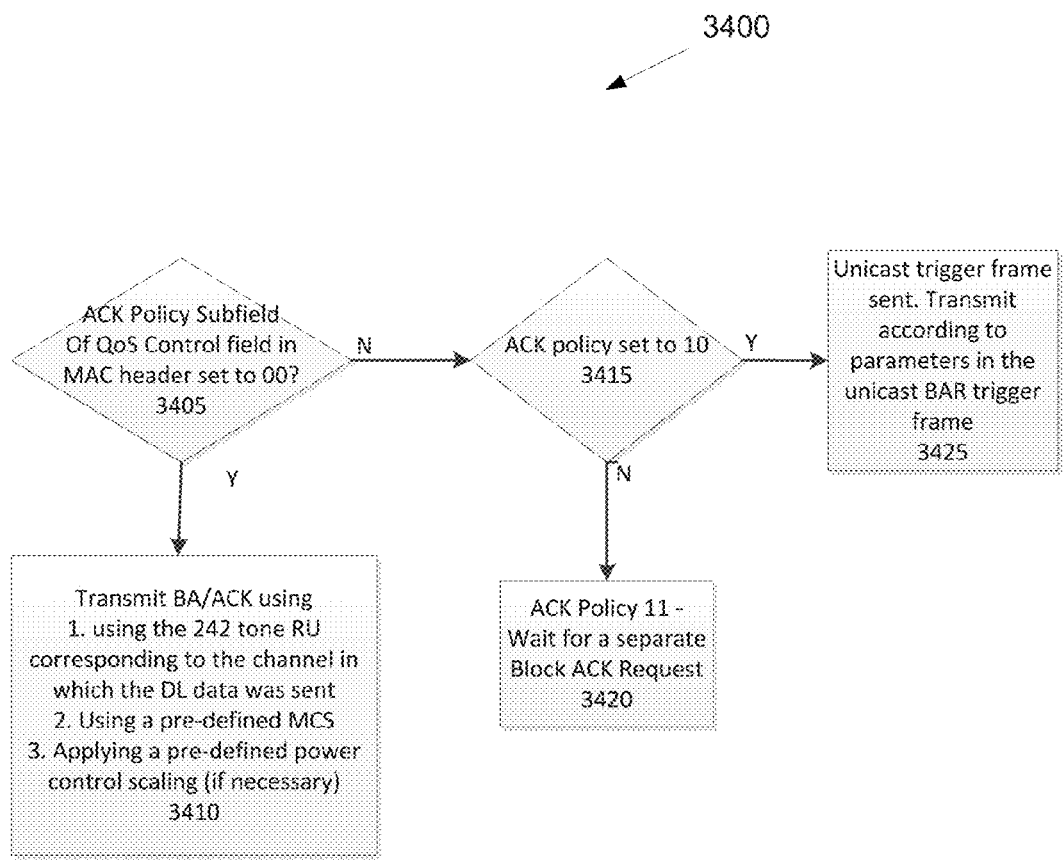
FIG. 34 illustrates an example implicit mapping to a 242 tone RU at an STA according to illustrative embodiments of the present disclosure.

FIG. 34 illustrates an example implicit mapping to a 242 tone RU at an STA 3400 according to illustrative embodiments of the present disclosure. The embodiment of the implicit mapping to the 242 tone RU at the STA 3400 according illustrated in FIG. 34 is for illustration only. Other embodiments of the implicit mapping to the 242 tone RU at the STA 3400 according could be used without departing from the scope of this disclosure. The processing schema at the STA is illustrated in FIG. 34, where the STA determines the ACK/BA transmission based on the ACK policy sub-field set in the MAC header.

As illustrated in FIG. 34, if an ACK policy subfield of QoS control field in MAC header is set to "00" at step 3405, an BA/ACK is transmitted, at step 3410, using at least one of 242 tone RU corresponding to a channel in which DL data was sent or a pre-defined MCS. When the BA/ACK is transmitted, a pre-defined power control signaling, if necessary, is applied at step 3410. If the ACK policy subfield of QoS control field in MAC header is set to "00" at step 3405, an ACK policy is determined at step 3415. At step, 3415, if the ACK policy is set to "10", a unicast trigger frame is sent according to parameters in the unicast BAR trigger frame at step 3425. If the ACK policy is not set to "10" (e.g., ACK policy "11") at step 3415, waiting for a separate block ACK request at step 3420.

In one embodiment, when the ACK policy sub-field in the QoS field of the MAC header is set to 00 and no scheduling information for OFDMA acknowledge from STAs is contained in the MAC header of DL MPDU, the resource mapping is set to 242 tones RU on the uplink with the use of a predefined MCS for ACK/BA packet. However, when the ACK policy sub-field in the QoS field of the MAC header is set to 00 and scheduling information for OFDMA acknowledge from STAs is contained in the MAC header of DL MU PPDU, ACK/BA transmission may be according to the parameters indicated in the scheduling information. Scheduling information content for OFDMA ACK contains the fields such as UL PPDU (9 bits)+RU Allocation (TBD bits), with other schedule information TBD.

The OFDMA structure for the IEEE 802.11ax consists of building blocks such as 26-tone RU consisting of 24 data tones and 2 pilot tones as defined for the S1G 1 MHz mode in the IEEE 802.11ah.

An OFDMA structure for IEEE 802.11ax comprises building blocks called resource units (RU). In one example, 26-tone RU comprises 24 data tones and 2 pilot tones as defined for the S1G 1 MHz mode in IEEE 802.11ah. In such example, possible locations of the 26-tone RUs are fixed for 20 MHz, 40 MHz and 80 MHz OFDMA PPDUs, respectively. In another example, 52-tone RU comprises 48 data tones and 4 pilot tones as defined in IEEE 802.11a. In such example, possible locations of the 52-tone RUs are fixed for 20 MHz, 40 MHz and 80 MHz OFDMA PPDUs, respectively. In yet another example, 106-tone RU comprises 102 data tones and 4 pilot tones. In such example, an interleaver parameter follows that of VHT 40 MHz mode in IEEE 802.11ac, except that Ncol=17. In such example, possible locations of the 106-tone RUs are fixed for 20 MHz, 40 MHz and 80 MHz OFDMA PPDUs, respectively. In yet another example, 242-tone RU comprises 234 data tones and 8 pilot tones as defined for the VHT 80 MHz mode in IEEE 802.11ac. In such example, possible locations of the 242-tone RUs are fixed for 40 MHz and 80 MHz OFDMA PPDUs, respectively. In yet another example, 484-tone RU comprises 468 data tones and 16 pilot tones as defined for the VHT 160 MHz mode in IEEE 802.11ac. In such example, possible locations of the 484-tone RUs are fixed for 80 MHz OFDMA PPDUs.

Figure 35:
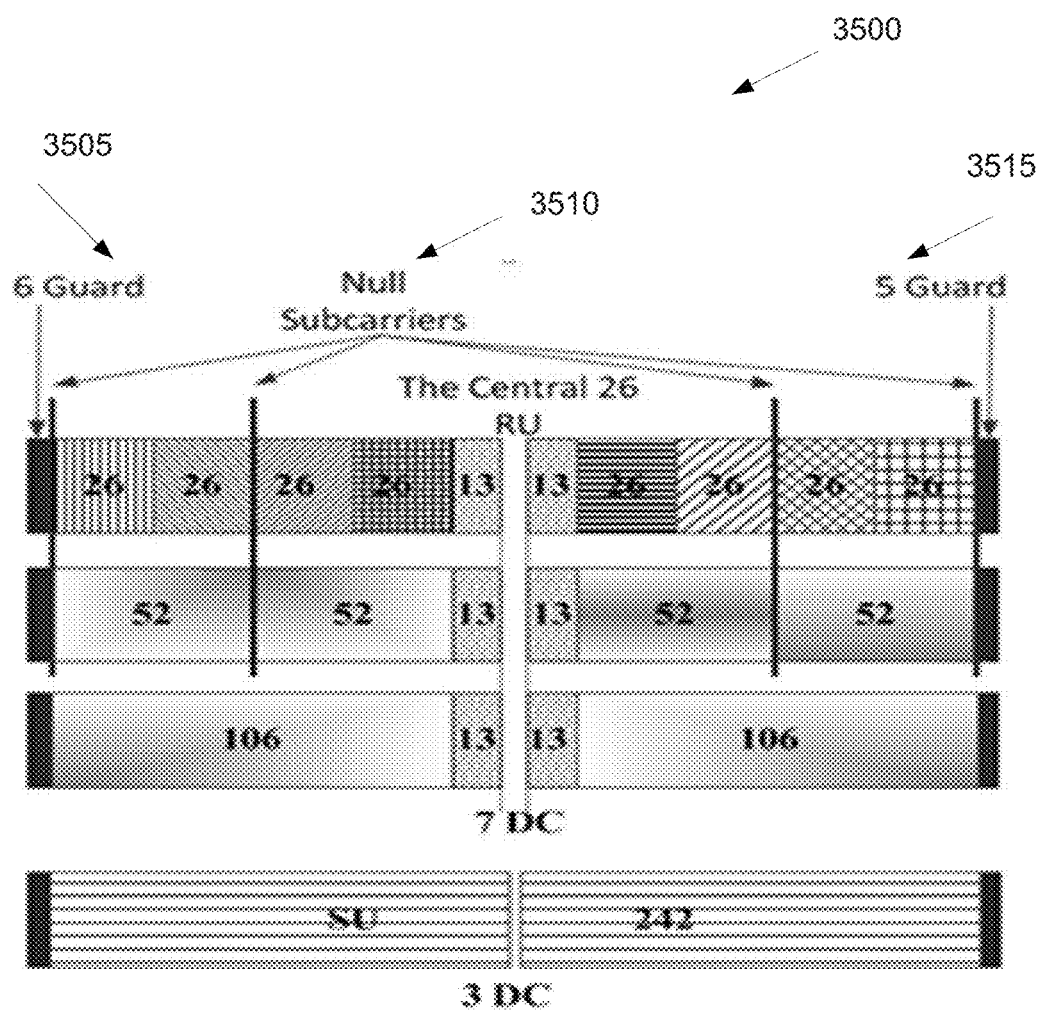
FIG. 35 illustrates an example possible RU location in a 20 megahertz (MHz) OFDMA PPDU according to illustrative embodiments of the present disclosure.

FIG. 35 illustrates an example possible RU location in a 20 megahertz (MHz) OFDMA PPDU 3500 according to illustrative embodiments of the present disclosure. The embodiment of the possible RU location in the 20 MHz OFDMA PPDU 3500 according illustrated in FIG. 35 is for illustration only. Other embodiments of the implicit mapping to the possible RU location in the 20 MHz OFDMA PPDU 3500 according could be used without departing from the scope of this disclosure.

As illustrated in FIG. 35, the RU location in the 20 MHz OFDMA PPDU 3500 comprises 6 guard band subcarriers 3505, null subcarriers 3510, and 5 guard band subcarriers 3515.

Figure 36:
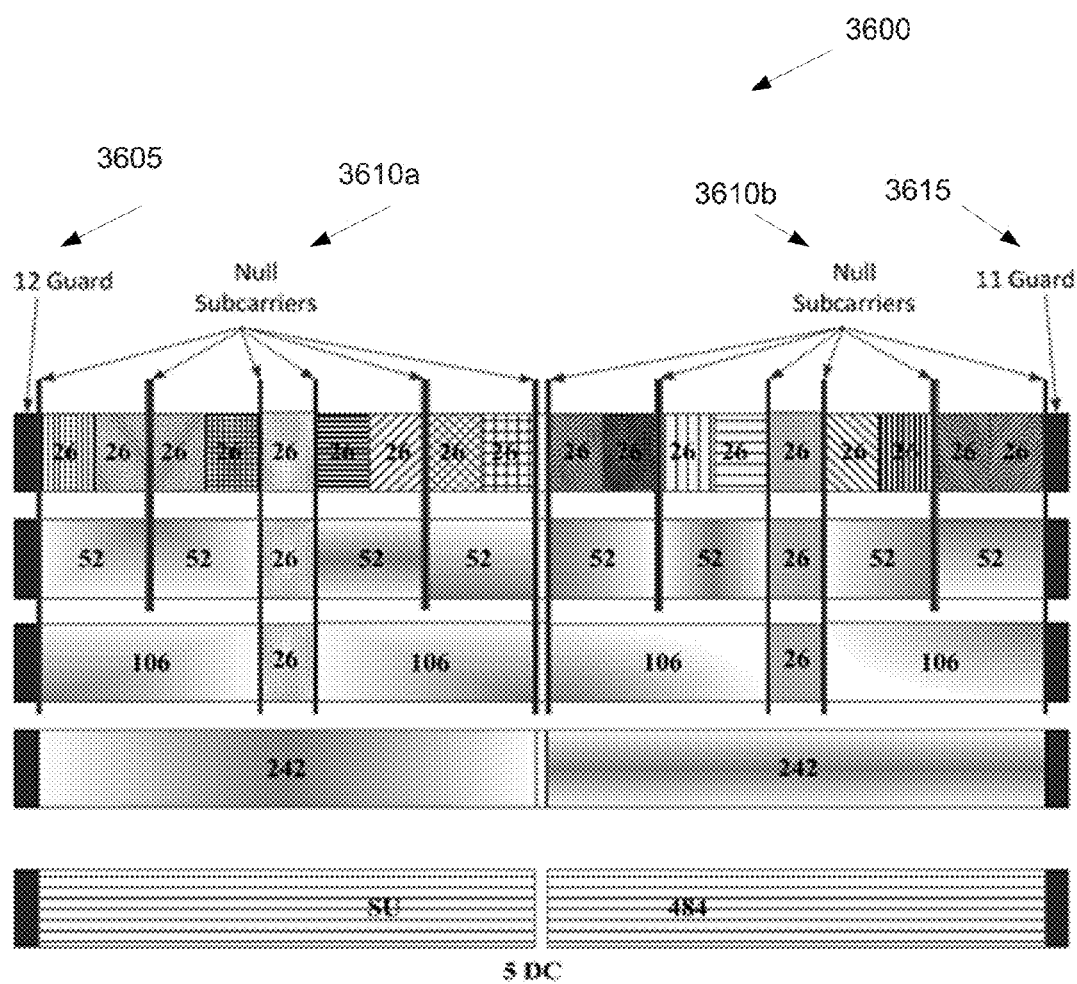
FIG. 36 illustrates an example possible RU location in a 40 MHz OFDMA PPDU according to illustrative embodiments of the present disclosure.

FIG. 36 illustrates an example possible RU location in a 40 MHz OFDMA PPDU 3600 according to illustrative embodiments of the present disclosure. The embodiment of the possible RU location in the 40 MHz OFDMA PPDU 3600 according illustrated in FIG. 36 is for illustration only. Other embodiments of the possible RU location in the 40 MHz OFDMA PPDU 3600 according could be used without departing from the scope of this disclosure.

As illustrated in FIG. 36, the RU location in the 40 MHz OFDMA PPDU 3600 comprises 12 guard band subcarriers 3605, null subcarriers 3610*a* and 3610*b*, and 11 guard band subcarriers 3615.

Figure 37:
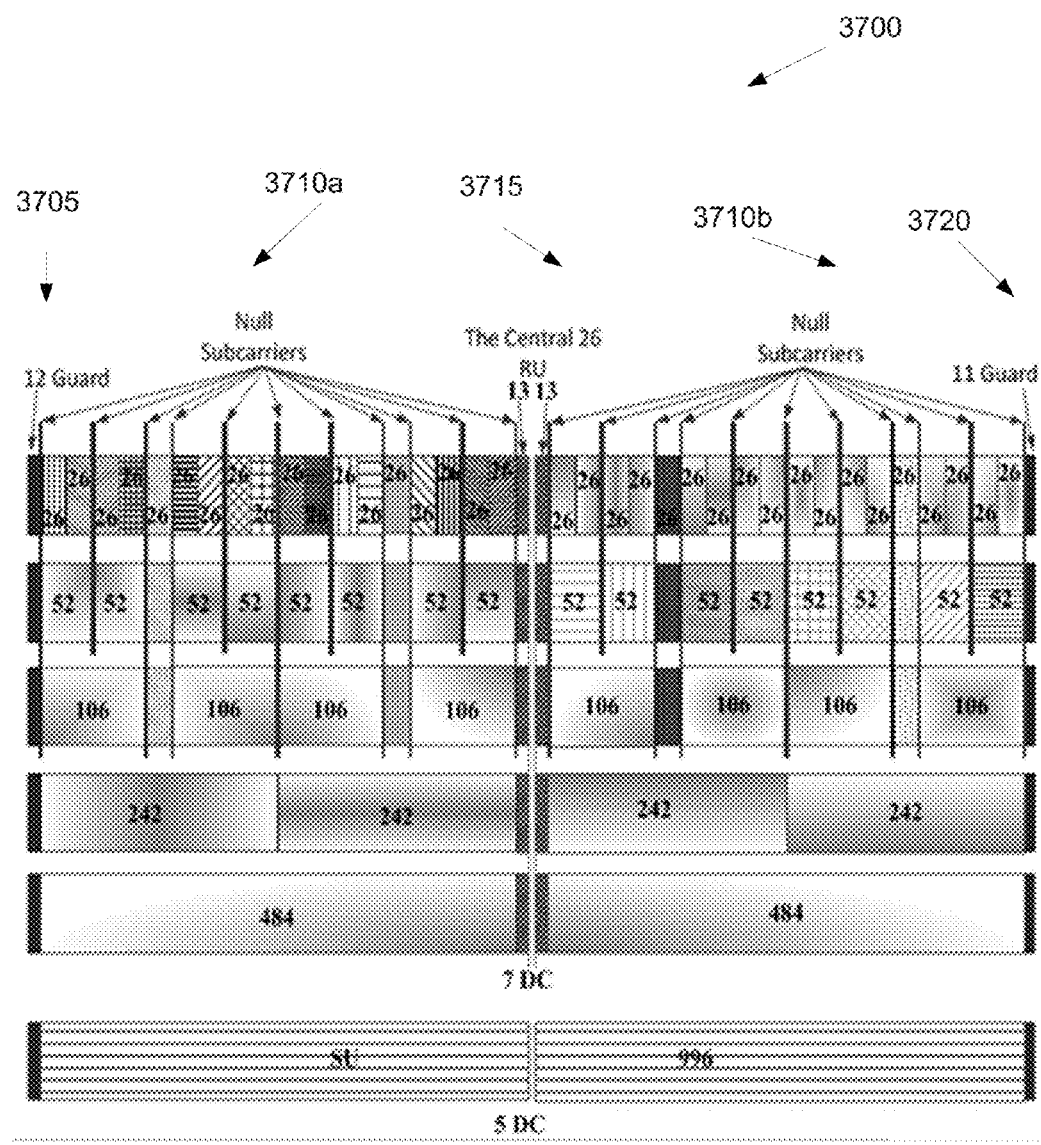
FIG. 37 illustrates an example possible RU location in a 80 MHz OFDMA PPDU according to illustrative embodiments of the present disclosure.

FIG. 37 illustrates an example possible RU location in an 80 MHz OFDMA PPDU 3700 according to illustrative embodiments of the present disclosure. The embodiment of the possible RU location in the 80 MHz OFDMA PPDU 3700 according illustrated in FIG. 37 is for illustration only. Other embodiments of the possible RU location in the 80 MHz OFDMA PPDU 3700 according could be used without departing from the scope of this disclosure.

As illustrated in FIG. 37, the RU location in the 80 MHz OFDMA PPDU 3700 comprises 12 guard band subcarriers 3705, null subcarriers 3710a and 3710b, central subcarriers 3715, and 11 guard band subcarriers 3715.

The OFDMA structure for the IEEE 802.1 lax consists of the following building blocks:

1) 26-tone RU consisting of 24 data tones and 2 pilot tones as defined for the S1G 1 MHz mode in 802.11ah. Possible locations of the 26-tone RUs are fixed as shown in FIG. 35, FIG. 36, and FIG. 37 for 20 MHz, 40 MHz and 80 MHz OFDMA PPDUs, respectively.

2) 52-tone RU consisting of 48 data tones and 4 pilot tones as defined in 802.11a. Possible locations of the 52-tone RUs are fixed as shown in FIG. 35, FIG. 36, and FIG. 37 for 20 MHz, 40 MHz and 80 MHz OFDMA PPDUs, respectively.

3) 106-tone RU consisting of 102 data tones and 4 pilot tones. Interleaver parameter following that of VHT 40 MHz mode in 802.11ac, except that Ncol=17. Possible locations of the TBD1-tone RUs are fixed as shown in FIG. 36, FIG. 36, and FIG. 37 for 20 MHz, 40 MHz and 80 MHz OFDMA PPDUs, respectively.

4) 242-tone RU consisting of 234 data tones and 8 pilot tones as defined for the VHT 80 MHz mode in 802.11ac. Possible locations of the 242-tone RUs are fixed as shown in FIG. 35, FIG. 36, and FIG. 37 for 40 MHz and 80 MHz OFDMA PPDUs, respectively.

5) 484-tone RU consisting of 468 data tones and 16 pilot tones as defined for the VHT 160 MHz mode in 802.11ac. Possible locations of the 484-tone RUs are fixed as shown in FIG. 35, FIG. 36, and FIG. 37 3 for 80 MHz OFDMA PPDUs.

In the aforementioned building blocks, possible RU locations in a 40 MHz OFDMA PPDU are equivalent to two replicas of the possible RU locations in a 20 MHz OFDMA PPDU. In addition, possible RU locations in an 80 MHz OFDMA PPDU are equivalent to two replicas of the possible RU locations in a 40 MHz OFDMA PPDU.

An OFDMA PPDU can carry a mix of different resource unit sizes within each 242 resource unit boundary.

Figure 38:
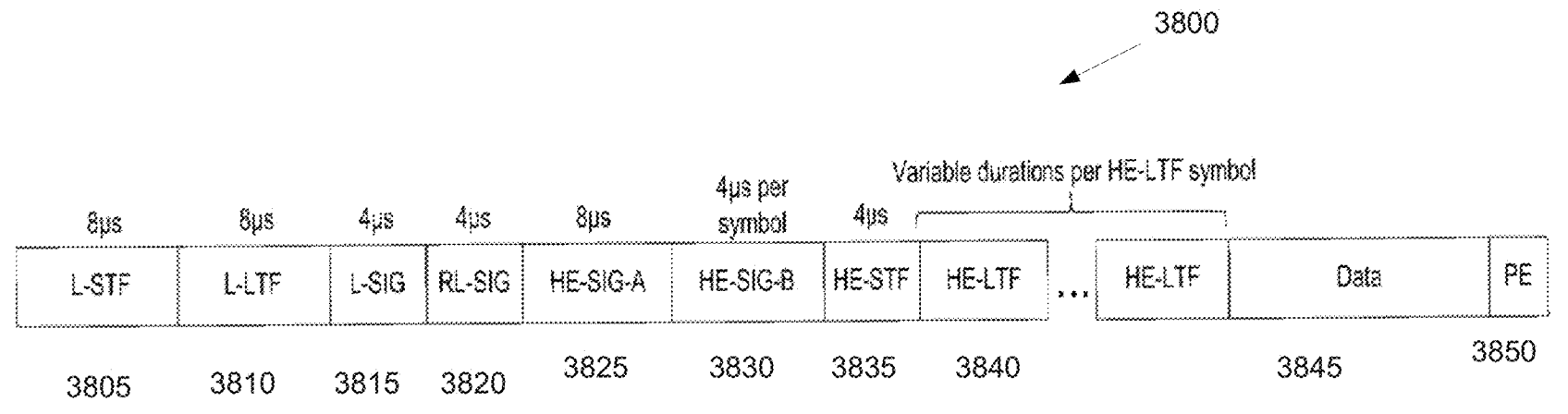

FIG. 38 illustrates an example high efficiency (HE) MU PPDU format 3800 according to illustrative embodiments of the present disclosure. The embodiment of the 4 HE MU PPDU format 3800 according illustrated in FIG. 38 is for illustration only. Other embodiments of the 4 HE MU PPDU format 3800 according could be used without departing from the scope of this disclosure.

As illustrated in FIG. 38, HE MU PPDU format 3800 comprises a legacy-short training field (L-STF) 3805, a legacy-long training field (L-LTF) 3810, a legacy-signaling (L-SIG) field 3815, a repeated L-SIG (RL-SIG) field 3820, a HE-SIG-A field 3825, a HE-SIG-B field 3830, a HE-STF 3835, a HE-LTF 3840, data field 3845, and a packet extension (PE) field 3850.

Figure 39:
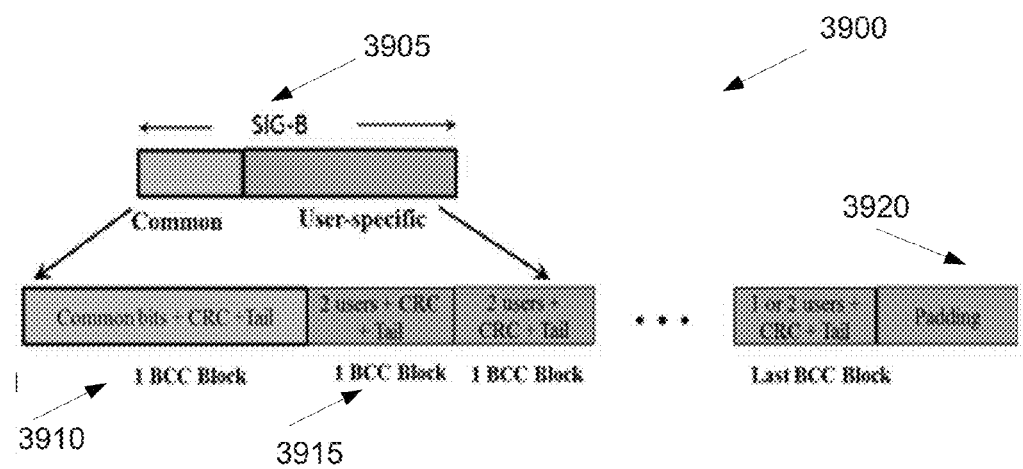
FIG. 39 illustrates an example HE-SIG-B field encoding structure in each 20 MHz according to illustrative embodiments of the present disclosure.

The format of the HE MU PPDU is defined as in FIG. 38. This format is used for MU transmission that is not a response of a trigger frame. FIG. 39 illustrates an example HE-SIG-B field encoding structure in each 20 MHz 3900 according to illustrative embodiments of the present disclosure. The embodiment of the HE-SIG-B field encoding structure in each 20 MHz 3900 according illustrated in FIG. 39 is for illustration only. Other embodiments of the HE-SIG-B field encoding structure in each 20 MHz 3900 according could be used without departing from the scope of this disclosure.

As illustrated in FIG. 39, the HE-SIG-B field ending structure 3900 comprises a SIG-B field 3905 including three portions 3910, 3915, and 3920. The portion 3910 of the SIG-B 3905 includes a common bits portion, a cyclic redundancy checksum portion, and tail portion. The portion 3915 of the SIG-B 3905 includes a 1 or 2 users portion, a CRC portion, and tail portion. The portion 3920 of the SIG-B 3905 includes a padding portion.

The HE-SIG-B field is separately encoded on each 20 MHz band. The encoding structure in one such 20 MHz band is shown in FIG. 39. The encoding structure includes a common block field followed by a user specific field.

The common block field contains information regarding the resource unit allocation such as the RU arrangement in frequency domain, the RUs allocated for MU-MIMO and the number of users in MU-MIMO allocations.

The user specific field includes multiple user block fields. Each user block field contains information for two STAs to decode payloads. The last user block field may contain information for only one STA, if the number of user fields indicated by the RU allocation signaling in the common block is odd.

Figure 40:
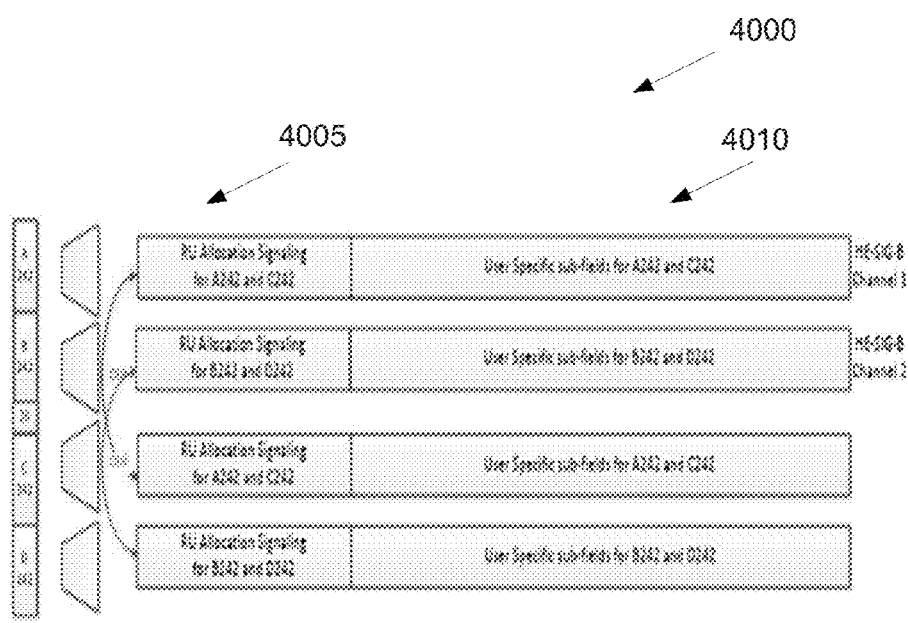
FIG. 40 illustrates an example default mapping of the two HE-SIG-B channels in an 80 MHz PPDU according to illustrative embodiments of the present disclosure.

FIG. 40 illustrates an example default mapping of the two HE-SIG-B channels in an 80 MHz PPDU 4000 according to illustrative embodiments of the present disclosure. The embodiment of the default mapping of the two HE-SIG-B channels in the 80 MHz PPDU 4000 according illustrated in FIG. 40 is for illustration only. Other embodiments of the default mapping of the two HE-SIG-B channels in the 80 MHz PPDU 4000 according could be used without departing from the scope of this disclosure.

As illustrated in FIG. 40, the default mapping of the two HE-SIG-B channels 4000 comprises a plurality of RU allocation signaling field 4005 and a plurality of user specific sub-field 4010.

For 20 MHz and 40 MHz PPDUs, the common block field and the user field 4010 for a STA are transmitted in the same 20 MHz band as the STA's data. For an 80 MHz PPDU, the default frequency mapping of the common block field and user specific fields 4010 is shown in FIG. 40.

The HE-SIG-B field includes the 1st and 3rd 20 MHz bands from top are identical. The information carried in either of these bands is called HE-SIG-B content channel 1. HE-SIG-B content channel 1 carries signaling information for all STAs whose payloads occupy some tones in A242 or C242. Similarly, the HE-SIG-B contents on the 2nd and 4th 20 MHz bands are identical. The information carried in either of these bands is called HE-SIG-B content channel 2. HE-SIG-B content channel 2 carries signaling information for all STAs whose payloads occupy some tones in B242 or D242.

Figure 41:
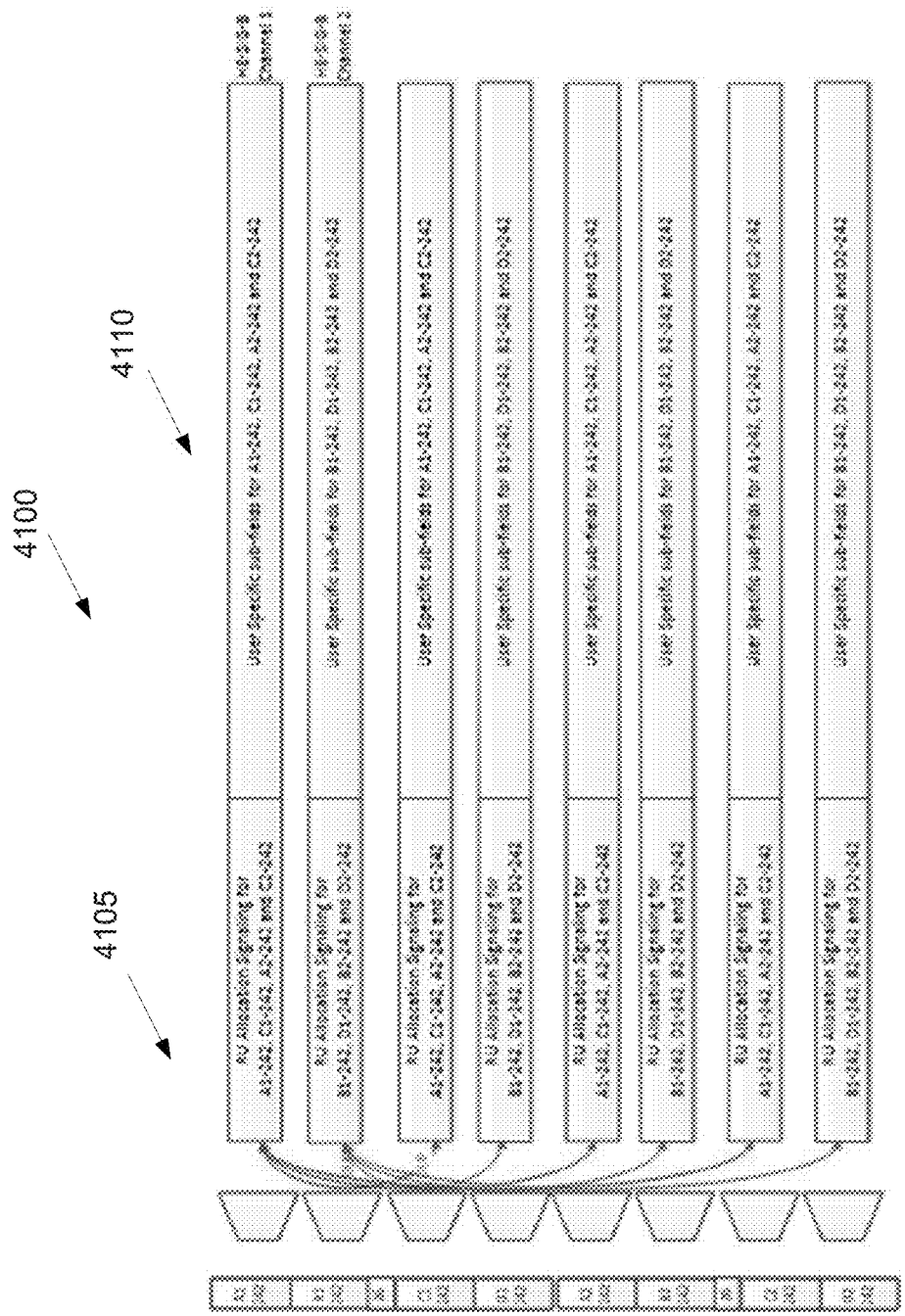
FIG. 41 illustrates an example default mapping of the two HE-SIG-B channels in an 160 MHz PPDU according to illustrative embodiments of the present disclosure.

FIG. 41 illustrates an example default mapping of the two HE-SIG-B channels in an 160 MHz PPDU 4100 according to illustrative embodiments of the present disclosure. The embodiment of the default mapping of the two HE-SIG-B channels in the 160 MHz PPDU 4100 according illustrated in FIG. 41 is for illustration only. Other embodiments of the default mapping of the two HE-SIG-B channels in the 160 MHz PPDU 4100 according could be used without departing from the scope of this disclosure.

As illustrated in FIG. 41, the default mapping of the two HE-SIG-B channels 4100 comprises a plurality of RU allocation signaling field 4105 and a plurality of user specific sub-field 4110.

For a 160 MHz PPDU, the default frequency mapping of the common block field and user specific fields 4110 is shown in FIG. 41. The HE-SIG-B content in the 1st, 3rd, 5th and 7th 20 MHz bands from top are all identical. The information carried in any of these bands is called HE-SIG-B content channel 1. HE-SIG-B content channel 1 carries signaling information for all STAs whose payloads occupy some tones in A1-242 or C1-242 or A2-242 or C2-242. Similarly, the HE-SIG-B contents in the 2nd, 4th, 6th and 8th 20 MHz bands from top are identical. The information carried in any of these bands is called HE-SIG-B content channel 2. HE-SIG-B content channel 2 carries signaling information for all STAs whose payloads occupy some tones in B1-242 or D1-242 or B2-242 or D2-242.

For MU-MIMO allocation of RU size that is larger than 20 MHz, the user block subfields are dynamically split between the two HE-SIG-B content channels (½) and the split is decided by the AP (on a per case basis).

A resource allocation index signaled in the common field of HE-SIG-B channel carries the information such as RU arrangement, if MU-MIMO capable RUs carry MU-MIMO, and a number of users multiplexed using MU-MIMO.

A transmitted resource allocation index may differ when different RU arrangements are used or when for the same RU arrangement, different number of users multiplexed using MU-MIMO. Since up to 8 users can be multiplexed in an MU-MIMO allocation, 8 indices indicating different # of users for a MU-MIMO capable RU within the same RU arrangement. The tabulated indices encoding jointly the RU arrangements and the number of users for a MU-MIMO index is shown in Table 4.

For example, as shown in Table 4, index 3 & 4 (e.g., indicate an RU arrangement [106 26 106] over a channel), index 3 (e.g., refers to single user (SU) transmissions in the RU while index 4) refers to MU MIMO in the first 106 RU with 2 users and SU in the remaining RUs. There are total of 64 different indices that refer to the same [106 26 106] RU arrangement, each with differing # of users in either of the MU-MIMO capable 106 tone RU. For the different RU sizes and arrangements possible, a total of 175 different indices can be signaled and would require 8 signaling bits and is carried in the common information field of the HE-SIG-B channel as shown in Table 4.

TABLE 4

|     | #1  | #2  | #3  | #4  | #5  | #6  | #7  | #8  | #9  | Num User |
|-----|-----|-----|-----|-----|-----|-----|-----|-----|-----|----------|
| 1   | 26  | 26  | 26  | 26  | 26  | 26  | 26  | 26  | 26  | 1        |
| 2   | 52  |     | 52  |     | 26  |     | 52  | 52  |     | 1        |
| 3   |     | 106 |     |     | 26  |     | 106 |     |     | 64       |
| 66  | 52  |     | 26  | 26  | 26  | 26  | 26  | 26  | 26  | 1        |
| 67  | 26  | 26  | 52  |     | 26  | 26  | 26  | 26  | 26  | 1        |
| 68  | 26  | 26  | 26  | 26  | 26  |     | 52  | 26  | 26  | 1        |
| 69  | 26  | 26  | 26  | 26  | 26  | 26  | 26  | 52  |     | 1        |
| 70  | 52  |     |     | 52  |     | 26  | 26  | 26  | 26  | 1        |
| 71  | 52  |     | 26  | 26  | 26  |     | 52  | 26  | 26  | 1        |
| 72  | 52  |     | 26  | 26  | 26  | 26  | 26  | 52  |     | 1        |
| 73  | 26  | 26  | 52  |     | 26  |     | 52  | 26  | 26  | 1        |
| 74  | 26  | 26  | 52  |     | 26  | 26  | 26  | 52  |     | 1        |
| 75  | 26  | 26  | 26  | 26  | 26  |     | 52  | 52  |     | 1        |
| 76  | 52  |     | 52  |     | 26  |     | 52  | 26  | 26  | 1        |
| 77  | 52  |     | 52  |     | 26  | 26  | 26  | 52  |     | 1        |
| 78  | 52  |     | 26  | 26  | 26  |     | 52  | 52  |     | 1        |
| 79  | 26  | 26  | 52  |     | 26  |     | 52  | 52  |     | 1        |
| 87  |     | 106 |     |     | 26  | 26  | 26  | 26  | 26  | 8        |
| 95  |     | 106 |     |     | 26  | 26  | 26  | 52  |     | 8        |
| 103 |     | 106 |     |     | 26  |     | 52  | 26  | 26  | 8        |
| 111 |     | 106 |     |     | 26  |     | 52  | 52  |     | 8        |
| 119 | 26  | 26  | 26  | 26  | 26  |     |     | 106 |     | 8        |
| 127 | 26  | 26  | 52  |     | 26  |     |     | 106 |     | 8        |
| 135 | 52  |     | 26  | 26  | 26  |     |     | 106 |     | 8        |
| 143 | 52  |     | 52  |     | 26  |     |     | 106 |     | 8        |
| 151 |     |     |     |     | 242 |     |     |     |     | 8        |
| 159 |     |     |     |     | 484 |     |     |     |     | 8        |
| 167 |     |     |     |     | 996 |     |     |     |     | 8        |
| 175 |     |     |     |     | 2*996 |   |     |     |     | 8        |

Indicating jointly the RU arrangement and the number of MU-MIMO users in an MU-MIMO resource results in the compact common information field. The per-user signaling field follows the common information field for the HE-SIG-B channel and carries information necessary to identify users as well as the decoding information for the data PPDU for the users. It admits both STAID and GroupID addressing for MU-MIMO.

Figure 42:
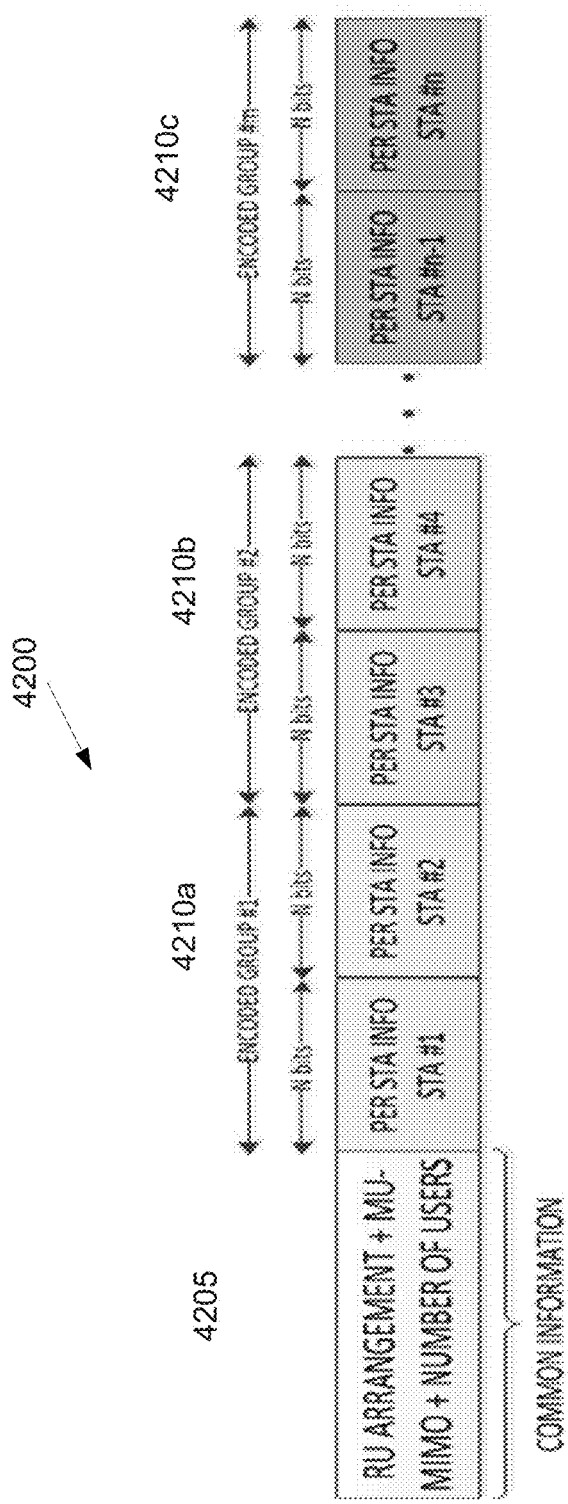
FIG. 42 illustrates an example arrangement of common information containing both RU arrangement and a number of users for MU-MIMO RUs in a HE-SIG-B channel according to illustrative embodiments of the present disclosure.

FIG. 42 illustrates an example arrangement of common information containing both RU arrangement and a number of users for MU-MIMO RUs in a HE-SIG-B channel 4200 according to illustrative embodiments of the present disclosure. The embodiment of the arrangement of common information containing both RU arrangement and the number of users for MU-MIMO RUs in the HE-SIG-B channel 4200 according illustrated in FIG. 42 is for illustration only. Other embodiments of the arrangement of common information containing both RU arrangement and the number of users for MU-MIMO RUs in the HE-SIG-B channel 4200 according could be used without departing from the scope of this disclosure.

As illustrated in FIG. 42, the common information 4200 comprises a RU arrangement+MU-MIMO+number of users field 4205, and a plurality of encoded groups (e.g., #1, #2, and #m) 4210a, 4210b, and 4210c. Each of the plurality of encoded groups includes per STA information for specific STA.

An arrangement of the per-user information element where each user is identified by an STAID is shown in FIG. 42. The number of RU allocation sub-fields in the HE-SIG-B common block field depends on the total PPDU bandwidth. For example, in the default mode, for 20 MHz and 40 MHz PPDU, each HE-SIG-B content channel contains one RU allocation sub-field followed by multiple user fields. The position of the user-field in the user-specific field together with the 8-bit RU allocation sub-field indicates the RU assignment to the user.

In the default mode for the 80 MHz PPDU, each HE-SIG-B content channel contains two RU allocation sub-fields for a total of 16 bits of RU allocation signaling, one each for the RUs in the two 20 MHz segments of the HE-SIG-B content channel. The user fields corresponding to the first RU allocation signaling field are followed by the user fields indicated by the second RU allocation signaling field in the user specific field.

In the default mode for the 160 MHz PPDU, each HE-SIG-B content channel contains four RU allocation signaling fields for a total of 32 bits of RU allocation signaling, one each for the RUs in the four 20 MHz segments of the HE-SIG-B content channel. The user fields for each of the 20 MHz segments in the content channel are arranged by the order in which their RU allocation signaling fields appear in the common field.

A user field for an MU-MIMO allocation includes a spatial configuration sub-field includes 4 bits that indicates the number of spatial streams for each STA and the total number of spatial streams in the MU-MIMO allocation. The subfield shown in Table 5 is constructed by using the entries corresponding to the value of number of users (Nuser) multiplexed using MU-MIMO in an RU. When MU-MIMO is used in an RU of size≤20 MHz, the number of users (Nuser) in an MU-MIMO allocation is equal to the number of user-fields per RU signaled for the RU in the RU allocation sub-field of an HE-SIG-B Common block field. For a given value of Nuser, the four bits of the spatial configuration sub-field are used as follows: An STA whose STA-ID matches the 11-bit ID signaled in the user field for an MU-MIMO allocation derives the number of spatial streams allocated to it using the row corresponding to the signaled 4-bit spatial configuration subfield and the column corresponding to the position of the user-field in the user-specific field. The starting stream index for the STA is computed by summing the Nsts in the columns prior to the column indicated by the STA's user-field position.

Figure 43:
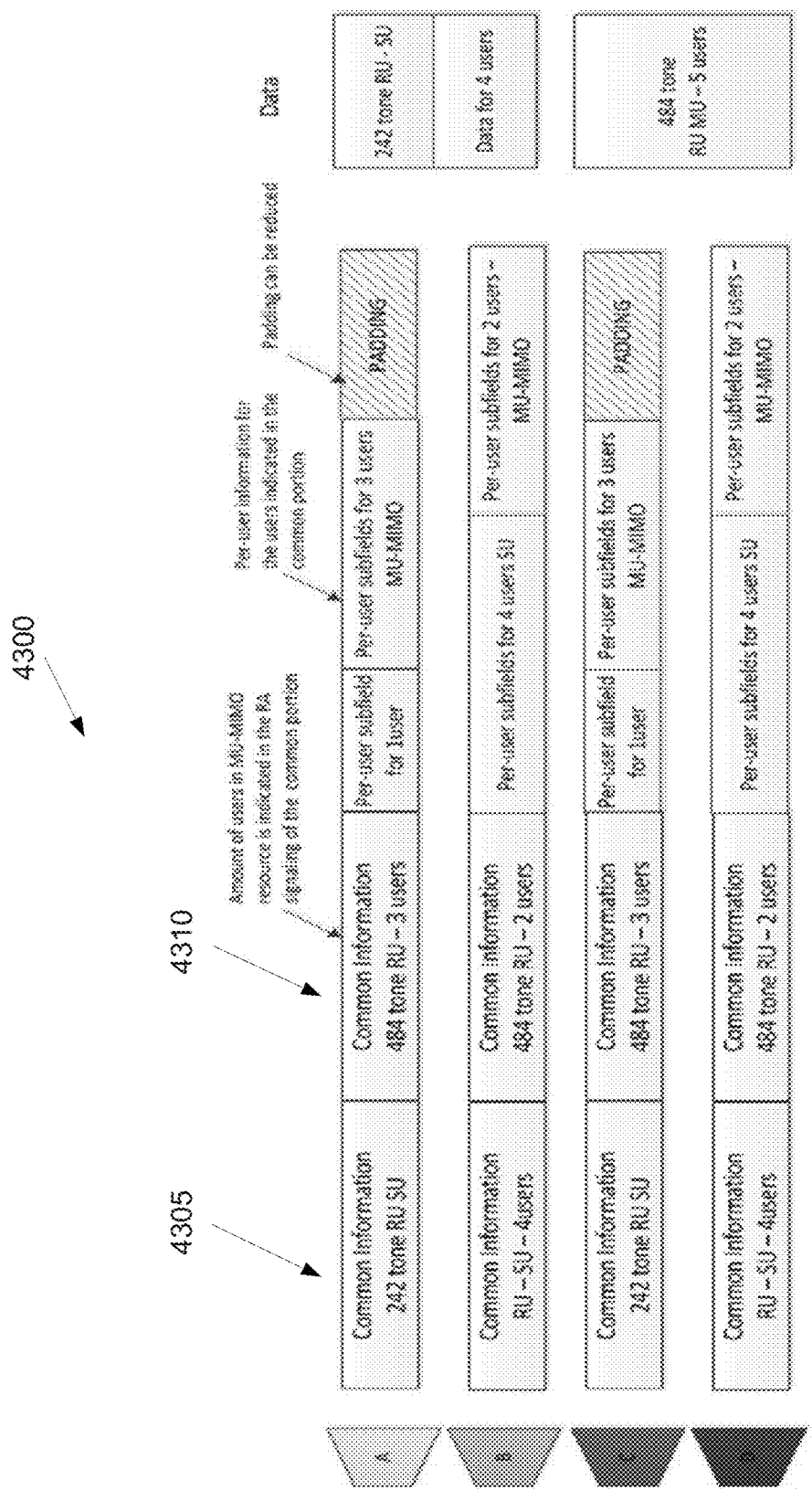
FIG. 43 illustrates an example load-balancing with MU-MIMO for RUs according to illustrative embodiments of the present disclosure.

When RU sizes whose width span larger than 20 MHz are signaled, AP can divides the per-user content blocks between allocated channels dynamically based on load in each allocated channel, different RU allocation signaling indices are signaled in the common information of the two content channels which refer to the same allocation size, but indicate number of per-user content blocks carried in the corresponding content channel i.e., transmit per-user content blocks for the subset of users indicated in the common field as shown in FIG. 43.

The AP decides whether load balancing is used or not for RUs>242. When used, STA looks at the allocation in each HE-SIG-B content channel and interprets the user-fields that follow appropriately. When not used, STA may know that load balancing is not used in order to interpret the spatial allocation sub-field in the user-field.

In one embodiment, an indication for null allocation in the RU allocation sub-field table is used to signal that no load balancing is used or no user-fields corresponding to the RUs larger than 242 tones are present in the content channel. The STA on receiving the null allocation sets the number of user

TABLE 5

| Nuser | B0 . . . B3 | Nsts [1] | Nsts [2] | Nsts [3] | Nsts [4] | Nsts [5] | Nsts [6] | Nsts [7] | Nsts [8] | Total Nsts | Number of Entries |
|---|---|---|---|---|---|---|---|---|---|---|---|
| 2 | 0000~0011 | 1~4 | 1 | | | | | | | 2~5 | 10 |
| | 0100~0110 | 2~4 | 2 | | | | | | | 4~6 | |
| | 0111~1000 | 3~4 | 3 | | | | | | | 6~7 | |
| | 1001 | 4 | 4 | | | | | | | 8 | |
| 3 | 0000~0011 | 1~4 | 1 | 1 | | | | | | 3~6 | 13 |
| | 0100~0110 | 2~4 | 2 | 1 | | | | | | 5~7 | |
| | 0111~4000 | 3~4 | 3 | 1 | | | | | | 7~8 | |
| | 1001~1011 | 2~4 | 2 | 2 | | | | | | 6~8 | |
| | 1100 | 3 | 3 | 2 | | | | | | 8 | |
| 4 | 0000~0011 | 1~4 | 1 | 1 | 1 | | | | | 4~7 | 11 |
| | 0100~0110 | 2~4 | 2 | 1 | 1 | | | | | 6~8 | |
| | 0111 | 3 | 3 | 1 | 1 | | | | | 8 | |
| | 1000~4001 | 2~3 | 2 | 2 | 1 | | | | | 7~8 | |
| | 1010 | 2 | 2 | 2 | 2 | | | | | 8 | |
| 5 | 0000~0011 | 1~4 | 1 | 1 | 1 | 1 | | | | 5~8 | 6 |
| | 0100~0101 | 2~3 | 2 | 1 | 1 | 1 | | | | 7~8 | |
| 6 | 0000~0010 | 1~3 | 1 | 1 | 1 | 1 | 1 | | | 6~8 | 4 |
| | 0011 | 2 | 2 | 1 | 1 | 1 | 1 | | | 8 | |
| 7 | 0000~0001 | 1~2 | 1 | 1 | 1 | 1 | 1 | 1 | | 7~8 | 2 |
| 8 | 0000 | 1 | 1 | 1 | 1 | 1 | 1 | 1 | 1 | 8 | 1 |

In an embodiment of the current invention, when MU-MIMO is used in RUs of size>20 MHz, the number of users (Nuser) in an MU-MIMO allocation is computed as the sum of the number of user-fields per RU indicated for the RU by the 8-bit RU allocation sub-field in each HE-SIG-B content channel. When RUs of size>20 MHz are signaled in the common field, the user fields corresponding the same MU-MIMO allocations could be split into two HE-SIG-B content channels. The user-field positions are logically continuous with the user-field in the second HE-SIG-B content channel updating its position (and therefore, column index) from that of the last user-field in the first HE-SIG-B content channel.

FIG. 43 illustrates an example load-balancing with MU-MIMO for RUs 4300 according to illustrative embodiments of the present disclosure. The embodiment of the load-balancing with MU-MIMO for RUs 4300 according illustrated in FIG. 43 is for illustration only. Other embodiments of the load-balancing with MU-MIMO for RUs 4300 according could be used without departing from the scope of this disclosure.

As illustrated in FIG. 43, the load-balancing with MU-MIMO for RUs 4300 comprises a plurality of common information 4305 and 4310, and a plurality of per-user subfields 4315.

fields in the content channel to zero and the Nuser is computed based on the users in only the content channel where the index corresponding to RU size larger than 242 tones is signaled. When used in either of the HE-SIG-B content channel, the other content channel may indicate an index corresponding to an RU size that is larger than 242 tones.

For example, the RU allocation index 11111111 signals a null allocation in the common field as shown in Table 6.

TABLE 6

| 8-bit indices | RU size | Number of entries | |
|---|---|---|---|
| 11 0 01yyy | 484 | 8 | |
| 11 0 10yyy | 996 | 8 | |
| 11 0 11yyy | 2*996 | 8 | |
| 11 1 11111 | Null Allocation | 1 | ⇐ No load balancing is used |

Each content channel carries 16 bits, 8 bits of RU allocation signaling for each of the 2 corresponding 242 tone RUs.

Figure 44:
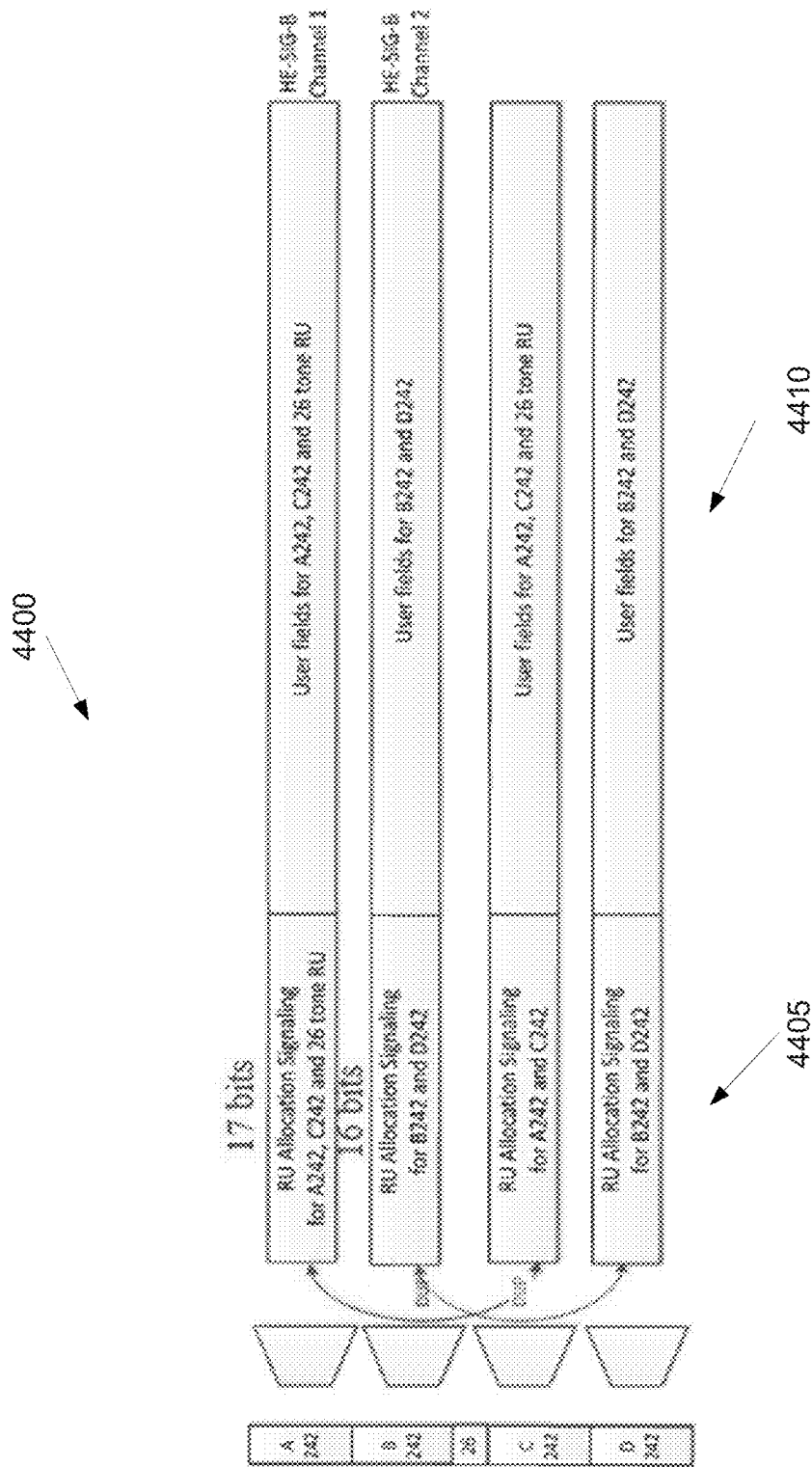
FIG. 44 illustrates an example signaling for a central 26 tone RU in a 80 MHz MU PPDU according to illustrative embodiments of the present disclosure.

FIG. 44 illustrates an example signaling for a central 26 tone RU in a 80 MHz MU PPDU 4400 according to illustrative embodiments of the present disclosure. The embodiment of the signaling for the central 26 tone RU in the 80 MHz MU PPDU 4400 according illustrated in FIG. 44 is for illustration only. Other embodiments of the signaling for the central 26 tone RU in the 80 MHz MU PPDU 4400 according could be used without departing from the scope of this disclosure.

As illustrated in FIG. 44, the signaling for the central 26 tone RU 4400 comprises a plurality of RU allocation signaling 4405 and a plurality of user fields 4410.

In one embodiment, the central 26 tone RU in an 80 MHz MU PPDU is signaled using 1 bit separately in one content channel which also carries the corresponding user field. By convention, the signaling bit is carried in HE-SIG-B channel-1. Therefore, a total of 17 bits RU signaling in HE-SIG-B content channel-1 and 16 bits RU signaling is carried in HE-SIG-B content channel-2 as shown in FIG. 44. The RU signaling may be repeated for the central 26 tone RU in both content channels.

Figure 45:
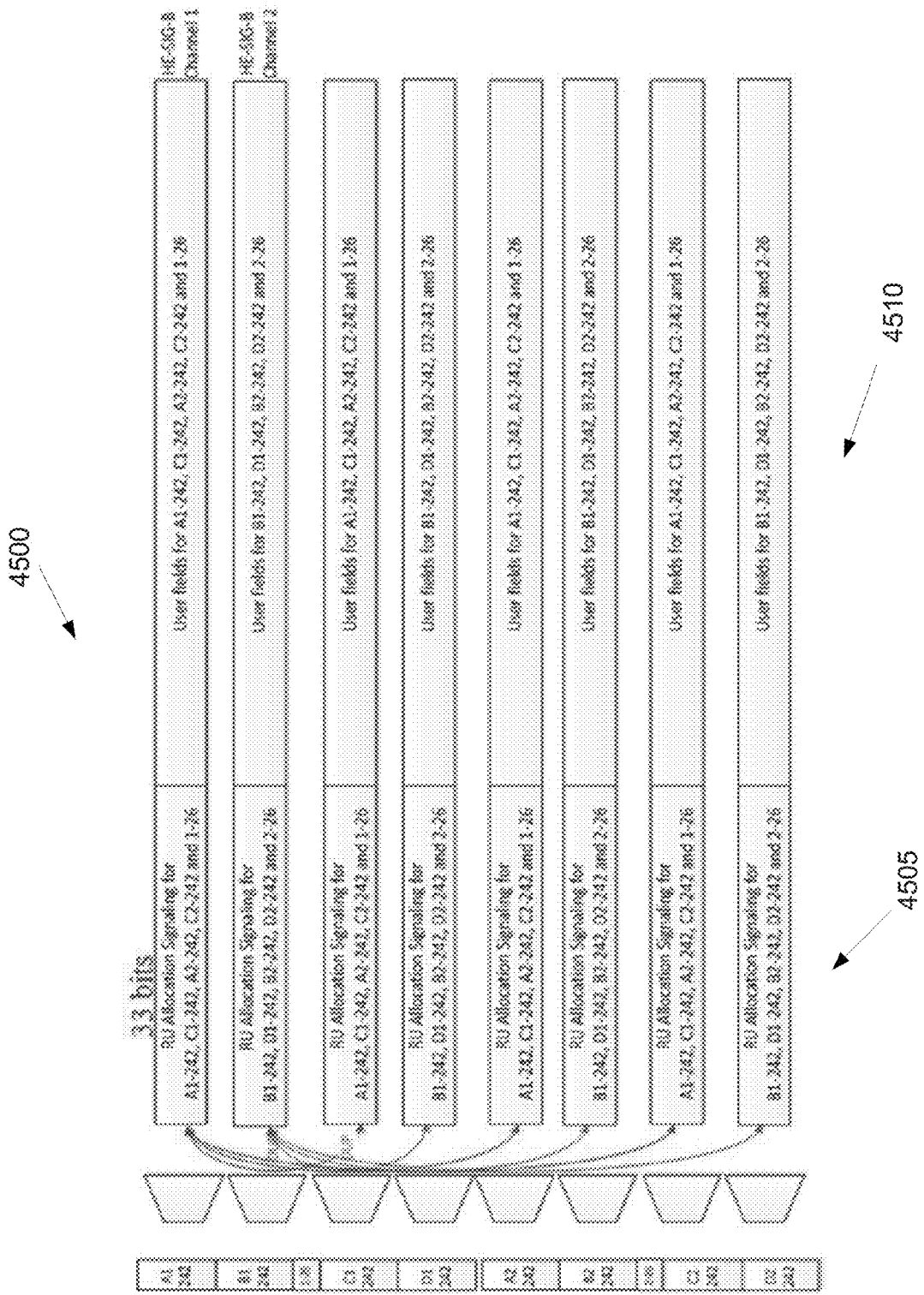
FIG. 45 illustrates an example signaling for a central 26 tone RU in a 160 MHz MU PPDU according to illustrative embodiments of the present disclosure.

FIG. 45 illustrates an example signaling for a central 26 tone RU in a 160 MHz MU PPDU 4500 according to illustrative embodiments of the present disclosure. The embodiment of the signaling for the central 26 tone RU in the 160 MHz MU PPDU 4500 according illustrated in FIG. 45 is for illustration only. Other embodiments of the signaling for the central 26 tone RU in the 160 MHz MU PPDU 4500 according could be used without departing from the scope of this disclosure.

As illustrated in FIG. 45, the signaling for the central 26 tone RU 4500 comprises a plurality of RU allocation signaling 4505 and a plurality of user fields 4510.

In one embodiment, for a 160 MHz PPDU, the central 26 tone RU corresponding to the constituent 80 MHz segments are signaled using 1 bit separately, for example, one in HE-SIG-B channel-1 and the other in HE-SIG-B channel-2. A total of 33 bits RU signaling per HE-SIG-B content channel as shown in FIG. 45.

In one embodiment, the use of central 26 tone RU in 80 MHz PPDU or the two central 26 tone RUs in the 160 MHz PPDU is not signaled in the HE-SIG-B common. Instead, the transmission of the user field corresponding to the central 26 tone is carried after the user fields corresponding to the signaled RU-allocation index in the HE-SIG-B common. For 80 MHz PPDU, the user field corresponding to the central 26-tone RU is carried in either of the two content channels. In such embodiment, the user field corresponding to the central 26-tone RU in an 80 MHz PPDU is carried in both content channels. For 160 MHz PPDU, the user field corresponding to the central 26 tone RU in the 80 MHz primary is carried in HE-SIG-B content channel-1 and the other in HE-SIG-B content channel 2.

In one embodiment, a null allocation is indicated in the user-field subfields. It may be done by indicating a null STA-ID or an STA-ID determined that by the AP that is not yet allocated. The null allocation may be indicated by signaling a zero spatial transmit streams to the user. A user field corresponding to the central 26-tone RU is always carried.

In one embodiment, STAs maintain a binary hypothesis on the number of user-fields that follow: N_userfields or N_userfields+1 in either or each of the content channel. After decoding the N_userfields signaled by the RU allocation, the STA attempts to decode another user-field if there are at least as many bits corresponding to a user-field in the content channel. If the STA-ID matches the ID of the STA and CRC checks out, the STA may proceed to decode the data in the central 26 tone RU.

In one embodiment, the STA may have only one allocation in an MU PPDU. STA can stop decoding HE-SIG-B if the STA-ID in the user-specific sub-field matches its own ID.

Currently, HE-SIG-A has a field identified as TXOP duration. TXOP duration is also carried in the MAC header with a bit width of 15 bits. It is unlikely that HE-SIG-A has room for 15 bits. Therefore, the compression requires that the duration field be re-quantized to the new bitwidth.

The most use of the TXOP duration field in PPDU header is for a MU-PPDU where the STAs don't have to decode any MPDU if MPDU is not allocated. Giving the duration field in the HE-SIG field helps for spatial re-use, power-saving etc., For SU transmissions, the IEEE 802.11ax STAs can decode the MPDU and get the full duration from the MAC header. Power-save and spatial re-use are not affected because the first MAC header in the A-MPDU gives the duration field.

In one embodiment, in a MU PPDU, the 15 bit duration field is carried in the common field of HE-SIG-B. The common field of HE-SIG-B currently carries RU allocation signaling and the TXOP duration.

In one embodiment, the 15 bits of the TXOP duration may be split between HE-SIG-A and HE-SIG-B for an MU PPDU.

In one embodiment, 5 bits of TXOP duration is carried in HE-SIG-A followed by 10 bits of TXOP duration in the common field of HE-SIG-B.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A station (STA) in a wireless local area network (WLAN), the STA comprising:
  a transceiver configured to receive, from an access point (AP), a bandwidth signaling sub-field in a high efficiency signal-A (HE-SIG-A) field included in a high efficiency multi-user PPDU (HE MU PPDU) indicating availability of at least one content channel, wherein the at least one content channel of high efficiency signal-B (HE-SIG-B) field on a downlink signal includes a primary channel and one or more secondary channels that comprise a plurality of an orthogonal frequency division multiple access physical protocol data units (OFDMA PPDUs), and wherein the at least one content channel comprises a central 26 tone RU of at least one 80 MHz segment in a 160 MHz HE MU PPDU that is signaled using 1 bit, the 1 bit for each 80 MHz segment carried in different content channel of the at least one content channel and the central 26 tone RU corresponding to constituent 80 MHz segments; and
  at least one processor configured to identify a bandwidth of OFDMA PPDU based on the HE MU PPDU.

2. The STA of claim 1, the at least one processor is further configured to determine a null allocation that is indicated in user-specific sub-fields using at least one of a null station identification (STA ID) or STA ID that is determined by the AP.

3. The STA of claim 1, wherein:
the at least one processor is further configured to indicate resource unit allocation signaling information in content channel information; and
the transceiver is further configured to receive, from the AP, the at least one content channel including resource allocation signaling information on the downlink signal.

4. The STA of claim 1, wherein at least one channel that is not occupied is indicated by the bandwidth signaling sub-field in the HE-SIG-A field and a null resource unit (RU) indication field in the at least one content channel of HE-SIG-B field.

5. The STA of claim 1, wherein:
RUs spanning at least one channel that is not occupied are nulled; and
The RUs in segments adjacent to each channel that is nulled are nulled to ensure compliance with spectral masks and out of band emissions, the RUs being nulled in units of a full RU.

6. The STA of claim 1, wherein the at least one processor is further configured to determine bandwidth signaling information for the downlink signal in accordance with a non-contiguous channel bonding transmission.

7. The STA of claim 1, wherein the bandwidth signaling information is received from the AP on a different portion than content channel information in the downlink signal and before decoding the at least one content channel.

8. The STA of claim 1, wherein the at least one content channel comprises a central 26 tone resource unit (RU) in an 80 MHz HE MU PPDU that is signaled using a 1 bit, the 1 bit being signaled on different location than the at least one content channel.

9. An access point (AP) in a wireless local area network (WLAN), the AP comprising:
at least one processor configured to identify a bandwidth of an orthogonal frequency division multiple access physical protocol data unit (OFDMA PPDU) by at least one of a primary channel or at least one secondary channel, and nulling a plurality of tones of OFDMA PPDU for the at least one secondary channel sensed busy; and
a transceiver configured to transmit, to a station (STA), a bandwidth signaling sub-field in a high efficiency signal-A (HE-SIG-A) field included in a high efficiency multi-user PPDU (HE MU PPDU) indicating availability of at least one content channel, wherein the at least one content channel of high efficiency signal-B (HE-SIG-B) field on a downlink signal includes a primary channel and one or more secondary channels that comprise a plurality of OFDMA PPDUs, and wherein the at least one content channel comprises a central 26 tone RU of at least one 80 MHz segment in a 160 MHz HE MU PPDU that is signaled using 1 bit, the 1 bit for each 80 MHz segment carried in different content channel of the at least one channel and the central 26 tone RU corresponding to constituent 80 MHz segments.

10. The AP of claim 9, wherein:
the at least one processor is further configured to indicate a null allocation that is indicated in user-specific sub-fields using at least one of a null station identification (STA ID) or STA ID that is determined by the AP; and
the transceiver is further configured to transmit the at least one content channel on the primary channel and another content channel on the at least one of secondary channels.

11. The AP of claim 9, wherein:
the at least one processor is further configured to indicate resource unit allocation signaling information in content channel information; and
the transceiver is further configured to transmit, to the STA, the at least one content channel including the content channel information on the downlink signal.

12. The AP of claim 9, wherein at least one channel that is not occupied is indicated by the bandwidth signaling sub-field in HE-SIG-A field and a null resource unit (RU) indication field in the at least one content channel of HE-SIG-B field.

13. The AP of claim 9, wherein:
RUs spanning at least one channel that is not occupied are nulled; and
The RUs in segments adjacent to each channel that is nulled are nulled to ensure compliance with spectral masks and out of band emissions, the RUs being nulled in units of a full RU.

14. The AP of claim 9, wherein the at least one processor is further configured to determine bandwidth signaling information for the downlink signal in accordance with a non-contiguous channel bonding transmission.

15. The AP of claim 9, wherein the bandwidth signaling information is transmitted to the STA on a different portion than content channel information in the downlink signal and before decoding the at least one content channel.

16. The AP of claim 9, wherein the at least one content channel comprises a central 26 tone resource unit (RU) in an 80 MHz HE MU PPDU that is signaled using 1 bit, the 1 bit being signaled on different location than the at least one content channel.

17. A method for operating an access point (AP) in a wireless local area network (WLAN), the method comprising:
identifying a bandwidth of an orthogonal frequency division multiple access physical protocol data unit (OFDMA PPDU) by at least one of a primary channel or at least one secondary channel, and nulling a plurality of tones of OFDMA PPDU for the at least one secondary channel sensed busy; and
transmitting, to a station (STA), a bandwidth signaling sub-field in a high efficiency signal-A (HE-SIG-A) field included in a high efficiency multi-user PPDU (HE MU PPDU) indicating availability of at least one content channel, wherein the at least one content channel of high efficiency signal-B (HE-SIG-B) field on a downlink signal includes a primary channel and one or more secondary channels that comprise a plurality of OFDMA PPDUs, and wherein the at least one content channel comprises a central 26 tone RU of at least one 80 MHz segment in a 160 MHz HE MU PPDU that is signaled using 1 bit, the 1 bit for each 80 MHz segment carried in different content channel of the at least one channel and the central 26 tone RU corresponding to constituent 80 MHz segments.

18. The method of claim 17, further comprises:
indicating a null allocation that is indicated in user-specific sub-fields using at least one of a null station identification (STA ID) or STA ID that is determined by the AP; and transmitting the at least one content channel on the primary channel and another content channel on the at least one of secondary channels.

* * * * *